United States Patent [19]

Kantor

[11] Patent Number: 4,944,872
[45] Date of Patent: Jul. 31, 1990

[54] APPARATUS AND METHOD FOR CONTAINING AND PROCESSING LIQUIDS AND WASTES

[76] Inventor: Frederick W. Kantor, 523 W. 112th St., New York, N.Y. 10025

[21] Appl. No.: 732,803

[22] Filed: May 10, 1985

Related U.S. Application Data

[63] Continuation of Ser. No. 423,782, Sep. 27, 1982, abandoned.

[51] Int. Cl.⁵ .............................................. B63B 38/00
[52] U.S. Cl. .................. 210/170; 210/242.1; 405/210
[58] Field of Search .................. 210/170, 242.1, 242.3, 210/242.4, 400, 401, 537, 923, 924; 405/210; 423/782

[56] References Cited

U.S. PATENT DOCUMENTS

| | | | |
|---|---|---|---|
| 3,572,506 | 3/1971 | Bandy et al. | 210/170 |
| 3,724,662 | 4/1973 | Ortiz | 210/242.3 X |
| 3,800,951 | 4/1974 | Mourlon et al. | 210/923 X |
| 3,997,448 | 12/1976 | Woodland | 210/400 |
| 4,165,282 | 8/1979 | Bennett et al. | 210/924 X |
| 4,231,873 | 11/1980 | Swigger | 405/210 X |

FOREIGN PATENT DOCUMENTS 1438670 6/1976 United Kingdom ............. 210/242.3

Primary Examiner—Richard V. Fisher
Assistant Examiner—Christopher Upton

[57] ABSTRACT

Flexible walled conduits and flexible walled enclosures which are adapted to contain fluids at pressures in substantial equilibrium with the pressure of a body of water in which the conduit or enclosure is positioned are discussed. Particular attention is directed to the physical configurations and structure of enclosure for containing municipal and industrial sewage and particularly for segregating the solid matter contained therein and treating the biological matter contained therein. Apparatus is shown for segregating solid debris by means of buoyancy characteristics and for removing both heavy and light solids into enclosures from which they can be further processed, recovered or eliminated. Large, flexible walled enclosures called equipods and equiponds are disclosed, as are their combinations, in systems which are adapted to treat municipal sewage and utilize the biological processes. Details of large storage vessels having flexible walls and adapted to be used at sea for processing sewage are discussed in detail.

4 Claims, 12 Drawing Sheets

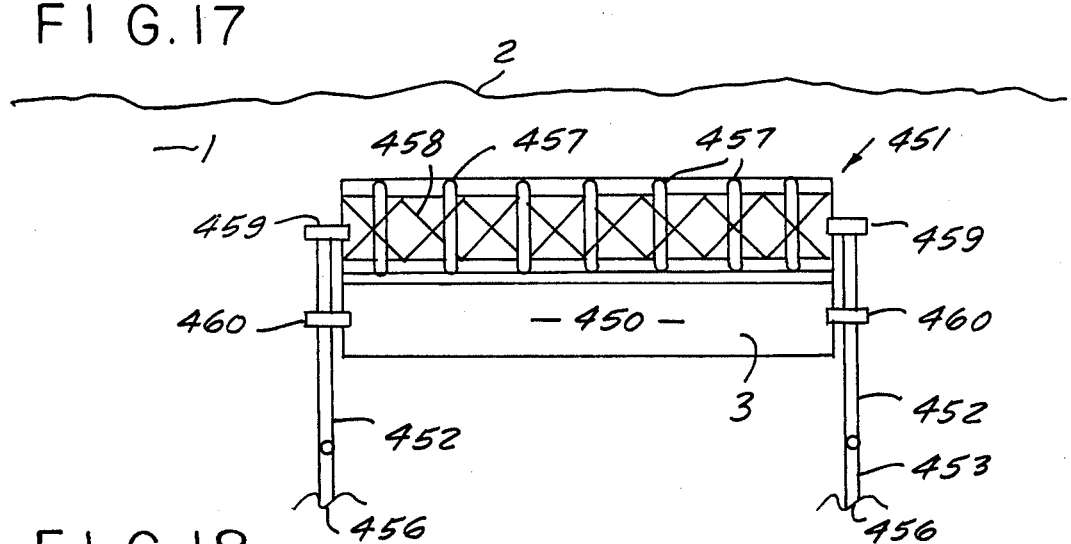
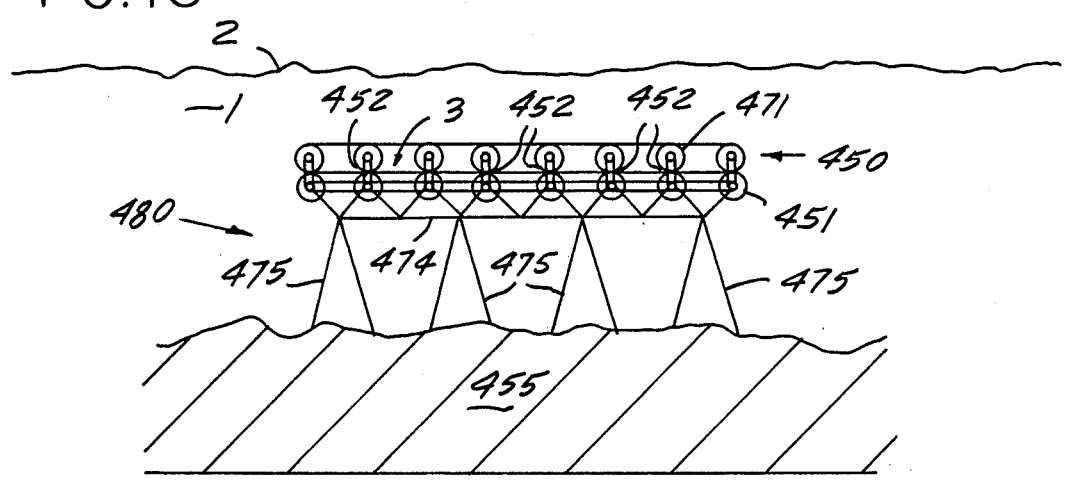
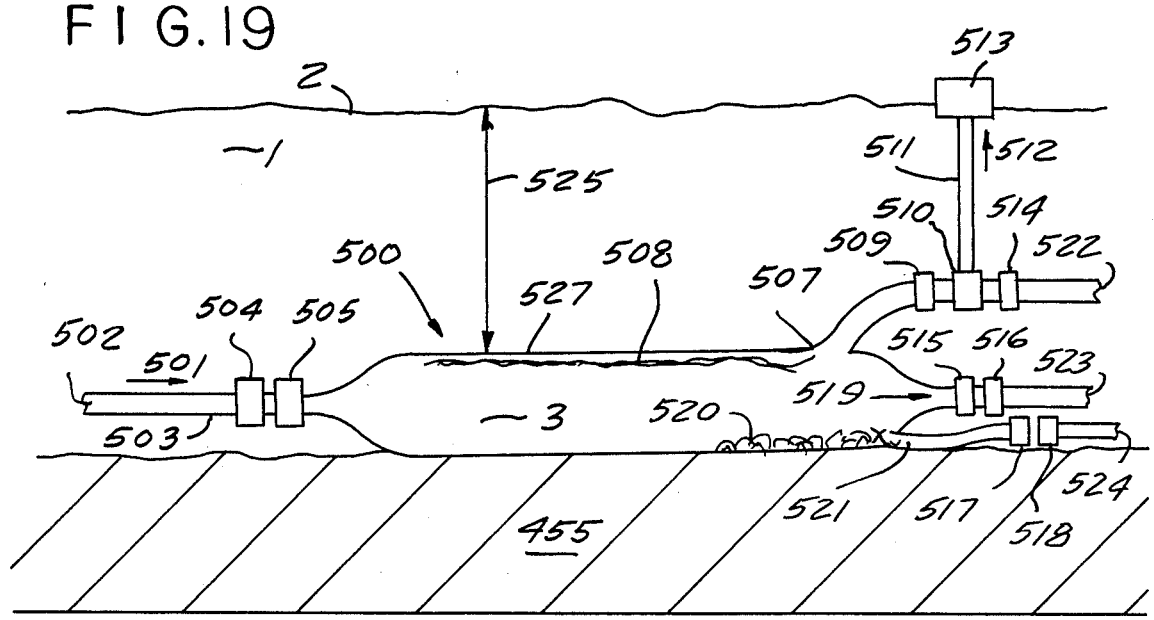

APPARATUS AND METHOD FOR CONTAINING AND PROCESSING LIQUIDS AND WASTES

This application is a continuation of application Ser. No. 423,782, filed Sept. 27, 1982, now abandoned.

TABLE OF CONTENTS

I. FIELD OF INVENTION
II. RELATED PATENT APPLICATION
III. THE OBJECTIVES OF THE INVENTION
IV. SUMMARY OF THE INVENTION
V. DESCRIPTION OF THE DRAWINGS
VI. DETAILED DESCRIPTION OF THE INVENTION
  A. Equilibrium Vessels vs, Rigid Vessels
  B. Preprocessing Sewage in Equiducts: Biological Balance
  C. Equiponds
  D. Basic Form of Equipond
  E. Equipond Containing Less Dense Liquid
  F. Stability of Equipond Containing Less Dense Fluid
  G. Sedimentation and Equipond Stability
  H. Effects of Sediment Density on Equipond Stability
  I. Equipond with Tension Containing Liquid with Same Density as Ambient
  J. Membrane Stiffness vs. Tension
  K. Equipond Flexing to Follow Waves of the Ambient Fluid
  L. Covered Equiponds
  M. Aeration in Equiponds: Heating with Thermal Pollution
  N. Aeration Powder Reduction
  O. Biological Waste, Solids, and Thermal Pollution Together
  P. Sorting Sediment Seawater
  Q. Effect of Time Spent in Sorter on Subsequent Equiponds
  R. Disposal of Separated Sediment and Debris
  S. Heating to Sort Fresh Water Sewage Over Fresh Water Medium
  T. Cleaning Equiponds by Inversion
  U. Cleaning Equiponds by a Suction System
  V. Belt Apparatus for Sorting Sediment and Debris
  W. Collection of Solid Material
  X. Belt and Roller Guides
  Y. Sealing the Floating Belt Sorter
  Z. Belt Sorter Feeds and Drains
  AA. Other Means for Collecting Solids in Belt Sorters
  BB. Equilibrium Belt Sorters for Other Uses
  CC. A Floating Sewage Processing Plant
  DD. Anchoring
  EE. Solids Reclamation and Staged Sorting
  FF. Submerged Sewage Processing
  GG. Equiducts as Extended Processing Vessels
  HH. Dissolved Gases in Submerged Processor Each of Using High Pressure
  II. Purified Oxygen at Atmospheric Pressure
  JJ. Air At High Pressure in Deep Equilibrium Vessel
  KK. Purified Oxygen in Deep Equilibrium Vessels
  LL. Saving Liquid Pumping Power by Equilibrium Pressurization
  MM. Availability of Sunlight for Photosynthesis
  NN. Deep Equilibrium Vessels for Smaller Equipment
  OO. Heating and Dissolved Gases
  PP. Varying Flow Velocity in Equiducts
  QQ. Dispersion of Nutrients
  RR. Anaerobic Processes in Equiducts
  SS. Aerobic Processes in Submerged Equiducts
  TT. Biological Activity Byproducts
  UU. Choice of Sewage Concentration for Processing in Equiducts
  VV. Special Microorganisms
  WW. Special Microorganisms to Process Industrial Wastes
  XX. Microorganisms to Produce Feed Products
  YY. Microorganisms to Produce Fuel, Plastics, Chemicals, or Pharmaceuticals
  ZZ. Aquatic Organisms in Equiducts: a Food Chain
  AAA. Submerged Equilibrium Belt Sorters
  BBB. Processing in Submerged Equiponds
  CCC. Augmented Solution of Gases at High Pressure in Deep Equipond Aerobic Processes
  DDD. Anaerobic Processes
  EEE. Temperature Rise Due to Biological Activity
  FFF. Introducing gases in to Equiponds
  GGG. Special Cultures in Deep Equiponds
  HHH. External Gas Handling: Apparatus Commonality with Equiducts
  III. Multi-Stage Processing
  JJJ. Depth as Protection from Damage
  KKK. Partially or Fully Collapsed Equiponds
  LLL. Vertically Oriented Equiponds: Collection of Sludge and Gas
  MMM. Anaerobic Pressures and Temperature Rise
  NNN. Gas Collection Membrane Exposed Above Surface
  OOO. Stability of Membranes Against Wind-Driven Surface Waves
  PPP. Stability of Vertical Equipond Wall Shape and Membrane Tension
  QQQ. Equiponds as Balloons
  RRR. Allowing Ambient Fluid into Equipond
  SSS. Example of Submerged Processor
  TTT. First Sorting
  UUU. Processing First Segregated Solids
  VVV. Disposal of Solids by Further Transport
  WWW. Optional Heating of Liquid for Further Processing
  XXX. Deep Processing: Aeration or Oxygenation
  YYY. Deep Equiduct Processing Bed (Equibed): Series and Parallel Operation
  ZZZ. Series Operation of Equibed
  AAAA. Flow Augmentation by Gas Evolution
  BBBB. Chemical or Other Additions in Equibed
  CCCC. Submerged Processing Plant Made of Equiduct
  DDDD. Using Biological Heat
  EEEE. Handling Sludge
  FFFF. Reduced Mixing of Processed and Unprocessed material Using Equiducts
  GGGG. Cleaning Solids from Equiducts During High Flow Rates: Forming Solids Pulser
  HHHH. Choice of Flow Augmentation Means for Solids Pulse Forming System
  IIII. Configuration May be Varied
  JJJJ. The Equibed
  KKKK. Using Equiduct Bed for Sedimentation: Efficient Formation of Solids Pulse
  LLLL. Flow Pattern in Equibed During Solids Resuspension to Form Pulse
  MMMM. Additional Sorting NNNN. Multiple Diameter Equiducts in Equibeds
OOOO. Use of Additives in Many Equibed Branches
PPPP. Maintaining Cultures of Microorganisms in an Equibed
QQQQ. Higher Organisms as Filters
RRRR. An Equipond as a Sorter
SSSS. Storing Equibed Flush in Equipond
TTTT. Most of Processor Could be Submerged
UUUU. Option of Aerobic or Anaerobic Processing
VVVV. Oxygen for Oxygenation in Deep Equilibrium Vessels
WWWW. Reclaiming Oxygen
XXXX. Flushing Out Gaseous Biological Products
YYYY. Special Cultures Less Sensitive to Their Own Products
ZZZZ. Combination with Power Plants
AAAAA. Use of Waste Heat
BBBBB. Gradation From Processing to Transport: An Economic and Technical Choice
CCCCC. Auxiliary Processing and Transport Equiducts
DDDDD. Photosynthetic Aquaculture in Equiponds, Equiponds, and Equiducts
EEEEE. Artificial Illumination for Photosynthesis
FFFFF. Pathogenic Cultures
GGGGG. Domes Holding Fresh Water or Sewage Over Seawater
HHHHH. Adding Chemicals with Mixing in Equiducts
IIIII. Sorting Solids During Transport in Equiducts
JJJJJ. Digestion in Equiducts
KKKKK. Handling Extremely Noxious Wastes
LLLLL. Protecting Equiduct Biosystems
MMMMM. Variations
NNNNN. Higher Organisms in Equiducts, Equibeds or Equiponds
OOOOO. Large Size Steps in an Efficient Food Chain
PPPPP. The Transport and Processing Systems as an Open Ecosystem
VII. SUMMARY

I. FIELD OF INVENTION

This invention relates generally to the transporting of liquid wastes including suspended solid matter from their sources, and more particularly to the storage and processing of those wastes in large vessels adapted to maintain the pressure therewithin in substantial equilibrium with the pressure of a surrounding body of water.

More specifically, this invention relates to the details of the equilibrium vessels and the apparatus associated therewith for segregating, collecting, disseminating and treating the various solids and liquid components of sewage.

Even more specifically, this invention relates to the component apparatus and containers in a sewage handling system and to the overall combinations of these vessels and apparatus for performing a multiplicity of physical and biochemicl operations and sewage.

II. RELATED PATENT APPLICATIONS

In my four copending patent applications, identified below, all filed on the same date as this patent application Sept. 27, 1982, I have described apparatus and methods for use in conjunction with systems of the type described in this application. To simplify reference to those copending applications, I will hereinafter designate them as follows: My patent application Ser. No. 423,524 entitled "Fluid Transport Conduit System in Equilibrium with Its Environment filed 1982 Sept. 7, now U.S. Pat. No. 4,469,596," (hereinafter,"*1"), pertains primarily to a safely augmented system. My patent application Ser. No. 423,781 entitled "Fluid Transport Conduit System in Equilibrium with Its Environment," Appl. Ser. No. 790,755, filed 1985 Oct. 22, which is a continuation of Appl. Ser. No. 423,781, filed 1982 Sept. 27, now abandoned (hereinafter, "*2"), pertains primarily to means for constructing, installing, and insuring the dynamic stability of conduits and vessels for use in systems of this class. My patent application Ser. No. 423,570 entitled "Instrumentation and Control System for Fluid Transport and Processing System," filed Sept. 27, 1982, now U.S. Pat. No. 4,546,649 (hereinafter "*3"), pertains primarily to instrumentation for measuring the properties of systems of this class for the purpose of operation, preventive maintenance, and research. My patent application Ser. No. 423,522 entitled "Fluid Transport and Processing Systems and Method," filed Sept. 27, 1982, now U.S. Pat. No. 4,618,421 hereinafter "*5"), pertains primarily to a sewage transport system for removing liquid and solid wastes from points along a natural waterway and transporting and processing these wastes. The disclosures of my foregoing copending patent applications hereby are incorporated herein by reference. In this text, the term "or" is meant to be inclusive.

III. THE OBJECTIVES OF THE INVENTION

It is a primary object of this invention to provide apparatus and processes for the transportation and more particularly for the containment and processing of municipal and industrial sewage.

It is a related and more specific object of this invention to provide containment vessels and associated apparatus for the physical separation and biological treatment of solid and liquid wastes contained within sewage streams and to provide for such handling and treatment in a liquid environment, wherein the pressure within the treatment facilities is in substantial equilibrium with the surrounding body of water.

It is a further and related object of this invention to provide solids segregation equipment and biological processing equipment which can perform physical and biological operations on the solid and liquid components of sewage streams in an integrated sewage containment and handling system adapted to be maintained in a fixed location at sea.

It is still a further and related object of this invention to describe the physical characteristics of such sewage handling and treatment facilities under the influence of its environment and to describe apparatus and techniques for ensuring the proper maintenance of the enclosure vessels and their operation.

IV. SUMMARY OF THE INVENTION

The foregoing several objects and many other objects of this invention are achieved in sewage containment systems which include vessels having substantially flexible walls and bottoms, supported in bodies of water. In an apparatus shown, the vessel includes side members only and is open at the bottom to permit removal of heavy solid matter fed into the enclosed area. Apparatus is shown for segregating solid matter within the sewage introduced into the vessel by means of its buoyancy characteristics and for removing that material from the vessel. Other vessels are shown for containing sewage liquids from which the solid materials have been segregated and for performing therein biological processes to render the sewage inert or useful in acaculture or other biological systems. Systems are shown comprising a combination of vessels and including conduit means between those vessels for performing a series of physical and biological operations on sewage and for recovering the biological and energy values from the materials in the sewage.

V. DESCRIPTION OF THE DRAWINGS

FIG. 17 is a view of the apparatus of FIG. 16 taken along lines A—A thereof;

FIG. 18 depicts a support for a belt sorter;

FIG. 19 shows an equipod submerged and resting substantially on the bottom of a body of water;

VI. DETAILED DESCRIPTION OF THE INVENTION

A. Equilibrium Vessels vs. Rigid Vessels

Figure 1:
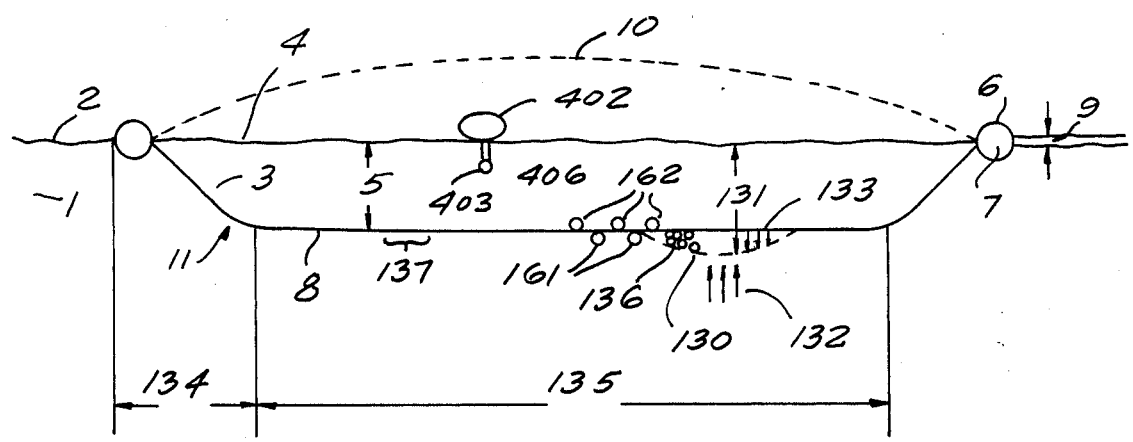
FIG. 1 depicts an equipod in a supporting fluid medium.

A substantial portion of the cost of construction of many classes of sewage processing facilities is believed to be the cost of constructing suitable tanks, ponds, or other enclosures in which sedimentation can be followed to occur, aeration can be utilized in promoting the growth of microorganisms which decompose the sewage, floeculation with sedimentation, chemical mixing, or other processes can be accomplished. Such ponds, tanks, or enclosures contain varying quantities of liquid; typically, they are surrounded either by open spaces, or are sunk into ground or other material. These containers are typically made with rigid walls, thus the walls must be made sufficiently strong to respond to the different loads imposed by the different quantities of liquid within the containers. Quite commonly, such processing plants are located in regions where the cost of land for construction is quite high, for example, near metropolitan areas.

In a sewage processing system for use with an equiduct sewage system, the location of the processing facilities may advantageously be made remote from metropolitan areas by, for example, floating the facilities on a naturally occurring body of water. For example, New York City could advantageously use a processing plant which did not require expensive land in or near the city. Because of the history of development of transportation systems and the economics which led to the development of cities, many large cities and many population concentrations are located along rival valleys and at the mouths of rivers feeding to the ocean. In such situations, the surface of the ocean represents ar essentially free region in which construction of a floating facility might substantially reduce the total cost of sewage processing. Such a floating facility could be fed, for example, by equiducts transporting sewage and slurries of solid wastes from metropolitan centers and from other regions spread along a river valley. Because the medium surrounding the processing facilities is a liquid of density nearly the same as that which is to be contained within the processing facility, the principles of fluid equilibrium can be utilized to reduce the stress upon the walls to a level small enough to allow substantially flexible membranes to be used as the barrier separating the fluid being processed from the fluid medium in which the processing facility is located. Under such circumstances, variations in the quantity of fluid contained within the processing facility do not require that the vessels used in processing the fluid have substantial strength: the surrounding medium adjusts to conform to the outside surface of the processing vessels and provides support at various levels of distension or filling. Because the cost of constructing such large processing vessels may be substantially reduced by use of fluid equilibrium, the techniques used in the processing may be substantially simplified. Instead of trying to crowd a large amount of processing plant into a small physical space, the processing plant can :make use of natural processes occurring over larger areas. For example, it could be economically feasible to construct processing facilities occupying one or more square miles of surface utilizing fluid equilibrium vessels.

B. Preprocessing Sewage in Equiducts: Biological Balance

In the event that such equilibrium processing facilities are fed by an extended conduit system, the fluids flowing within the conduit can be monitored at a location relatively remote from the processing facility. Trace elements of a toxic nature detected within such fluids would be advantageously removed, using the mixing action and time spent within the conduit system to allow the conduit to serve as a reaction vessel, in which the removal of these trace elements is facilitated by continuous stirring. For example, certain heavy metals might be removed from solution by known chelating agents. Other materials might be removed by ion exchange resins, etc. Trace elements required for proper development of natural fermentation processes within the ponds of such a processing facility might also be added before the material reaches the processing pond. In this way, a through mixing might be effected without additional equipment. Also, the conduit system serves as a transporting system for bringing the material to the processing facility, instead of requiring separate transport. To promote full utilization and degradation of the biological constituents transported to the pond, substantial quantities of missing nutrients might be required. These nutrients can also advantageously be transported to the pond by the same equiduct system that carries the sewage, or other material to be processed. Thus, rather than trying to reduce the amount of nutrients which are carried by sewage, we may try, instead, to balance these nutrients so as to facilitate their use. Use of these nutrients, for example, by algal growth or by anaerobic bacteria, can lead to the basis for a miniature ecological system which can have as its highest members fish, pollusks, or other organisms which can be useful for their protein content, or which can be used as sources of materials suitable for fertilizer. The value of such products might be advantageously utilized in deferring the cost of operation of the system. Also, fermentation processes leading to the evolution of combustible gas, such as methane, can be useful in providing fuel for power generation. Methane produced in fermentation might be used advantageously in providing power for actuating flow augmentation means. For example, an electric generating facility might be located with the floating processing facility. Power produced by this generating facility could be utilized to actuate flow augmentation means along an extended equiduct system used in collecting sewage from a river valley. Combustible material carried in the form of a slurry might also be utilized in production of power, after separation by sedimentation and flotation. The enrichment of sewage by the addition of suitably divided, shredded, or otherwise preprocessed wastes, for example from metropolises, might improve the operating efficiency of the overall system by decreasing the amount of power required from outside to actuate flow augmentation means along the system. The power balance for the total system might even be positive, allowing electric power to be produced as a by product from the operation of the system.

A processing facility can use a variety of types of functional vessels within it. For example, sedimentation may advantageously use one type of container, anaerobic fermentation another, and aerobic metabolism and incorporation of nutrients into algae yet another type of container. Utilization of aeration can substantially reduce the amount of surface required to allow adequate oxygen to enter an aquatic environment, for example, to support fish.

In this patent application I will set forth various ways in which the principle of fluid equilibrium can be utilized advantageously in the construction of processing facilities for sewage and solid wastes. The systems set forth herein might be used advantageously with systems set forth in my copending patent applications *1, *2, *3 and *5.

In addition to their utilization as sewage and solid waste processing facilities, the facilities to be set forth herein might also find use specifically in aqua culture for the production of food, in which sewage might not play any role whatsoever. In such an application the ability to concentrate nutrients, provide a specially controlled environment, and provide proper aeration for a large expanse of fluid medium might prove economically advantageous in the production of special foods, such as mollusks, shellfish, or fish.

The reader is referred to my copending patent applications *1 and *2 for a discussion of the principles of fluid equilibrium. This discussion will not be repeated here.

C. Equiponds

In this patent application, I will first discuss ponds constructed utilizing fluid equilibrium to reduce their structural requirements. These equilibrium ponds, or equiponds, will be of the simplest type, in which sedimentation is presumed not to be a significant factor. Subsequently, I will discuss in more detail the dynamic considerations associated with sedimentation and other processes which can disturb the fluid equilibrium, and set forth apparatus and methods by which an equipod can be made stable in the presence of such destabilizing effects.

D. Basic Form of Equipond

In FIG. 1 is depicted a simple equipod 11 in supporting fluid medium 1, with upper surface 2. Equipond 11 contains fluid medium 3 whose upper surface is 4. The equipod itself is formed with a flexible membrane 8, supported at its periphery by float 6, with suitable buoyant material 7 contained therein. Optionally, the equipod can be covered by a membrane 10. In the event that the fluid 3 within the equipod has a lower density than the fluid 1 outside it, and in the case where membrane 8 does not have a substantially different density from the liquids surrounding it, liquid 3 within equipod 11 can be expected to have a free surface 4 which is higher than free surface 2 of liquid 1 surrounding equipod 11, by the amount designated 9. For example, if fluid 1 is sea water and fluid 3 is fresh water, then there is a difference in height 9, which is a definite fraction of the total depth 5 of liquid 3 in equipod 11. This small internal pressure head, 9, corresponds to a depth of liquid which exerts an unbalanced outward force about the periphery of equipod 11, tending to drive flotation means 6 further out. This tends to maintain equipod 11 in an extended state, which is desirable under most circumstances.

E. Equipond Containing Less Dense Liquid

Next, we will consider in more detail the situation in which fluid 3 has a lower density than fluid 1. In that case, were the equipod not present, fluid 3 would tend to form a layer on the surface of fluid 1. If we were to restrain the spread of fluid 3, for example by a vertical barrier into which fluid 1 could freely enter at the bottom, a well defined layer of known thickness could be expected to be formed by fluid 3 upon fluid 1. If the two fluids are miscible, then gradually the interface between them can spread, until diffusion has allowed the liquids to form a blend without a clean separation line. Suppose, instead of allowing this to occur, we were to place at the separation between the two different liquids a membrane of density intermediate between the densities of the two liquids. This membrane would naturally lie at such an interface without a tendency to rise through the liquid above it or to sink through the liquid below it. Under such circumstances no additional supporting forces are required. The membrane serves merely to separate two fluids from each other. Because the two fluids are presumed not to be moving with any substantial velocity relative to each other or to the membrane, surface waves of the type discussed in connection with the dynamic stability of equiducts in my copending patent application *2, and whose detection is discussed in my, copending patent application *3, would not experience amplification by fluid dynamic effects. Therefore, it is sufficient to show that perturbations of the surface give rise to forces tending to restore the surface to its original position.

F. Stability of Equipond Containing Less Dense Fluid

For specificity, referring again to FIG. 1, consider the case in which membrane 8 satisfies the condition that it is of density intermediate between that of fluid 3 and that of fluid 1. In such a situation, membrane 8 will have two characteristic regions: a region 135 in which its geometric configuration is essentially determined by the fluid forces which result in the layering of liquid 3 upon liquid 1, and a region 134 in which it is deformed to rise to the surface and connect to flotation means 6. Consider next a small perturbation within the region 135, leading to depression of membrane 8 to have the configuration indicated by dotted line 30. In such a region, its depth 131 is greater than its depth 5 elsewhere. Because the fluid 3 has a smaller density than fluid 1, pressure increases less rapidly with increasing depth within fluid 3. Therefore, the increase in pressure acting on the outside of membrane 8 in shape 130 is greater with the increased depth than is the increase of pressure acting on the inside of the membrane. This gives rise to an external pressure force forcing the membrane back to its original position, indicated by arrows 132, which is larger than the force tending to drive it away from its original position, indicated by arrows 133. The net resultant forces tend to restore the membrane 8 to its original position. Thus, in the case where sedimentation does not occur, the membrane 8 assumes a geometric configuration which is stable against small perturbations.

G. Sedimentation and Equipond Stability

Next consider the case in which fluid 3 contains material of higher density than fluid 3, which tends to settle out on the bottom on membrane 8. Let us suppose also that fluid 3 is being continually replaced, so that the amount of sedimentation which can occur is not limited to the amount of material which is present in a single filling of equipod 11. The amount of sedimentation that occurs in stagnant fluid over an element of area 137 of membrane 8 proportional to the depth of fluid above that portion of the membrane. Additionally, the amount of sediment resting on the membrane 8 tends to determine the depth by tending to cause the membrane to sink deeper into fluid 1. Suppose, for example, that the deformed region 130 of membrane 8 contained sediment 133, tending to deform it down into fluid 1. The deeper the membrane sinks into fluid 1, the greater the depth of fluid 3 there is above it in equipod 11. Under such circumstances, the amount of sediment which would tend to accumulate on that element of area of membrane 8 would be greater due to the increased depth. Thus, there would be a tendency for sediment to accumulate more rapidly in the depressed region 130 than in an undepressed region, for example 133. This accumulated sediment, if it has a higher density than fluid 1, could continue to push the membrane further down, increasing depth 131 and increasing still further the rate at which sediment accumulates preferentially in region 130. This is a form of dynamic instability of equipod 11 in the presence of sedimentation from fluid 3, in the case where the sediment has a higher density than fluid 1.

H. Effects of Sediment Density on Equipond Stability

Figure 6A:
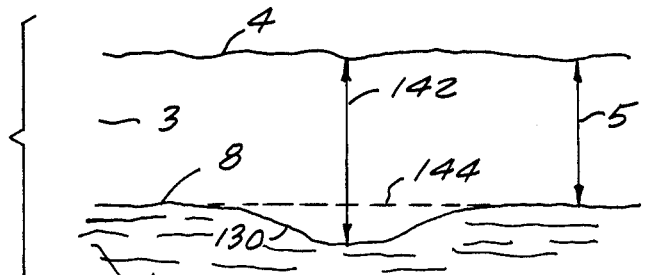
FIG. 6 shows the effect of the density of sediment on the performance of an equipod.
Figure 6B:
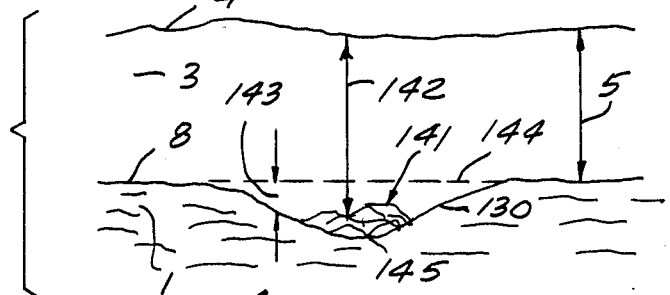
Figure 6C:
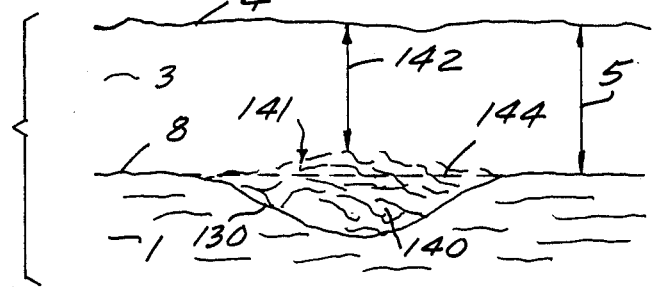

With reference to FIG. 6, the effect of the density of sediment upon the performance of an equipod can be seen in more detail In FIG. 6a, a small deformation of the equipod membrane to position 130 from its initial position 144 is illustrated. This is as discussed in connection with bulge 130 in FIG. 1. The increased depth is indicated as 142, and is larger than undisturbed depth 5 between surface 4 and equipod membrane 8. This depth of liquid 3 gives rise to a pressure as discussed in connection with FIG. 1, which increases less rapidly with depth than does pressure in fluid 1. Thus, restoring forces as discussed in connection with FIG. 1 are created. If we assume that fluid 3 within the equiduct contains a material which forms a sediment, the material in the case of stagnant fluid could be expected to deposit at a rate and to a depth which is approximately proportional to the amount of fluid above the element of area upon which the sediment is falling. In case b, the depth 5 in the undisturbed state between surface 4 and membrane 8 of liquid 3 is shown increased to a depth 132 by a disturbance 130, which is partially filled with sediment 140 having upper surface 141. FIG. 6b illustrates the case in which the density of the sediment is greater than the density of fluid 1. In that case, the amount of sediment required to produce a disturbance which depresses membrane 8, as shown in depression 130, does not require a volume sufficient to fill the depression to its initial position 144 Thus, there is a gap between the surface 141 of the sediment and the undisturbed position 144 of the membrane, which is here labelled 143. The total depth 142 in FIG. 6b of fluid medium 3 is the undisturbed depth 5, plus the difference in depth 143 between surface 141 of debris 140 and the undisturbed position 144 of membrane 8. It is this total depth 132 from which sedimentation can occur to contribute mass to the depressed region 130. Because the density of the sediment is greater than the density of fluid 1, a depth of sediment 145 is sufficient to counterbalance the fluid forces from fluid 1 resulting from the depression of membrane 8 into the form 130 by the amount 145 plus 143. Because depressed depth 142 in FIG. 6b is greater than undisturbed depth 5, accretion of additional debris can be anticipated in region 130. This leads to a continuing increase in the size of the depression and represents a positive feedback process which is not limited by the nature of the buildup of the deposit. Thus, sedimentation of a sediment, from fluid 3, whose mean density is greater than that of fluid 1, can lead to a dynamically unstable accumulation of sediment, in the case where membrane 8 is flexible and does not contain sufficient tension to cause it to exert a sufficient restoring force to prevent such departures from its equilibrium position 144. Use of tension to aid stability is discussed later herein. In FIG. 6c is illustrated the case in which the sediment 140 has a lower mean density than fluid 1. In that case, the accumulation of debris 140 within a depression 130 of membrane 8 gives rise to a surface 131 of the debris which is higher than the undisturbed surface 144 of membrane 8. Thus, the depth 142 from the surface 4 of liquid 3 to the debris is smaller than the depth 5 in fluid 3 to the undisturbed membrane position. Thus, the column of liquid 3 above an element of area where debris has accumulated is shorter than the column of liquid in an area where debris has not accumulated. Thus, the amount of debris accumulated further in such an element of area can be expected to be less than the accumulation where debris has not previously accumulated as substantially. Thus, by making the density of the debris less than the density of fluid 1 in which the equipod is situated, the accumulation of debris can be made no longer destabilizing influence on membrane 8. This process, described in connection with FIG. 6c, is self limiting. By suitably sorting the debris and sediment present in medium 1 before it is introduced into equiponds contained within medium 1, the equipod could be made dynamically stable against accretion of sludge, without requiring substantial stiffness or tension of equipod membrane 8. This would allow the maximum flexibility of equipod membrane 8. Such a situation could be desirable, for example, for the membrane of an equipod to be located at sea, where wave conditions might place substantially greater loads upon a more rigid or a tensioned membrane. Apparatus and methods for sorting sediment carried by sewage when the equipod is to be located at sea will be discussed in more detail hereinafter. Utilization of such a process of sorting can be advantageous in reducing the complexity and structural requirements for the equipod.

I. Equipond with Tension Containing Liquid with Same Density as Ambient

Figure 7A:
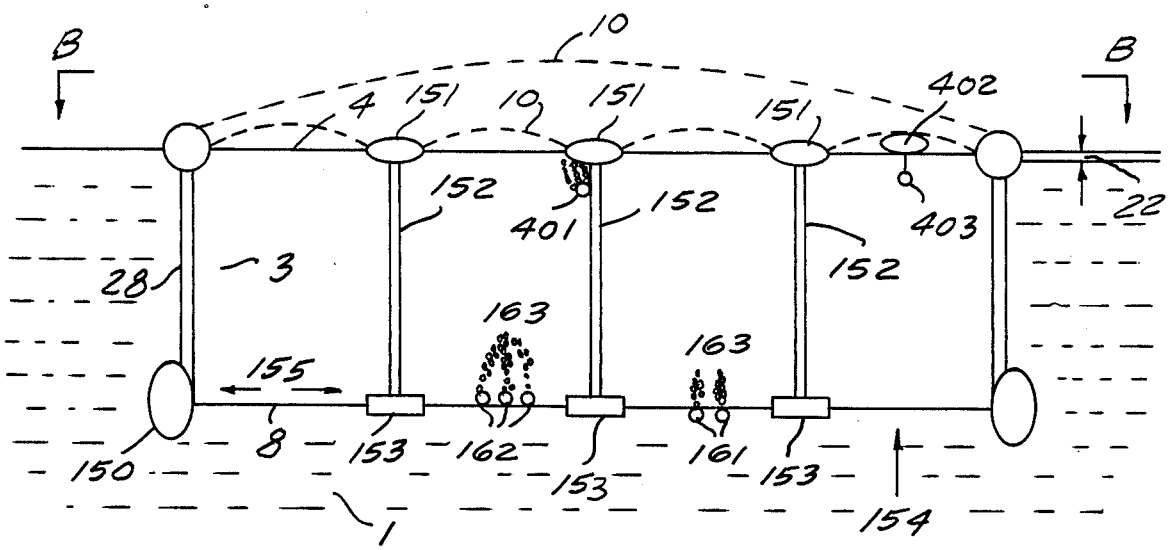
FIG. 7 shows an equipod having force distributing apparatus which prevents substantial displacement of its bottom membrane.
Figure 7B:
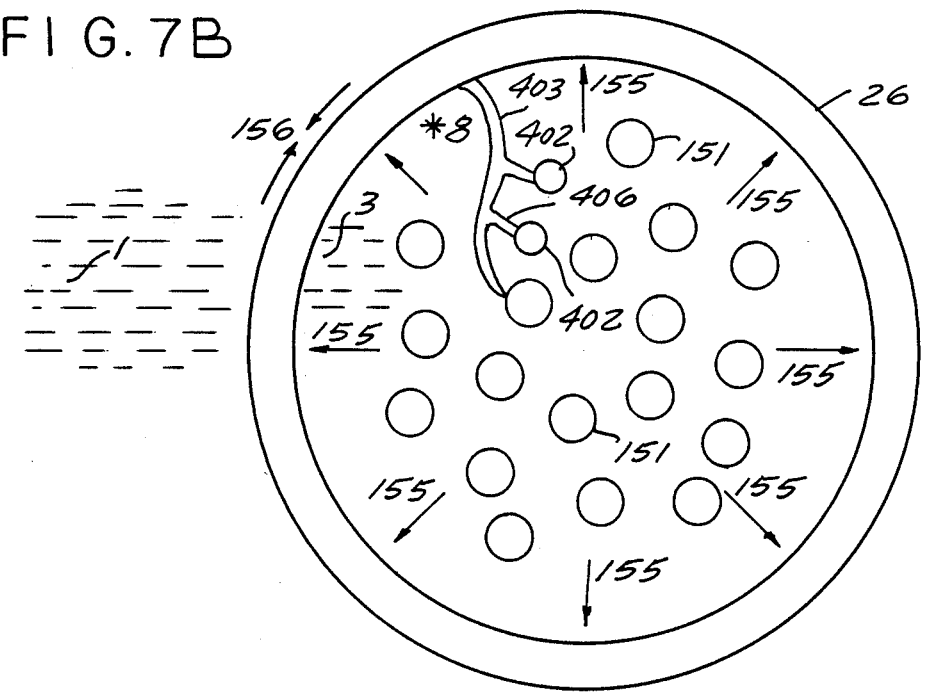
Figure 8:
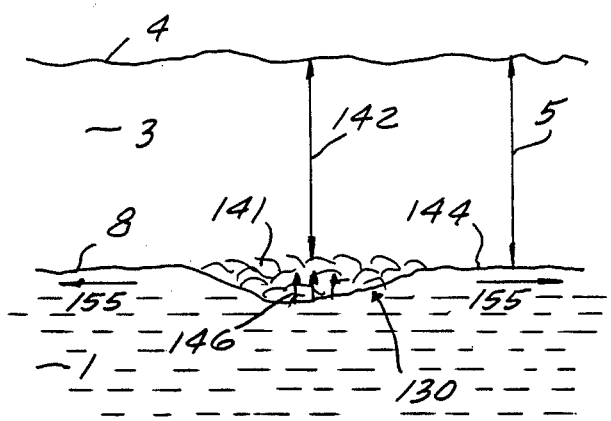
FIG. 8 is a view of a bottom membrane of an equipod illustrating the consequences of tension in that bottom membrane.

For applications in which sewage is to be processed in an equipod whose ambient medium is fresh water, such as, for example, a lake, it is not in general feasible to have the contained fluid 3 have a substantially lower density than the ambient fluid 1. Under such circumstances, the natural layering of a less dense fluid on more dense fluid, which was used to define the position of membrane 8, is not available as a defining and constraining physical effect. In particular, any sediment which can sink to the bottom of fluid 3 will exceed the density of fluid 1, thus the stabilizing mechanisms described in connection with FIG. 6c are not operative under any sedimentation circumstances for an equipod containing essentially fresh water sewage in a fresh water ambient. Two problems need to be addressed. The first is defining the position of membrane 8; the second is providing mechanisms which will assure that membrane 8 is maintained stably in position under a wide enough range of operating conditions, such as, for example, the accumulation of small quantities of sediment, so as to be useful as a fermentation pond, or other processing pond, for processing sewage. In FIG. 7a is diagrammed an equipod utilizing a float system 26 containing suitable buoyant material, possibly a gas or a foam plastic 27, from which hangs a wall 28. At the bottom of wall 28 is an optional compressive reinforcing member 150. Membrane 8 stretches across the bottom cf this equipod, generally designated 154. Equipond 154 contains an internal fluid 3, and is supported by an external fluid 1. Floats 151 are connected by suitable linkages 152 to force distributing members 153, which force distributing members make effective connection to membrane 8. Membrane 8 is maintained under tension, as represented by arrows 155. In FIG. 8 is a diagram illustrating consequences of this tension 155. In FIG. 8, membrane 8 is presumed deformed to a depression 130. Ambient fluid 1 and contained fluid 3 are presumed to have essentially the same density. Thus, a displacement in the form of a depression 130 does not give rise to any fluid restoring forces. However, displacement 130 has as a consequence a local curvature. Tension 155, interacting with this local curvature, gives rise to a small restoring force represented by arrows 146. Thus, debris 140 resting upon depression 130 can have its upper surface 141 raised by the action of these restoring forces 146 to lie above equilibrium position 144 of membrane 8. Thus, by introducing tension 155, the depth 142 from upper surface 4 of liquid 3 to upper surface 141 of debris 140 can be made smaller than depth 5 from upper surface 4 to equilibrium position 144 of membrane 8. In this way, introducing tension 155 into membrane 8 causes a geometric situation to arise which is similar to that in FIG. 6c. Under such circumstances, the accumulation of debris in the region where the depth 142 is smaller than the depth 5 can be expected to proceed at a reduced rate. Thus, introduction of tension 155 in membrane 8 can have the effect of stabilizing the membrane against a dynamic instability associated with the accumulation of debris. Returning to FIG. 7, in FIG. 7b is shown view BB of FIG. 7a. This corresponds to an aerial view of equipod 154. In this view, floats 151 are seen spaced within the interior of tho pond. Float 26 is shown here circular, and conceals compression support 150 which would also have a circular configuration. Under such circumstances, the compressive support 150 would support the tension in membrane 8. The tension in membrane 8 is represented by arrows 155. The compression in ring 150 is represented by arrows 156. Note that compression ring 150 does not have to have circular form. The geometric configuration of this ring could, for example, be a super ellipse. Such a configuration was used in the compression ring which supported the compression responsive to the tension in the cables and fabric utilized in the U.S. pavilion at Osaka, designed by David Geiger. Ring 150 is partially protected against buckling by the action of tension forces 155. This protection can be enhanced by incorporating suitable stiffness in compression ring 150.

In FIG. 7a, floats 151 with links 152 and force distributing means 152 serve to prevent any accumulated displacement of membrane 8. In this way the amount of displacement of membrane is referenced not to the supporting wall 28, but rather to the links 152 and floats 151. Thus, the equipond could be made to have quite substantial physical extent without having an accumulated displacement near its Center which might lead to an undesirable aggregation of debris. Referring again to FIG. 8, the tension forces 155 act on the curvature of displacement 130 to produce restoring forces 146. By spacing floats 151 and their associated links 152 and connections 153 relatively closely, the amount of curvature associated with any displacement of membrane 8 can be as large as is wished. In this way, the amount of tension 155 required to produce a selected restoring force 146 can be reduced substantially, compared to that which would be required were floats 151 not present. Under some circumstances, the decrease in tension of membrane 8 made possible by the utilization of floats 151 may not be necessary. This is an economic consideration, and under such circumstances a tradeoff between strength of membrane 8, strength of compression ring 150, and cost of floats, compression ring and membrane could be made so as to minimize the costs of construction and operation of equipond 154. Because fluid 3 and fluid 1 are presumed to have essentially the same density, the gap 22 between upper surface 4 of fluid 3 and upper surface 2 of fluid 1 which appeared in FIG. 1 is here essentially negligible.

J. Membrane Stiffness vs. Tension

An alternative method of achieving the necessary resistance of membrane 8 to displacement, in the absence of restoring forces associated with sufficient difference in density between fluid 3 and fluid 1, could be accomplished by making membrane 8 sufficiently stiff. The effect of tension in membrane 8 is analogous to the effect of stiffness. Instead of utilizing compression ring 150 and tension 155 within membrane 8, membrane 8 can simply be made to have stiffness inherent in its construction. In that case, FIG. 7 would be modified by the omission of compression ring 150. FIG. 8 would be modified by the omission of tension forces 155. Restoring forces 146 would then be due to the spring action of the stiffness of membrane 8, rather than to the vector component of a tension 155 acting upon the curvature of displaced membrane in location 130. The utilization of floats 51 offers advantages in the case of a stiff membrane 8 with negligible tension, just as in the case of a membrane 8 under tension 155. Presence of floats 151 allows the displacement, for example 130 of membrane 8, to be referred to supports relatively close to the location of the displacement, so that the amount of restoring force available from the spring force of the membrane is substantially greater for any given spring constant than would be the case were this support to be derived from floats 26 relatively remote from the region of displacement.

K. Equipond Flexing to Follow Waves of the Ambient Fluid

It is interesting to note that the stability requirements for an equipond carrying fresh water sewage in a fresh water medium require greater stiffness whether supplied by stiffness of the membrane or by tension in the membrane, than do the stability requirements for an equipond carrying fresh water sewage in a saline ambient. In a fresh water ambient, the amplitude of wave motion of the surface of the surrounding liquid is likely to be substantially less than in the case of a saline ambient. Thus, it is a fortunate circumstance that the equipond system which is more likely to experience substantial flexing is also of the type which can relatively easily be made more flexible. However, if desired, a relatively stiff equipond system could be used in an environment which experiences substantial wave motion, by using a multiplicity of smaller equiponds linked to each other by suitable mechanical means, for integrity, and by suitable conduit means, for flow. Such a multiplicity of equiponds would then form a larger equipond system having the requisite local stiffness in each, yet capable of flexing to follow large wave deformations of the surface of the ambient fluid.

L. Covered Equiponds

In FIGS. 1 and 7a is shown an optional membrane 10, which can be used to cover the surface of the equipond. In FIG. 7 is shown two optional positions for membrane 10. One of them corresponds to the position shown in FIG. 1, in which membrane 10 is anchored only at its ends at locations 6. An alternative form of anchoring membrane 10 is to anchor it at the periphery to floats 26 and internally to the equipond to floats 151. Such a membrane might be utilized, for example, where anaerobic processes are used to produce methane by the decomposition of sewage. Such methane could, for example, be utilized as a fuel for producing power, for example for operating flow augmentation means within the system. Or such fuel could be used to produce heat for increasing the ratio at which biological processes occur within the system, especially in cold weather.

M. Aeration in Equiponds; Heating with Thermal Pollution

Where desired, suitable air carrying conduit can be layed along bottom membrane 8. Air carrying conduits 162, for example, could be located within the equipond, or conduits 161 located outside the equipond membrane, respectively. Bubbles 163 are shown rising from suitable perforations in the walls of such conduits. A similar arrangement is depicted diagrammatically in FIG. 7, in which, again, air carrying conduit means 162 are represented as being within fluid 3, and air carrying conduit means 161 within fluid 1. Bubbles 163 are again shown rising from suitable perforations in said air carrying conduits. Such aeration might be advantageous, for example, in promoting aerobic decomposition of biological wastes. In a heated pond, for example one which is heated from waste heat of a power plant located either near the pond or upstream in an equiduct system from the pond, such aeration might be advantageous in facilitation of the more rapid growth of marine organisms, and in aquaculture in general. It is interesting to note that where suitable provision is made for aeration and supply of nutrients, an increase in temperature, rather than being a form of pollution, can be highly advantageous in increasing the rate of growth of organisms. Such an increase in temperature can be useful in reducing the overall size of the pond system used for the degradation of biological wastes. Also, it can reduce the time required for the development of biological organisms of edible varieties. For example, an equipond system which is utilized with suitable nutrients might produce as by products protein of an edible form.

When a higher partial pressure of dissolved oxygen is desired, relatively pure oxygen can be bubbled instead of air. This can increase the oxygen partial pressure by a factor of about five relative to air bubbling. This is discussed in more detail elsewhere herein, and in my copending applications *1, *2, and *5. Suitable measuring instruments are discussed in *4. Operation at higher pressures at depth within a liquid are discussed elsewhere herein, and in *1 and *2.

N. Aeration Power Reduction

Figure 3:
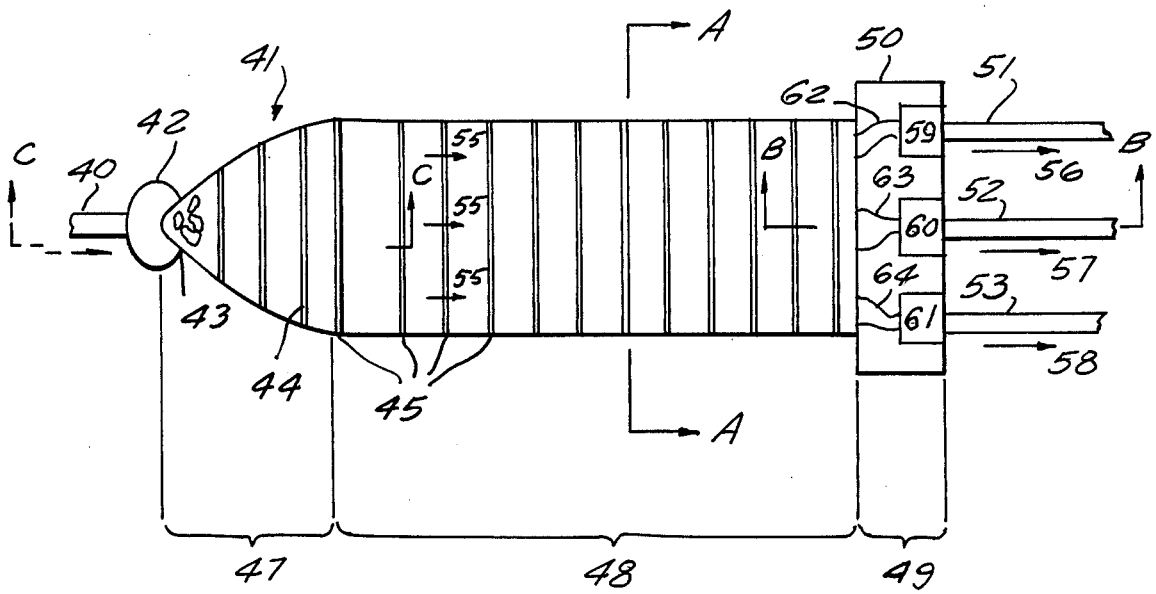
FIG. 3 is an apparatus useful for the segregation of solid materials within sewage adapted to be used at sea.

Aeration of fluid requires the mixing of air and fluid. If the air is to be delivered at a substantial depth in a liquid, then considerable mechanical work must be done in transporting the air to that depth against the pressure associated with the column of liquid above the point at which the air is released into the liquid. To reduce the amount of energy consumed in such processes, the aeration ducts utilized within an equiduct might, under some circumstances, advantageously be located near the surface of the equipond fluid. In FIG. 3 a conduit 401 is shown attached through suitable linkages to floats 151 near the surface. Alternatively, a separate float, such as 402, could be floated upon surface 4 of liquid 3 and used to support a suitable conduit 403, from which air bubbles can rise from a relatively short distance below surface 4. A similar technique, using a float 402 and a suitable linkage 402 to support a conduit 403, is illustrated in FIG. 1 In both cases, the distance which the air is transported below the surface 4 of fluid 3 is substantially reduced compared to what might be required Were the air transport conduits affixed to the bottom membrane of the equipond. In FIG. 7b is illustrated a top view, showing a small portion of a grid of aeration ducts suitable for aeration of fluid 3 in an equipond from a relatively small depth below the surface 4 of the liquid.

An alternative use for such systems, by which gas may be introduced into and dissolved in fluid in an equipond, could be the enrichment of the fluid with a has. For example, in aquaculture it might be advantageous to enrich the fluid in the equipond with $CO_2$, $O_2$, oxides of nitrogen, or other gases, depending on the needs of organisms growing therein.

O. Biological Waste, Solids, and Thermal Pollution Together

Because of the usefulness of waste heat in an equipond system, and the ability of equiducts to transport solid wastes in slurry suspension as well as biological wastes, an equiduct and equipond system together is capable of processing the three principal forms of waste which presently are disposed of into bodies of water. These three wastes are, respectively, biological sewage, solid waste material, and heat. One remarkable feature of an overall system based on equiducts and equiponds in this way is that processing of all can benefit from the presence of each of these wastes.

P. Sorting Sediment Seawater

Figure 2:
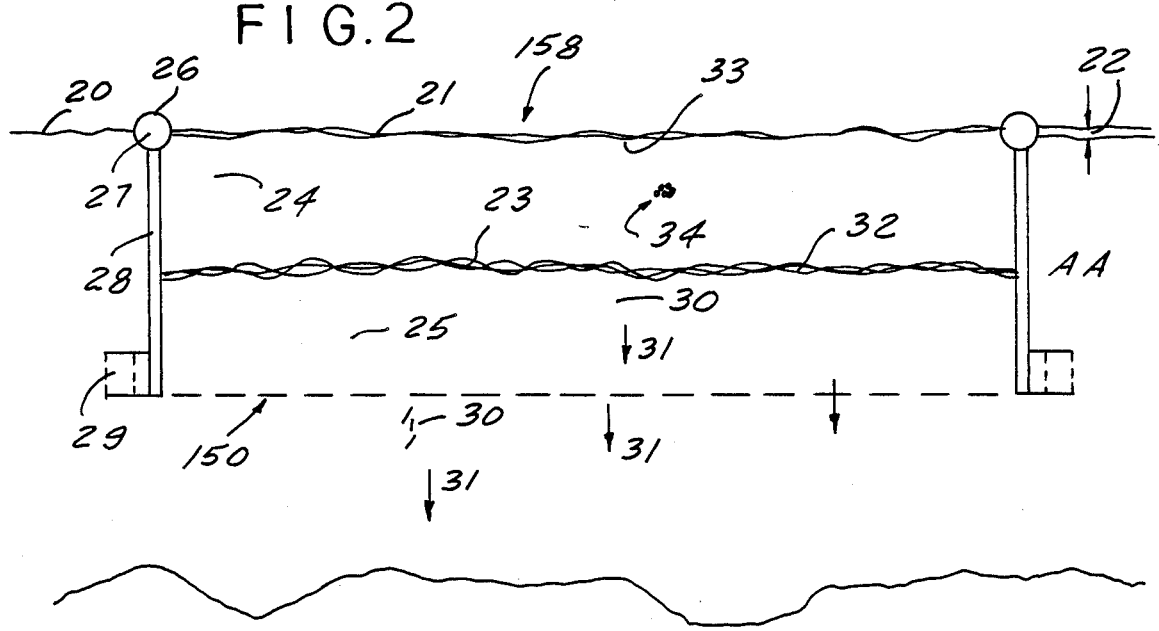
FIG. 2 is a section view of an apparatus useful for separating various types of sediment by means of density difference.

In FIG. 2 is depicted a section through an apparatus useful for separating various types of sediment, so as to allow sediment with a density greater than the surrounding fluid to settle through the surrounding fluid and be lost from the system. For such an apparatus to work, the surrounding fluid 25 must be denser than the contained fluid 24. The apparatus 158 is open at the top and bottom. The upper surface of lower density liquid 24 contained within it is designated 21. A float 26, containing suitable buoyant material 27, supports a wall, 28, at the bottom of which is appropriate weighting or stiffening means 29, if desired. Surrounding liquid 25 has surface 20. The liquid 24 within apparatus 158 has a lower density than liquid 25 surrounding it, so surface 21 is higher than surface 20 by an amount here designated 22. Within fluid 24 is presumed to be material which has different density from fluid 24. Some of this rises to form a layer of debris 33, just under surface 21. Some has a density intermediate between fluid 24 and fluid 25 and settles to form a layer of debris, 32, near the interface between fluids 24 and 25. Other material has a density higher than fluid 25, and settles through the interface to continue settling through the open bottom of apparatus 158 in the direction of arrows 31. This material would be essentially lost from the system in an open bottom apparatus of this type, unless other special provision, such as will be discussed later herein, were made to collect such debris. Were a sorting process and apparatus of this type to be used in processing a combination of sewage and solid waste slurry transported by an equiduct to a suitable processing system located out at sea, the debris settling through fluid 25 would be denser than sea water Such debris would continue to settle, releasing it from the system into the sea water. Such dense material is generally not a type of debris which would later contaminate the surface of the sea. The remaining materials, after such separation, would have the necessary density requirements to allow a flexible membrane to be utilized as the bottom of a flexible equipond of the type illustrated, for example, in FIG. 1, without requiring the complications of tensioning or stiffness, or additional flotation to make membrane 8 stable against sinking as a consequence of accretion of sediment. Optional cable 160 could be used for connecting stiffening members 129 in an optional configuration in which apparatus 158 has other than a circular aerial plan.

FIG. 2 might be, for example, section AA of an apparatus of the type illustrated in FIG. 3 in aerial plan. This is a separation apparatus of a type useful at sea for processing sewage whose principal constituent is fresh water. Material enters the system 41 from equiduct 40, proceeding in the direction of arrow 44. It goes through a suitable flotation and control system 42, to arrive into the working region of apparatus 41 at location 46. In region 47, rising fluid spreads within walls 44 to gradually achieve an essentially laminar flow in the direction of arrows 55. Suitable cables 45 are utilized to provide the spacing of the walls on both sides of apparatus 41. These cables correspond to cable 160 in FIG. 2. Tho sedimentation and rising of debris of various densities occurs in region 48. In region 49 is collection apparatus configured to collect material from three distinct locations spaced vertically within the material progressing in the direction of arrows 55. These feed through three collection plena, 62, 63, and 64, into suitable flow augmentation or control means 59, 60, and 61, and out through ducts 51, 52, and 53 in the direction of arrows 56, 57, and 58. A suitable flotation housing is provided for supporting these collection plena and flow augmentation or control means.

Figure 4:
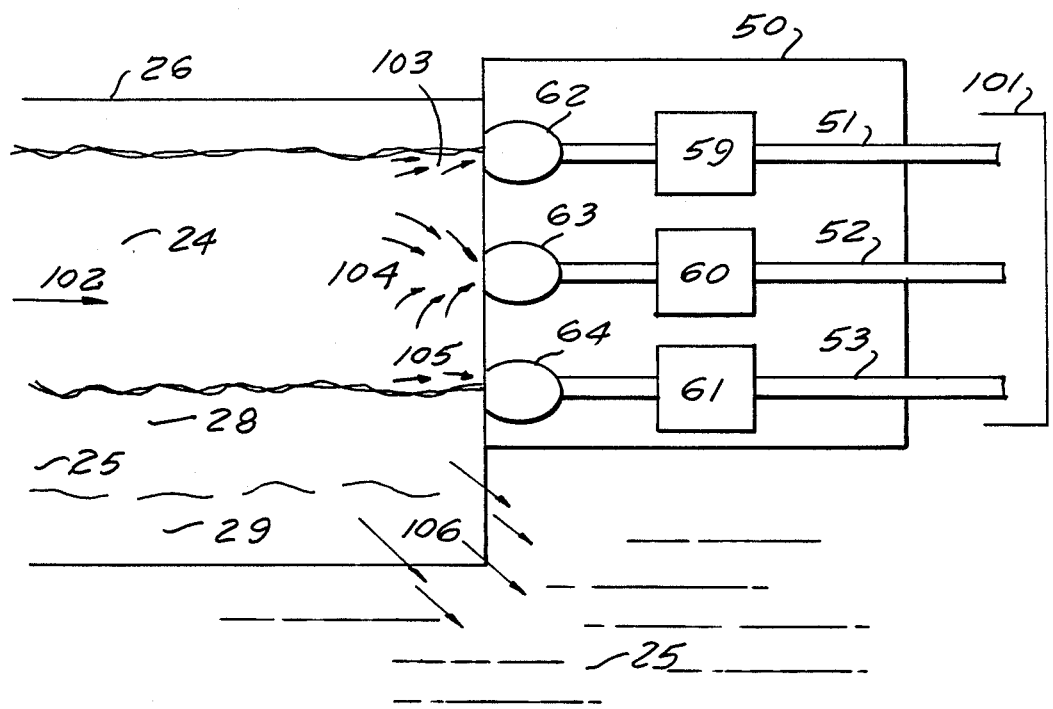
FIG. 4 is a section view through FIG. 3, taken along lines B—B thereof showing in more detail the apparatus used for the separate collection of different types of debris.

In FIG. 4 is illustrated section bb through FIG. 3, showing in more detail the apparatus used for the separate collection of various types of debris and fluid from the working region of apparatus 41. In FIG. 4, fluid progressing in the direction of arrow 102 has achieved a nearly equilibrium condition in which debris has accumulated at its upper surface and at the interface between fluid 24 and fluid 25, as shown in more detail in FIG. 2. Debris which floats on fluid 24 is collected in the direction indicated by arrows 103 into plenum 62. The large bulk of fluid 24 is collected as indicated by arrows 104 into plenum 63. Debris which has concentrated at the interface between fluid 24 and fluid 25 is collected as indicated by the arrows 105 into plenum 64. These feed, respectively, flow augmentation and/or control means 59, 60, and 61 which deliver their outputs into equiducts 51, 52, and 53. This collection of outputs, generally designated 101, is shown for convenience here stated vertically apart. This is not necessarily the case in operation of a system. Debris settling through fluid 25 has by this stage of the apparatus been essentially lost from the portion of the apparatus shown in FIG. 4. Liquid 25 which is not collected in the small flow entering plenum 64 escapes from the system in the direction of arrows 106. Fluid medium 25 is the ambient fluid in which the apparatus is floating. Flotation means 26 is provided as shown elsewhere in other views of the apparatus. Flotation housing 50 is also labelled here.

Figure 5:
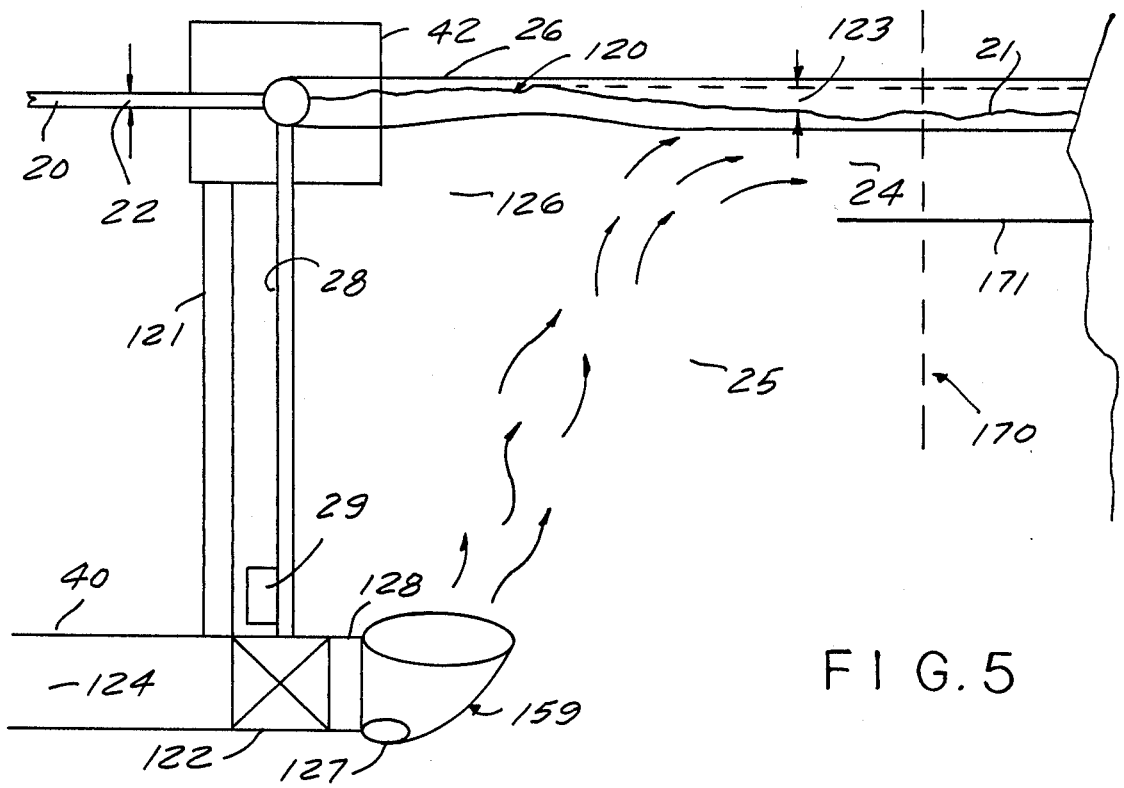
FIG. 5 is a section view of the apparatus of FIG. 3 taken along lines C—C of FIG. 3 and showing in more detail the end of FIG. 3 at which sewage is fed into the sorting system.

In FIG. 5 is depicted section cc of FIG. 3, showing in more detail the end at which sewage is fed into sorting system 41. Flotation means 42 supports support 121 to which is attached the end of equiduct 40. At this end is suitable flow control means 128, and suitable mechanical anchoring 122. This flow control means could be desirable, for example, in providing an adequate back pressure to allow the pressure within the equiduct to be maintained under a wide variety of flow conditions. Such a back pressure might be advantageous, for example, in avoiding having the wall of the equiduct become slack. For more detailed discussion of why one might wish under some circumstances to control the pressure in such a way, see my copending Patent Application *2. This flow control means might, for example, consist of an impeller and generator system operated by the fluid being delivered to it so as to convert some of its velocity energy or pressure energy into electrical energy available to do work elsewhere in the system. This is discussed in detail in my copending application *1 Following flow control means 128, is flow deflector 159, including opening 127 to allow heavy debris to settle from deflector 159. From this deflector, sewage rises in the direction indicated by arrows 125, entering into the working region of apparatus 41 in the region labelled 43 in FIG. 3. As the fresh water sewage rises within the salt water of the ocean 25, it acquires sufficient velocity to make a mounding 120 of surface 21. Flotation means 26 appears as elsewhere in other diagrams of this apparatus, as does wall 28 and optional weighting or stiffening means 29. By the time fluid reaches dotted life 170, layer 24 has become essentially established, so that there is now an interface 171 between fluids 24 and 25. The gap between the surface 21 of lower density fluid 24 and surface 20 of higher density fluid 25 is designated here 22. Because for operation of such apparatus it is desirable to have a lower density fluid rising within a higher density fluid, gap 22 is present, as distinct from the case in which fresh water sewage is flowed into an equipond surrounded by fresh water medium. Note that this sorting mechanism presupposes for its operation the presence of a lower density and higher density fluid. An example of conditions under which sorting mechanism would have these operating conditions is when essentially fresh water sewage is to be sorted in an essentially salt water medium such as ocean water. This could be done in a sound, estuary, bay, or other sheltered area, or because of the flexibility possible with a membrane utilized in an equipond of the type shown in FIG. 1, it may well be feasible to conduct such operations on the high seas. Note that because the surface 21 of lower density fluid 24 is higher by gap 22 than the surface 20 of the higher density fluid 25, the forces acting upon the walls of this apparatus tend to spread them. Thus, cables operating in tension connecting suitable members attached to these walls, can suffice for maintaining the configuration, with essentially parallel walls extending along sorting region 48. Because fluid head 22 provides the spreading force, compression members may in many cases not be necessary in such configurations.

Q. Effect of Time Spent in Sorter on Subsequent Equiponds

The finite time spent in the sorter by fluid being sorted so as to remove from it sediment having a higher density than fluid 1, in which fluid 1 the equipond will be located, has as a consequence that there can remain in suspension material which as sediment may still have a high enough specific gravity to affect the stability of membrane 8. If the settling portion of the remaining material in the fluid to be passed within the equipond is sufficiently small, despite the fact there is not time for sufficient sedimentation in the sorting system, then there is no problem with dynamic stability of the equipond membrane. In the event that the sorting mechanism is operated with a briefer time, or if for some reason the distribution of sedimentation rates of material in the fluid to be passed into the equipond is such that the denser components settle relatively slowly, for example because they may be extremely finely dispersed, then it may be desirable to include some stiffness in the equipond membrane, or to use tension in the equipond membrane. Under such circumstances, the solutions to stability of the equipond in the presence of sedimentation set forth for use in situations in which the surrounding medium does not have an appreciably higher density than the contained medium can be utilized also to correct for difficulties associated with sedimentation of a dense but slowly settling fraction in the fluid contained within the equipond.

R. Disposal of Separated Sediment and Debris

The floating debris which rises to the surface of fresh water sewage, and the debris which accumulates at the interface between fresh water sewage and salt water, both have relatively low density compared to such solid debris as glass and metal wastes. These forms of debris can be expected to be almost entirely organic materials of on form or another, and therefore to be usable as fuel in combustion. Thus, it can be attractive to utilize the top fraction and interface fraction of the material extracted from sewage as a source of energy for operating a thermal electric plant used, for example, to provide actuating energy for flow augmentation means elsewhere within an equiduct system, and whose waste heat could be utilized for increasing the temperature and rate of reaction within equiponds for fermentation and growth of aquatic organisms. If the sorting system is located in a region in which heavier debris settling to the bottom doe not constitute an inconvenience, this settling can be a satisfactory means of disposal for such debris. It's a self-selecting process in which the only debris which is cast into the body of water is that which will continue to settle and be unlikely to pose a problem. This would be the case, for example, if the sorting plant were located off the continental shelf on the high seas. Under other circumstances, it might be desirable to have a way to dispose of the solid material left from a separation process of this type in a way which allows it to be dispersed over a wide region. There are relatively simple ways in which this can be done. One is to move the sorting mechanism and processing plant about, so that the sedimentation to the bottom of the body of water in which they are floated occurs at different times in different places, so as to avoid accumulating a large amount of debris on the bottom in one location. Alternatively, a flexible arm, composed of equiduct, could be used, utilizing a suitably positioned head at the end of it to drop material into a body of water with the head being moved so that at different times material is deposited in different places. For example, the head could be a simple flotation system with suitable thrusters located on it to control its position. In the event that a separate disposition system is used for spreading debris over a wide region, some suitable means for collecting that debris must be provided.

S. Heating to Sort Fresh Water Sewage Over Fresh Water Medium

Sorting systems of the type described would be relatively ineffective in processing fresh water sewage over a fresh water medium. Under one circumstance, however, this could be more readily accomplished. That case is when the fresh water sewage is substantially warmer than the medium over which it is being processed. The warm liquid would tend to form a layer on the cooler liquid, with a fairly well defined interface. The existence of well defined interfaces between bodies of liquid at different temperatures is well known, and gives rise to the phenomenon of a thermocline in bodies of water. Such an artificial thermocline might be used to greatly reduce mixing between sewage and surrounding medium, so as to allow sedimentation of the heavier fraction, such as transported solid wastes carried in the form of a slurry, to be accomplished without the utilization of complicated mechanical contrivances. This is another example of a situation in which waste heat, for example from a thermal power plant, might be beneficial to the operation of a sewage processing equipond system.

T. Cleaning Equiponds by Inversion

After extended operation, an equipond may have an accumulated sedimentation layer on its membrane. In the case of an equipond of the type illustrated in FIG. 1, an especially simple method of cleaning is possible. An equipond of that type can be constructed utilizing a substantially flexible membrane 8, and can be designed in such a way that it is symmetric with respect to inversion. Then the equipond could be cleaned by turning it over, by dragging one edge across the bulk of the equipond so that the top side becomes the bottom side, and the bottom, the top side. If this were done out at sea, it would not constitute a particular hazard. Also, by cycling equiponds in a processing plant, the equipond can be allowed to be cleared of noxious material before it is inverted in this way. By this means, an equipond might be relatively easily cleaned of sedimentation or debris, without requiring the utilization of rigid mechanical structures or overhead arms, or other contrivances such as are utilized in the cleaning of vessels and processing tanks in a conventional sewage processing plant.

U Cleaning Equiponds by a Suction System

A second method which can be used with ponds having flexible bottom membranes without tensioning, such as FIG. 1, or tensioned or relatively stiff membrane, such as described in connection with FIG. 7, is to use a system which floats on the surface of the liquid contained within the equipond and carries a suitable suction or scraping means. A fluid system could feed, by means of a suitable conduit, back to the intake of another portion of tho processing system. In this way, ponds can be cleaned with the system in operation. The utilization of multiple equiponds in a sewage processing system will be discussed further hereinafter. Sludge collected from equiponds which were relatively free of noxious bacteria or other noxious material might be utilized directly as fertilizer or, depending upon the composition of the sediment, as an additive to feed for animals. In the absence of such uses for it, its organic content could be utilized as fuel in a thermal power station situated near the equipond sewage processor, or for some other fuel use. For example, such biological sludge might be reacted at higher pressure with hydrogen, water vapor, etc. to produce hydrocarbons suitable for use as fuel by deforming from beneath.

A third technique for clearing sludge from an equipond with a flexible membrane as illustrated in FIG. 1, would be to utilize a submarine flotation system which passes underneath the equipond and raises the membrane at a sharp enough angle to cause such sedimentation to slide along it, ahead of the floating machine running underneath. In this way the sludge could also be moved along the membrane so as to be substantially cleared from the equipond.

V. Belt Apparatus for Sorting Sediment and Debris

Figure 9:
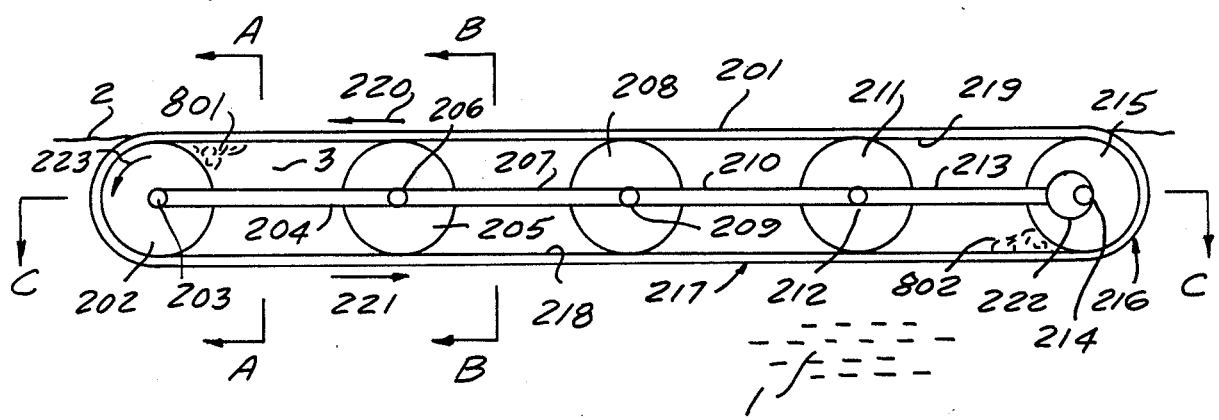
FIG. 9 shows a belt transport apparatus for the collection of debris settling from or rising within a liquid transported within a sewage segregation apparatus.

The special nature of a fluid medium makes it relatively easy to utilize conveyor belt transport mechanisms for the collection of debris settling from or rising from fluid transported therein. In FIG. 9 is depicted a belt mechanism which could be utilized for such collection. This belt mechanism, generally designated 200, is located in fluid medium 1 and floating essentially near its surface 2. This mechanism contains a fluid medium 3, whose density may be roughly comparable to or less than the density of medium 1. The belt 201 can be made to have neutral buoyancy or positive buoyancy, as desired. This belt is stretched by rollers 202, 205, 208, 211, and 215, in conjunction with spacer beams 204, 207, 210, and 212. More or fewer rollers and beams could be used, as appropriate. Let us suppose, for the sake of discussion, that belt 201 has slightly positive buoyancy. In that case, when it is on the lower surface of the rollers in location 217, its positive buoyancy makes it tend to rise up against the rollers. This causes the rollers in turn to press against the upper portion of the belt, causing it to rise slightly relative to surface 2 of liquid 1. This rise, in turn, raises a small portion of the upper part of the belt out of liquid 1, and results in a restoring force, tending to keep the entire assembly floating just near the surface 2 of liquid 1. Rollers 205, 208, 211, and any other additional intermediate rollers between the two end rollers, here designated 202 and 215, are widely spaced open structure rollers which interfere relatively little with the motion of material near the upper and lower surfaces inside the belt. Let us suppose that fluid 3 contains debris of a type that rises and a debris of a type which tends to settle when the fluid is allowed to remain relatively stagnant. The rising component would rise against inner surface 219 of belt 201. In that position, it would be transported in the direction of arrow 220 with the motion of the belt. Falling debris would tend to accumulate inside and near the bottom of the region containing fluid 3. This material would be transported in the direction of arrow 221, by motion of the belt. The intermediate rollers would interfere relatively little with this transport of solid material. Also, belt 201 would move slowly enough so as not to grossly disturb the settling action and rising action desired in segregating debris out of fluid 3. A suitable driving mechanism, such as motor 222, can be connected to one of the end rollers, or, if desired, to one of the intermediate rollers. Connection to the end roller is relatively more effective in most cases, as the amount of angular bond associated with passage of the belt 201 past end roller 215 is substantially greater than the bend associated with the passage of belt 201 past an intermediate roller, such as 211. Thus, the mechanical coupling to the roller would be superior were the end roller to be used for driving the belt. The reaction torque from this source of rotation can be referenced to beam 213, and subsequently thereby, for example, to cage 211. With a configuration of this type, rising debris would tend to accumulate at the end of the belt at which roller 202 is located, and falling debris at the end of tho belt at which roller 215 is located.

W. Collection of Solid Material

Figure 10:
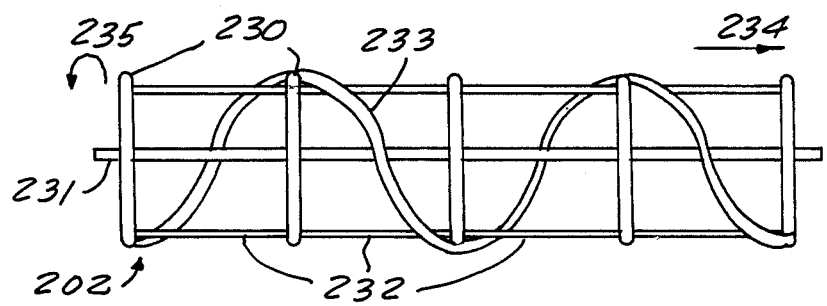
FIG. 10 is a section view of the belt apparatus of FIG. 9 taken along lines A—A of FIG. 9.

In FIG. 10 is shown section AA through the belt apparatus of FIG. 9. In FIG. 10, 231 is a shaft extending thru hoop rollers 230. These hoops can additionally connect, if desired, to struts 232. A screw, 233, is shown located within this hoop cage assembly. Rotation in the direction of arrow 235, corresponding to arrow 223 in FIG. 9, would, for example, cause material to move in the direction of arrow 234. This allows debris which has risen in the apparatus in FIG. 9 to be collected near one end of roller 202. A similar configuration within roller 215 will allow falling debris to be collected near one end of that roller.

Figure 11:
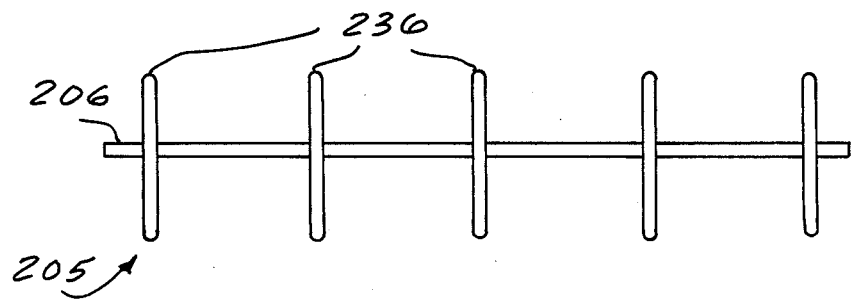
FIG. 11 is a section view through the apparatus of FIG. 9 taken along lines B—B of FIG. 9.
Figure 12:
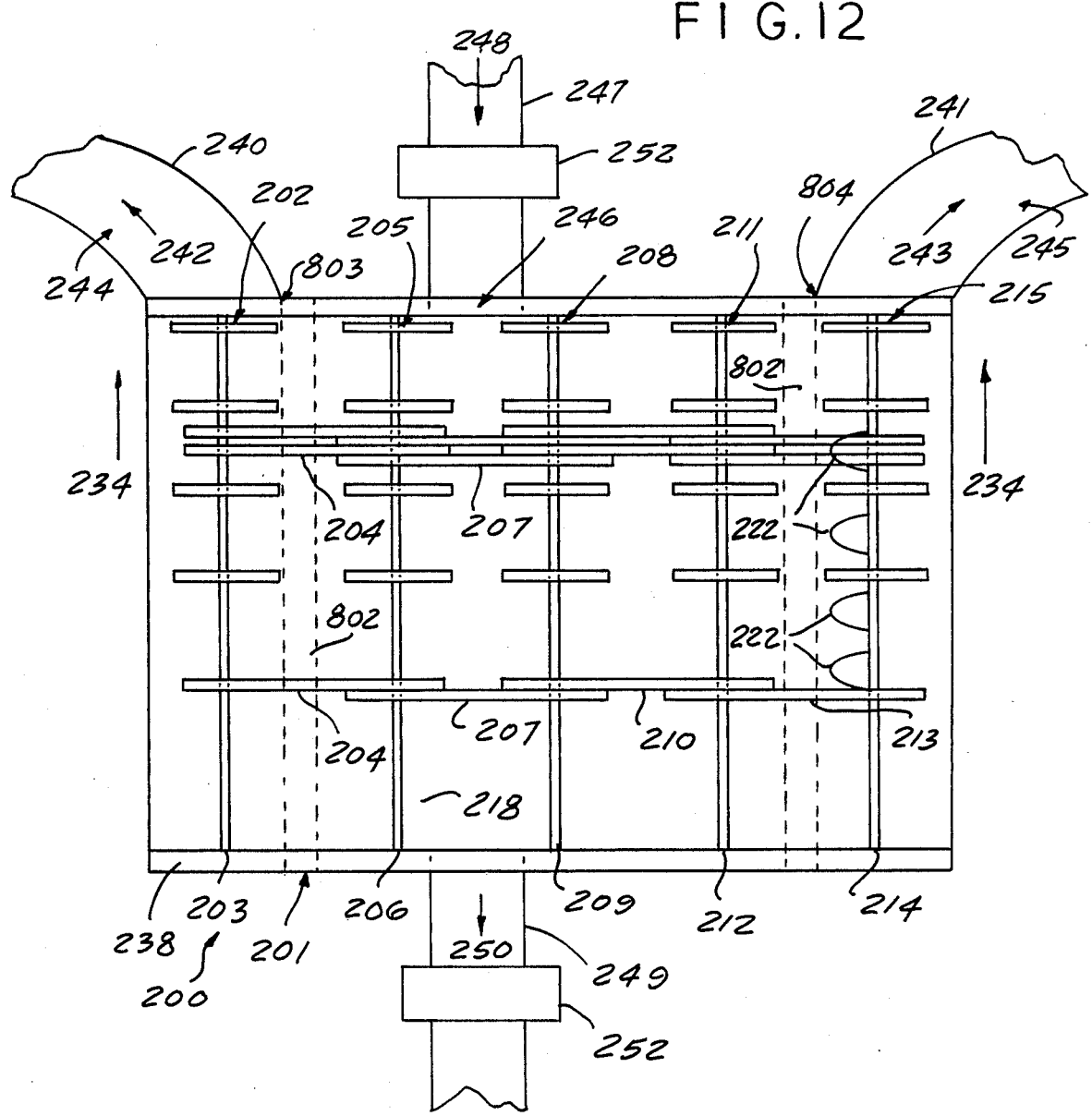
FIG. 12 is a section view of the belt apparatus of FIG. 9 taken along lines C—C of FIG. 9.

In FIG. 11 is depicted section bb through the apparatus of FIG. 9. This shows roller 205 with axis 206 connecting a series of hoops or rings, 236. Because the material is not intended to be transported axially within roller 205, circular sections 236 can be either solid disks or hoops, unlike the case in roller 202 within which material is intended to be transported substantially axially In FIG. 12 is diagrammed view CC of the belt system in FIG. 9. In this view, we are looking at surface 218 of the belt, which represents substantially the bottom of the region containing fluid 3. We can see in the view the details of cages 202, 205, 208, 211, and 215. The axles of these, 203, 206, 209, 212, and 214, are connected by multiple links, such as 204 and 207, as labeled. These links are spaced along the axles at convenient distances so as to avoid concentration of stresses within the axles. Because the forces are borne by struts which are located at suitably small spacings, an extended belt system can be constructed without undue concentration of stresses. Thus, utilization of tho fluid medium to support the belt assembly makes it feasible to construct quite extensive settling system in which debris can be segregated from fluid. Because the frictional forces within the fluid environment are very small, tho driving power required to actuate the motion of a belt in such an assembly can be expected to be quite small. By including sufficient positive buoyancy in the belt 201, an assembly of this type could be made capable of supporting the amount of heavier-than-ambient debris which might be anticipated in a system which is utilized for transporting solid wastes as a slurry, as well as sewage. Actuating devices 222 as shown reference their reaction torques to linkage members 213, by which roller 235 is linked to roller 211. In an extended system a multiplicity of driving motors might be desirable to reduce the torques borne by the axles of the various rollers. In addition, driving means can be incorporated in intermediate rollers and referenced to their linkages, where appropriate. As illustrated, the various linkages, can flex relative to each other by pivoting around their respective axles.

X. Belt and Roller Guides

Although resistance to sideways displacement and tilting of the linkages relative to the axles to which they are connected would advantageously be incorporated in such a device, in an extended system it could be desirable to include in the belt suitable features to guide the various rollers, so that they do not accumulate a transverse displacement relative to the belt over an extended length of belt. One such guide feature 237 is shown. It consists of a pair of ridges located on belt surfaces 218 of belt 201, between which are guided successive hoops or disks on successive rollers. A close fit between the guide ridges and the hoops or disks is not necessary, as the purpose of the ridges is to prevent the accumulation of offset from roller to roller. In an extended belt system, a multiplicity of such guide features might advantageously be included, because belt 201 is supported by a fluid medium, the structural requirements imposed upon it are substantially reduced by comparison to situations in which a belt is used to transport debris and is supported only by rollers with comparable spacings to those used in this system. Because of this, the belt can be expected to have a substantial operating life with respect to mechanical causes of failure. The rollers can be spaced quite widely, so that the amount of mechanical structure required for them can be substantially reduced compared to the amount of mechanical structure required for a belt system transporting a comparable amount of debris in a case in which the belt was not supported by a surrounding fluid. The belt can be constructed to have the desired buoyancy and mechanical properties, in accordance with the types of construction discussed in connection with the construction of equiducts in my copending Patent Application *2. Other techniques of construction also are known in the art. Selection of the amount of buoyancy to be incorporated in the belt depends upon the anticipated operating conditions. For example, if fluid 1 surrounding the belt assembly has a substantially higher density than fluid 3 contained within it, the buoyancy of the belt might not need to be as great if fluid 1 and fluid 3 have substantially the same densities. If a substantial amount of debris is expected to settle to bottom inner surface 218 of belt 201, and if this debris has a substantially higher density than ambient fluid 1, more buoyancy would be desirable in the belt than if only a small amount of such debris were to be transported.

Because the rollers can be supported at a multiplicity of linkage points, and because the linkages themselves can flex as they are connected to each roller, a system of this type could be constructed with large physical extent without having requirements of mechanical strength which would normally be associated with a rigid structure of the same size. This could be advantageous in the event that flexing is anticipated. For example, a structure of this type might be used in a body of water which is subject to wave motion. Because of the physics of its operation, a belt separation mechanism of this type could be used with fresh water sewage in salt water, or with sewage in a fresh water medium. In both cases, the ability to sort out settling and rising debris can allow more effective processing of the remaining material. By settling out heavy debris, the sorting mechanism allows subsequent equiponds to have reduced capabilities for supporting settling debris.

In FIG. 12, debris would move in the direction of arrows 234. This would allow it to be collected at the end of rollers 202 and 215 by suitable mean not shown. Such collected debris could then be further processed. For example, the falling debris might be processed for the extraction of metals. Both the rising and falling debris might be utilized in a thermal power plant as a source of fuel.

It is not necessary for all of the disks or hoops of successive rollers to ride in line. Only those which are utilized as guide rollers referenced to guide features on belt 201 would advantageously be so located. By locating the others so that they do not ride in line, the wear on belt 201 can be distributed. In the event that the debris which is transported on the upper or lower surface within the belt loop is only marginally different in density from fluid 3, it might be advantageous to locate all of the disks or hoops in line, so as to minimize the disturbance of this debris associated with the motion of the belt past successive rollers.

The apparatus described in connection with FIGS. 2, 3, 4 and 5, and the apparatus discussed in connection with FIGS. 9, 10, 11 and 12 together constitute means for separating and rejecting, or separating and further processing, solid material transported within an equiduct to a floating processing plant. Because the apparatus in FIGS. 9 through 12 does not require a substantial difference in density between contained and ambient fluid, it is suitable for use both at sea and in fresh water for processing sewage. Because the debris segregated in such an apparatus is concentrated at two locations and made available for subsequent processing, an apparatus of this type might be included in a body of fresh water whose contamination was to be minimized by avoiding the dumping of material into it. Subsequent processing of this segregated debris might substantially reduce its noxious properties, and/or its bulk, This debris, or the processed debris, could then be removed further by means of a subsequent equiduct system, or could be transported within an equiduct to a suitable disposal head which was moved to appropriate locations to dispose of this debris in a body of water. For example, in an extended river system, processing apparatus of this type might be included as part of a concentration process, by which the amount of fluid transported within the equiduct system was reduced, and the amount of solid matter reduced or converted so as to allow more ready transport. In this way, an extended river system might be serviced by an equiduct system. As will be discussed further hereinafter, such processing can lead to the purification of sewage to the point where the bulk of the water contained in the sewage can be returned to the natural body of water without appreciably degrading the quality of that body of water.

Y. Sealing the Floating Belt Sorter

Elastomers often have extremely good sliding properties when lubricated by water. Thus, a simple seal can be effectuated to prevent the escape of fluid 3 into medium 1. For example, in FIG. 12 end pieces 238 and 239 can be incorporated and positioned to the edges of belt 201. These end pieces would form a sliding seal with the belt, making use of the included or ambient medium for lubrication. Then, the interior of the system could advantageously be operated at a slightly lower pressure than the exterior of the system, so as to make all leakage flow from the outside to the inside. In this way, the amount of leakage of sewage into an ambient body of water could be made negligible. In end piece 239 are shown openings 244 and 245, to which are connected equiducts, respectively 240 and 241, containing material moving in directions 242 and 243. These two equiducts would carry slurry, rising or falling from fluid 3. Alternatively, mechanical transport means could be utilized. Transport of a denser component of sediment might under some circumstances be implemented by means of saline solution in the event that the ambient medium is saline. In such a case, the increased buoyancy provided by the saline solution for supporting sediment of a settling type might be advantageous in reducing the velocity with which the medium would have to move to retain the debris in suspension, and thus reduce the power requirements for keeping debris suspended.

The fluid component from which the debris had been segregated would exit through port 299 in end piece 238, moving through equiduct 249 in the direction of arrow 250. Flow augmentation means, as appropriate, for moving materials within equiducts 240 and 241, could be located elsewhere, and are not shown. Fluid would be inlet to the system through any conveniently located inlet at the same end, as, for example, through equiduct 247, moving in the direction of arrow 248 and entering port 246 in end piece 239. A suitable flow control means, 252, is shown incorporated in equiducts 248 and 249. These flow control means might, for example, be a power extraction system utilized for providing power for other portions of the equiduct system, or flow augmentation means. Utilization of flow control means 252 in conjunction with flow control and augmentation means in equiducts 240 and 241 allows regulation and control of the pressure within segregation system 200, so as to avoid leakage into a surrounding medium. By using relatively flexible end pieces, whose location is referenced to the edges of the belt, it could be feasible to make a system incorporating flexibility in both the belt and the end pieces. In this way, undesired concentration of stresses might be avoided.

Z. Belt Sorter Feeds and Drains

Material being fed into a belt sorter may contain substantial quantities of debris. In order to reduce the turbulence associated with feeding material into the belt sorter, instead of using a single feed at one end, a distributing system can be used so that fluid enters over essentially the entire end of the belt sorter. This could reduce the velocity of the fluid near that end. Suitable distribution means, might advantageously be incorporated within the belt sorter itself. Thus, the debris transported within the duct feeding the belt sorter would not have an opportunity to collect on a surface which was not part of the belt. In this way, fouling of the system by accumulation of debris in undesired places might readily be avoided. This spreading of fluid might be accomplished by means of deflectors 781 located within belt sorting system 200 in FIG. 12. Arrows 782 generally designate the spreading flow of fluid entering through inlet 246. Thus, a low velocity of flow of the fluid is achieved only after it has moved into such a position that the surface to which sediment settling therefrom would migrate is the moving surface of the belt of the belt sorter. Note that, as diagrammed in FIG. 12, a counterflow of solids and liquid is obtained within the belt system. This would be preferable, but not absolutely necessary. Counterflow here enhances segregation of solids, by allowing the liquid leaving the system from a region with the least amount of solids on the belt.

AA. Other Means for Collecting Solids in Belt Sorters

In the belt sorting apparatus depicted in FIGS. 9 through 12, auxiliary sediment and debris collection means 801 and 802 could be included, to provide an alternative means for positive collection of debris accumulated against upper inner surface 219 or lower inner surface 218 of the belt. Such collection means could, for example, consist of a long moving belt bearing corrugations, scoops, or other suitable gathering means which was retained in light contact with surface of the belt. Such collection means might be specially advantageous in apparatus in which the belt moved quite slowly and in which the sedimentation rate or rising rate for the material being segregated from the liquid phase were relatively small. In the presence of such a relatively small rate of relative motion between the segregating phase and the liquid phase, screw mechanisms of the type depicted in more detail in FIG. 10 might be relatively less satisfactory than when there were a relatively rapid segregation of material. Thus, gathering means 801 and 802 might be used in place of screw means depicted in FIG. 10 for collecting material from the inner surface of the belt. Details of this collection apparatus are not shown. Suitable collection apparatus is known in the art of materials handling. These collection means could then deliver their collected material to suitable outlets as indicated in FIG. 12. These outlets could be located in any convenient location for receiving material delivered to them by collection means 801 and 802, respectively. Although outlets are shown at locations 244 and 245 in FIG. 12, these locations might advantageously be changed, for example, to locations 802 and 804, respectively, matching material delivery locations of collection means 801 and 802. Under some circumstances, collection of material by mechanical transport means could offer more effective segregation of the solid phase from the liquid phase, by reducing the amount of swirling of the solid within the liquid experienced during its collection.

Other material transport means may be used in place of 801 and 802, without departing collection means from the scope of the invention as set forth herein.

BB. Equilibrium Belt Sorters for Other uses

In the event that belt sorting apparatus becomes a fairly standard mechanism for sorting sewage or other liquid and solid combinations, such apparatus might be economically exploited in land-locked areas by constructing suitable flotation ponds in which such apparatus could be floated. Such ponds could be constructed by fairly standard techniques, involving damming a naturally occurring stream of water, or other technique. One technique which has been found relatively economical for constructing a pond on relatively flat land has been the construction of an earth berm, with the pond formed contained therein, and made watertight by installation of a suitable pit liner, of which several types are commercially available. Similarly, processes for sorting relatively less dense fluid on a surrounding medium of relatively more dense fluid might also be used in such artificial surrounding media. Such apparatus might be relatively less expensive than alternative ways of performing the same functions. This reduction in expense might arise partly from capitalization of tooling and construction facilities being distributed over a broader base, facilitating mass production. Much equipment used for such processing now represents substantially on-site construction, which might benefit less from mass production techniques than could be the case with devices of the type described herein.

CC. A Floating Sewage Processing Plant

Figure 13:
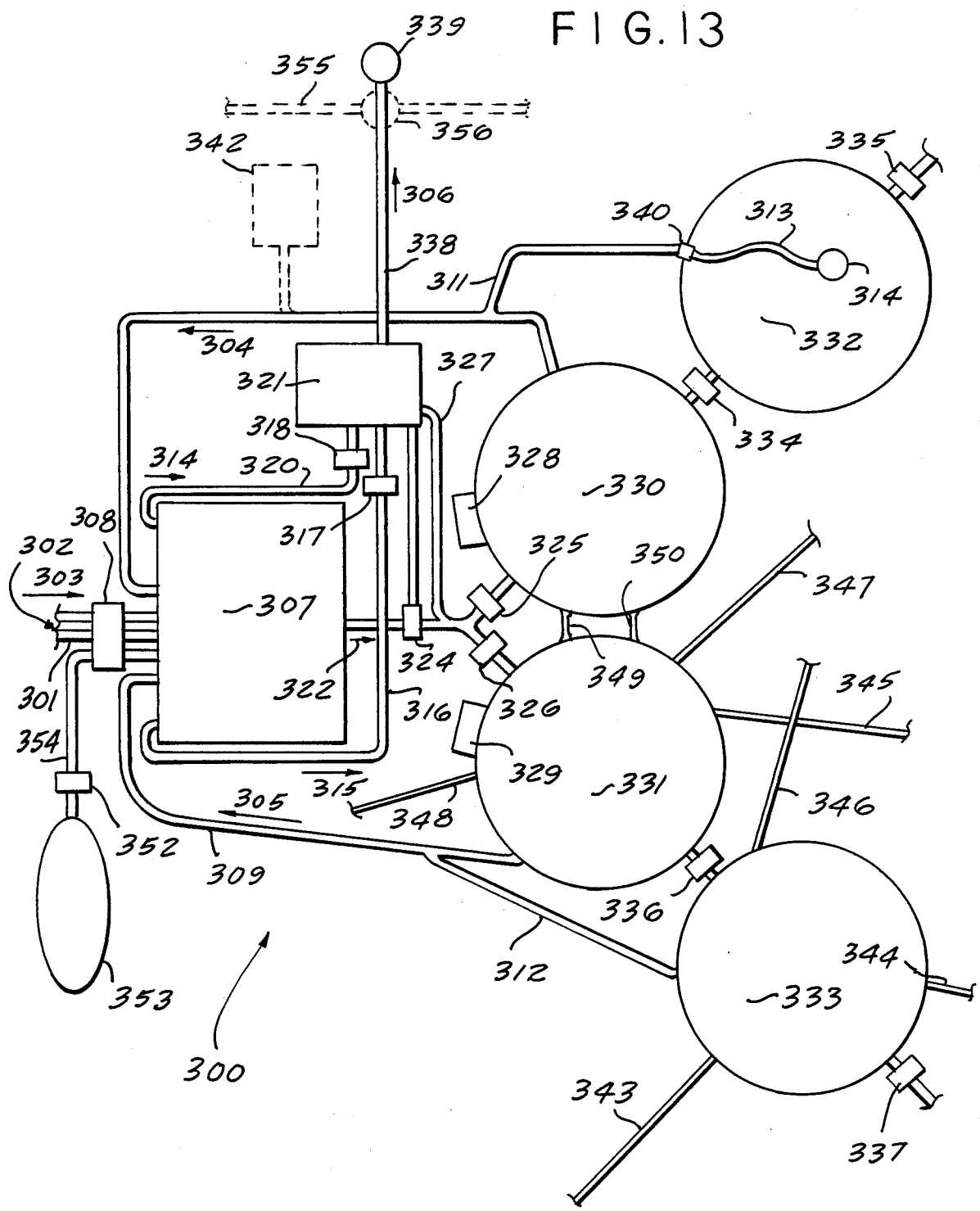
FIG. 13 shows a generalized system for performing multiple functions in the processing of sewage.

A general system for processing sewage is shown diagrammatically in FIG. 13. In various systems, various features might be incorporated redundantly, with more of a particular type of device used than is shown, in others, some of the devices shown might be Omitted. The general plant is designated 300. Sewage to be processed enters in the region 301 through equiducts 302 moving in the direction of arrow 303. It passes through suitable flow control means, 308, and then enters sorter 307. Light and heavy fractions of the debris leave the sorter through suitable equiducts, 320 and 316, moving in the direction of arrows 319 and 315 through suitable flow augmentation and/or control means 318 and 317, respectively. These procede to processor 321. Processor 321 can be one of several devices, or a combination of them. It can include facilities for reclaiming metals, glass, or plastics; it can include a thermal power plant, or other power generating or heat generating facility; or it could include various chemical extraction or reaction facilities for transforming various components of the debris into other forms: For example, some of the carbonaceous material contained in the debris might be transformed, by reaction at high pressure with water and/or hydrogen gas, into a hydrocarbon suitable for use as a fuel. Debris left after processing in 321 is transmitted in the direction of arrow 306 through equiduct 338 to dispersal head 339. Dispersal head 339 would be equipped with suitable means to position it and move it, to allow proper dispersion of debris over a wide region. Under some circumstances, such a combination of equiduct 338 and dispersal head 339 would be unnecessary. For example, a processing plant located off the continental shelf would not be likely to need to disperse the rejected wastes. In the event that processor 321 includes some process which rejects heat, it could be desirable to use this heat for heating fluid going to subsequent fermentation or aquaculture ponds, in order to increase the rate of activity therein. Fluid from which 30 debris has been segregated proceeds through equiduct 323 in the direction of arrow 322 through suitable flow control or augmentation means 324. Subsequently, this proceeds to processor 321, in the event that heating is to be performed, and from there through equiduct 327 to branch through two flow control means, 325 and 326, into equiponds 330 and 331. These equiponds are equipped respectively with aeration or oxygenation means 328 and 329. These equiponds might, for example, be utilized for the biological decomposition of sewage. Alternatively, equiponds 330 and 331 might be covered with a membrane as is illustrated in FIG. 1, and labeled 10 therein, to accumulate methane for use in thermal power plant 321. In that case, aeration would not be used, and the biological processes utilized in the degredation would be essentially anaerobic. After processing in equipond 330, material moves through flow control or augmentation means 334 into equipond 332. From equipond 331 material moves through flow control or augmentation means 336 to equipond 333. Equiponds 332 and 333 contain substantially processed material which could serve as nutrients for aquaculture. In ponds 332 and 333 might be grown fish, shellfish, mollusks, or other suitable aquaculture organisms. Heat from a processor, 321, could be advantageous in substantially accelerating the rate of maturation of such organisms. A cleaning mechanism 314 is illustrated operating in equipond 332. It is connected by a flexible equiduct 313 to a suitable junction 340, which delivers its contents to equiduct 311, and subsequently to equiduct 310, and thus to the input of the processing system to re-enter sorter 307. Alternatively, the material, instead of re-entering the process, could move through an optional equiduct 341, to optional disposition region 342, which might, for example, be a barge loading dock. Cleaning device 314 would be used for cleaning sediment from the bottom of equipond 332. Such sediment might be used as fertilizer. A similar arrangement is shown for equiponds 330 and 331, with equiduct 312 joining equiduct 309 to feed material in the direction of arrow 305. These equiducts would be used in conjunction with suitable mobile cleaning heads for cleaning the equiponds. After culturing or other utilization in equipond 332 and 333, liquid is allowed to pass through suitable flow control or augmentation means 335 or 337, respectively, into the ambient medium. Such outflowing liquid might, alternatively, be collected in equiducts, not shown, and transported to another region where it might be used for some other purposes. For example, suitably processed effluent delivered from these outlets might be desirable as irrigation water because of nutrients which it might carry. Alternatively, such effluent, carrying nutrients and processed to a level of biological safety, might be utilized in aquaculture elsewhere, for example in the cultivation of shellfish.

Depending upon the type of processing required and the energy balance of the sewage and other material transported into this processing plant, additional energy might be desirable. In that case, processor 321 might, for example, include a nuclear power plant. The waste heat from this plant could be utilized in heating the equiponds to increase the rate at which biological processes occurred. In the event that energy is produced in processor 321, whether it be directly produced from the material processed or produced from an auxiliary source of energy, the energy could be utilized in actuating the flow of fluid in flow augmentation means located elsewhere in the system, or might be sold as a by product.

It is interesting to note that the performance of a processing plant of the type designated 300 in FIG. 13 might be substantially enhanced by a balanced input, including sufficient energy in the form of various types of waste materials. Thus, it might be advantageous to combine the solid wastes from a municipality in slurry form with its sewage, so as to increase the energy content of the sewage. Also, thermal pollution from power plants used to provide power for the municipality might also advantageously be used for heating the material transported within the equiduct, so that the temperature available in the equiponds would be raised, and the time required within the equiponds for satisfactory processing of the sewage decreased.

DD. Anchoring

Depending on the circumstances, various anchoring means might be utilized to confine the processing plant to a range of locations intended, in the design of the equiducts feeding it, and in its operation. Such anchoring could be provided, for example, by cables designated 343, 344, 345, 346, 347, 348 and others not shown. Alternatively, in the event that cable anchoring were unsatisfactory, thrusting mechanisms could be incorporated at various locations among the equipond power plant, sorter, and other facilities, so as to allow the entire processing plant to be moved in the fluid supporting it. Links among the various portions of the processing plant, here illustrated by links 349 and 350, could under many circumstances be desirable to control the relative locations of the portions of the processing plant. Such links would desirably have substantial elasticity, so as to allow the various portions of the plant to change their relative positions and their relative velocities without abrupt concentrations of stress, either by the localization of stress to a small portion of structure, or by localization of the change in momentum to a small enough interval of time to give rise to large forces. Thus, elastic members and suitable force distributing members would be desirable. One such force distributing member, 351, is illustrated at the junction between link 350 and equipond 330.

In addition to the processing facilities shown in FIG. 13, submerged pods, such as the equipods described in my copending patent application No. #2, might be incorporated into such a facility to hold accumulated biologically active sludge, and collect therefrom the emitted gases, such as methane to provide power for a processor 321. Another use for equipods in such a system can be the smoothing of surges. For such a use, an equipod 353 is shown connected to suitable flow control means 352 and equiduct 354 into control means 308 through which sewage enters the processing plant. This equipod could be used for storing surges associated with peak loads, such as storms, in order to allow the processing plant to operate relatively more effectively. Provision might advantageously be made for allowing evolved methane gas from such an equipod to be utilized in processor 321, through a suitable gas conveying link:, not shown.

During operation as a concentrator for use in an extended river system, for example, this processing plant could feed its concentrated debris through outlet tube 338 into equiduct 355, through suitable coupling 356. Equiduct 355 could be a multiple equiduct system, rather than a single equiduct, and could be used for transporting the concentrated debris over extended distances. Such a configuration of concentrating processors and subsequent transport of concentrated debris might be especially advantageous in river systems such as the Mississippi and the Colorado, or in other long rivers.

In order to provide for proper growth of organisms within the equiponds, it might be desirable to add nutrients to the material entering the processing plant. Such addition of nutrients could be done by adding, material to the equiducts at some convenient location before the material enters the processing plant. For some types of additives, the addition could be made directly to the equiponds. Such an addition could be made utilizing the equiducts transporting material to the equiponds as mixing chambers, utilizing the flow to provide adequate stirring so as to insure a relatively uniform distribution of the additive throughout the equipond.

EE. Solids Reclamation and Staged Sorting

Various solid components which might be transported with sewage, or which might be transported within an equiduct in the course of solids removal, might advantageously be sorted and reclaimed. For example, such solid material might be sorted from its carrying fluid in a series of sorters of the type generally described in connection with FIG. 9. Each such sorter might be configured and fed in such a way that only a portion of the solid material was segregated within it. Thus, a sequence of such sorters might be used to segregate solid material with different sedimentation or flotation rates. In the first such sorter, one could expect to find relatively dense materials such as ceramics and metals. In the second, one might find material which settles less rapidly, such as many plastics or composite items. In the next, one might expect to find such materials as paper, wood, leather, and the like. In a subsequent one, one might find garbage of the general type of rinds from fruits, seeds, and things of this sort. The details of where the various components of the solid material come out depend upon the nature of the material and also upon the rate of rise or sedimentation within the transporting fluid. Thus, a finely divided material with a relatively higher density might be carried further in such a system than if it were in the form of larger particles. In order to make fine particles come out of the suspension more rapidly, various clumping agents can be introduced. These can be introduced between successive stages of sorting, or upstream of the sorting system. For example, such clumping agents might advantageously be introduced into an equiduct so as to be well mixed with the material transported before the material reached a sorting system.

The sorting system shown in FIG. 13 could advantageously be a belt sorter or a series of belt sorters, a sorter using flotation of less dense fluid on more dense fluid, or a combination of these devices, depending upon the surrounding medium and the fluid being processed. As is discussed elsewhere herein, processing of material at a substantial depth within the surrounding liquid can be combined with other forms of processing. Thus, processor 300 might include deeply submerged portions of a type which is discussed elsewhere herein.

FF. Submerged Sewage Processing

Under a wide variety of circumstances, it can be desirable to have sewage processing performed substantially or entirely below the surface of a body of water. For example, in an extended river system, it may be inconvenient to place processing plants floating within the river. Under some circumstances, weather conditions, including formation of ice, possibility of gale force winds, hurricanes, etc., may make it highly economically advantageous to construct a sewage processing facility which is not exposed under normal circumstances to the weather and upper environment of the body of water. A third consideration is the possibility of interference with navigation, which can be avoided by using a system which is entirely or substantially submerged. Under other circumstances, aesthetic considerations might guide the choice of installation. A substantially submerged processing facility might be made relatively inconspicuous, and thus avoid detracting from the aesthetic value of bodies of water. In accordance with this invention apparatus required for a substantial portion of the processing of sewage can be designed in such a way as to allow submerged operation. For example, equiducts can be used as extended mixing and reaction vessels within which chemical and biological activity can occur. Equipods can be used as chambers within which chemical, biological and some physical processing steps can be performed. For example, within an equipod, sedimentation can be used to segregate heavier and lighter components from sewage. A belt type sorting system of a type discussed elsewhere herein, can be adapted for use fully submerged. Fluid equilibrium conditions, applying within and without such a belt processing system when submerged, render the required strength for a submerged device substantially the same as that required for a device which would float on the surface of a substantially undisturbed body of water. Sorting steps of the type discussed for an open sorter can be performed in a submerged system using an open bottom dome of a type discussed elsewhere herein. Stability conditions for equiducts, equipods and domes containing biologically active material, sludge, debris, and dissolved gases, are discussed in detail in my co-pending application *2. Means for introducing and removing dissolved gases in an equiduct system are discussed in detail in my co-pending patent application *1. These discussions of details of apparatus for use in such processing systems will, for the sake of brevity, not be repeated here.

GG. Equiducts as Extended Processing Vessels

Equiducts offer several advantages as extended chemical processing vessels. Within an equiduct, motion of the fluid can be used to prevent the segregation of debris. Thus, the debris can be exposed to swirling fluid and acted upon chemically and biologically. A second consideration is that material can be transported within the equiduct while reactions are occurring. Thus, the material at a portion of the equiduct can be generally characterized by a particular state of completeness of the reaction in question. Thus, by preventing mixing of relatively unreacted material with relatively completely reacted material, the equiduct allows reactions taking place within it to be performed substantially more completely than might be the case were a single chamber used in which such mixing could occur. In this way, an equiduct is comparable to a very large number of reaction chambers within which successive portions of reaction occur in small degrees and among which material is moved sequentially. Thus, the use of a single equiduct reaction vessel allows replacement of much more complicated arrangements of processing vats and vessels. Another substantial advantage of transporting material while it is being processed is that a desirable feature of the overall processing is often that the material being processed be delivered at a location remote from that where it was received. For example, in an extended river system, such processing might be implemented during the transport of sewage, thus achieving two objectives with the same equipment.

HH. Dissolved Gases in Submerged Processor: Ease of Using High Pressure

A substantial advantage of submerged processing of sewage is that the partial pressure of gases contained within the sewage can be manipulated over a wider range of values than can readily be accommodated when the fluid is subject only to atmospheric pressure. This is discussed in considerable detail in my co-pending applications *1 and *2. Essentially, submerging an equilibrium fluid-containing vessel to a depth within a liquid allows the pressure at that depth within the liquid to act upon the vessel and to allow it to contain gaseous partial pressures roughly comparable to the external pressure applied to it by the surrounding fluid. Thus, at the surface of a body of liquid, the available external pressure would only be essentially atmospheric pressure. At a depth of approximately 30 feet within a body of water, this pressure would be augmented by the addition of another atmosphere of pressure associated with the water pressure. Thus, the absolute pressure at that depth would be approximately two atmospheres. This increase in ambient pressure allows a higher pressure within the fluid contained within the equilibrium vessel. For example, suppose one were to dissolve air in water at substantially atmospheric pressure. The partial pressure of the dissolved oxygen in the water would be that which it has in equilibrium with the partial pressure of oxygen in the air. Oxygen comprises approximately one-fifth of air, and thus has a partial pressure of approximately three pounds per square inch. Thus, the partial pressure of the dissolved oxygen in the water would at equilibrium be limited to be no more than approximately three pounds per square inch.

II. Purified Oxygen at Atmospheric Pressure

By substituting substantially pure oxygen for normal atmospheric air, the oxygen partial pressure can be made substantially the same as the total atmospheric pressure. Thus, one could achieve approximately fifteen pounds per square inch pressure in the oxygen presented in contact with the water, and this would then be the upper limit for the partial pressure of the dissolved oxygen within the water. This change from normal atmospheric composition to substantially pure oxygen promotes a substantially higher partial pressure for oxygen in solution. This can be advantageous in promoting biological activity within a solution. Purification of the oxygen from the air to allow this replacement of air by substantially pure oxygen requires extensive processing equipment. However, because such processing equipment makes it possible to achieve a substantially higher partial pressure of dissolved oxygen, without requiring that the water in which the solution is present be maintained at a high pressure in complicated pressure vessels, this can be economically advantageous. Thus, the use of purification, in order to achieve a higher oxygen partial pressure, can reduce the overall operating costs for certain types of sewage processing facility. The desired chemical process which is occurring here is the increase in partial pressure of oxygen in solution.

JJ. Air at High Pressure in Deep Equilibrium Vessels

An equilibrium vessel, submerged to a substantial depth in a body of liquid, can tolerate within it a substantial total pressure. This total pressure is balanced by external liquid pressure, and does not require additional strength in the walls of the equilibrium vessel. Thus, it is feasible to achieve a high total pressure of dissolved gas by using these fluid equilibrium properties to allow the system involved to operate at a high total pressure. To give a specific example, in fresh water the pressure increases with depth at a rate of very nearly one atmosphere of pressure for every 34 feet of depth. Oxygen constitutes very nearly 20.95 molecular fraction percent of standard atmosphere. Thus, going to a depth of water which adds to atmospheric pressure nearly four atmospheres more total pressure, leads to a total pressure sufficiently great so that when air is compressed to that depth, its partial pressure of oxygen is substantially the same as the partial pressure of oxygen which is achieved at atmospheric pressure by replacing normal atmosphere with substantially pure oxygen. This depth is very nearly 128 feet in fresh water. Thus, by operating an equilibrium vessel at a depth of 128 feet, one could achieve, merely by introducing air, a dissolved oxygen content substantially the same as can be achieved by replacing normal atmosphere with substantially pure oxygen at normal atmospheric pressure. In this case, however, the machinery which would be required for separating oxygen from the atmosphere to allow it to be provided in substantially pure form would be unnecessary. Instead, all that would be required is suitable pumps to pump ordinary atmospheric air to a depth of approximately 128 feet. Such an operation would require substantially less equipment than the separation of oxygen from air. Merely by going to a greater depth than 128 feet, the dissolved oxygen content of water exposed to air at that depth can be made greater than the dissolved oxygen content of water exposed to pure oxygen at atmospheric pressure. Thus, merely by operating at a depth greater than 128 feet, a simple system could produce a partial pressure of dissolved oxygen in water, which could not as readily be achieved without the use of pressure vessels in a system operating substantially at the surface of a body of liquid and subjected only to normal atmospheric pressure.

KK. Purified Oxygen in Deep Equilibrium Vessels

By using substantially pure oxygen instead of air, and combining this use of substantially pure oxygen with operation in an equilibrium vessel at a substantial depth in a body of liquid, a total dissolved oxygen partial pressure many times greater can be achieved. For example, in the preceding case, with operation at 128 feet depth in fresh water ambient liquid, the partial pressure of oxygen in solution might be made as great as twenty-five times that which could readily be achieved by the use of ordinary air at atmospheric pressure.

LL. Saving Liquid Pumping Power by Equilibrium Pressurization

Were pressure vessels to be used which were not in fluid equilibrium with their environment, it might be necessary to use substantial amounts of energy to pump liquid into such vessels. Such energy could then be largely reclaimed upon release of liquid from the vessel, but not totally reclaimed by conventional techniques. This would represent a substantial loss of energy in operation. Alternatively, liquid could be flowed in such vessels, then pressurized and used in processing, then the pressure relieved, and the liquid allowed to flow from the vessels. This would be a batch processing technique. It has the undesirable features of requiring the availability of large capacity high-pressure vessels and the availability of suitable holding containers to hold liquid inflow for forming batches for processing. In contrast, an equilibrium vessel system, with the surrounding fluid and the contained fluid having substantially the same density, does not require substantial energy to transport the contained fluid to the depth at which the vessel is located. This is because it has substantially neutral buoyancy in the surrounding medium. Thus, a continuous process can be implemented without the use of substantial energy for introducing liquid into the processing region. When liquid ascends from the processing region, gas can be evolved therefrom. In my co-pending application *1, I discuss the use of such evolution of gas in flow augmentation. Under some circumstances, use of gas evolution for flow augmentation during ascent of liquid from a deep processing region could make unnecessary additional flow augmentation means within the processing system itself.

The absence of mixing between relatively processed and relatively unprocessed material, available when processing is performed within a submerged equiduct, could increase the efficiency with which dissolved gas were used in supporting biological processes when compared with the efficiency which might be obtained in a batch processing system. Thus, were relatively purified oxygen used in such a system, the greater efficiency of use of dissolved gas could reduce the amount of oxygen which need be separated from atmospheric air to supply the process. This could lead to a reduction in operating costs. Similarly, relatively efficient use of dissolved gas would reduce the amount of pumping energy consumed in pumping either relatively pure oxygen or atmospheric air to the pressures required for introduction into the reaction region, thus allowing further savings. Such reduction in gas use also could be reflected in reduced capital equipment costs for handling the gas used.

MM. Availability of Sunlight for Photosynthesis

Note that the use of processing in an equilibrium vessel at a substantial depth substantially precludes the use of sunlight for actuating photosynthetic processes. Thus, processes to be performed in such vessels would be limited to aerobic and anaerobic processes not requiring photosynthesis. One exception to this would be in places where water is so clear as to allow sunlight to penetrate to depths sufficiently great to allow illumination of substantially submerged equilibrium vessels. In some tropical oceans and in some lakes, water has a clarity sufficiently great to make this possibility interesting. In some cases, a large equipond containing clear water might be used to allow sunlight to reach deep equilibrium vessels, e.g., located within it.

NN. Deep Equilibrium Vessels for Smaller Equipment

Because of the substantial increase in dissolved gas partial pressure which can be obtained by the use of processing apparatus submerged at a substantial depth within ambient liquid, such designs for processing plants may allow substantial reduction, under many circumstances, of total amount of equipment required for a given processing capacity. Thus, the design and use of a submerged sewage processing plant may allow substantial economies.

OO. Heating and Dissolved Gases

Heating of water generally tends to reduce its ability to hold gases in solution. Thus, for the same total amount of dissolved gas, the partial pressure of the dissolved gas increases with increasing temperature. However, many biological processes can occur at substantially increased rates in liquid at moderately higher temperatures. The ability to simply utilize high partial pressures of dissolved gases, by merely increasing the depth at which an equilibrium vessel operates, allows advantageous use of heating of such a fluid. This is because the amount of dissolved gas present within the fluid can be kept high enough to support the greatly accelerated biological activity, despite the reduced solubility of gas in water at higher temperatures. Thus, the ability to support high partial pressure of dissolved gas allows the use of higher temperature fluid in the processing plant. This, in turn, allows the biological processes to be completed in substantially reduced time. Such increases in processing rate allow further reduction in the amount of equipment required for a given processing capacity. Thus, were an equiduct used for such biological processing, it could advantageously carry not only sewage, but also waste heat rejected from power plants or other sources along its way. This use of waste heat would increase the temperature of the sewage within the equiduct. By introducing gas, for example, air or substantially purified oxygen, into the equiduct at a substantial depth, such gas could be dissolved within the equiduct. This dissolved gas could then be at a sufficiently high concentration to support the increased biological activity associated with the higher temperature. Thus, the use of aeration or oxygenation at a substantial depth could facilitate the use of waste heat, and make it into a positive contribution to the performance of the equiduct system rather than an ecological liability. By having biological processes occur within it at a substantially augmented rate, the equiduct could contain the processes for substantially purifying the sewage in a substantially shorter distance than might be the case were such elevated temperatures and elevated dissolved gas partial pressures not available. In this way, substantially all of the biological processing to be performed on the sewage might be accomplished within equiducts used for transporting the sewage without requiring additional plants to be constructed in which sewage were processed substantially at a single location. Because a system of this type could convert waste heat from a liability to an asset, it could greatly increase the ease with which power generation systems that produce substantial quantities of waste heat might be used without disturbing ecological balances within an extended system. For example, as conventionally constructed at this time, nuclear power plants have lower thermodynamic efficiency than conventional fuel-burning power plants. Thus, for a given power output they tend to produce a substantially greater amount of waste heat. However, nuclear power plants have desirable characteristics with respect to air pollution. By using their waste heat in desirable processes within an equiduct system, the thermal pollution problem otherwise associated with nuclear power plants could be substantially eliminated under many circumstances. This might allow more rapid introduction and more widespread use of this desirable form of power production, thus facilitating the decrease in pollution in the air.

PP. Varying Flow Velocity in Equiducts

As is discussed in my cd-pending application *5, it is not necessary to operate an equiduct at a uniform flow velocity. For example, to conserve pumping power, an equiduct might be operated at a substantially reduced velocity for much of the time, with the velocity increased to a level high enough to suspend and remove sediment for only a relatively small portion of the time. Thus, the equiduct could be maintained substantially free cf debris, without requiring that it operate normally in a flow region in which the energy per unit fluid transported was as great as that which occurs for substantially elevated flow velocities. This is a question primarily of economics, with the tradeoff being between cost of pumping fluid and cost of construction of equiduct and pumping stations suitable for use therewith.

QQ. Dispersion of Nutrients

When an extended equiduct system is used for processing sewage, portions of the system may contain relatively safe nutrients which might advantageously be dispersed into the ambient fluid over an extended region. In this way, the contents of the equiduct might be advantageously used in providing nutrients for aquaculture. Also, agriculture might benefit from the use of such fluid as irrigation water containing fertilizer. Such uses might be particularly interesting in the case of extended river systems, such as the Colorado and Mississippi Rivers. In such a case, agriculture is performed over extended regions near the river. Also, the geographical configuration in which the river lies would allow such fluids to be transported to sites where they might advantageously be used, with relatively small amounts of pumping energy. Were waste heat to have been used in heating such fluids, the heated fluids could be used for increasing the mean temperature of a region in which aquaculture or agriculture was desired. This increase in temperature in growth regions could allow maturation of organisms growing therein to occur in a substantially reduced time, or during a longer portion of the year. This could be of economic value.

RR. Anaerobic Processes in Equiducts

Anaerobic processes occurring within equiducts, for example, associated with the biological degradation of sewage, can give rise to gaseous byproducts. The greater the depth at which the equiduct operates, the greater the partial pressure of such dissolved gaseous byproducts the system can support before a gaseous phase appears within it. Thus, by operating such equiducts at increased depth, the frequency with which gas segregation stations need be installed might be substantially reduced. Also, flow augmentation effects associated with evolution of such gaseous material during ascent to a gas segregation station located relatively near the surface might advantageously be used in reducing total pumping power required for operation of the overall system. This is discussed in more detail in my co-pending application *1. Thus, benefits could accrue from operation of the equiduct at a substantially increased depth. One could be a reduction in capital costs associated with reducing the number of gas segregation stations and pumping stations required. Another could be a reduction in operating costs associated with reductions in power consumption and in maintenance of equipment. By facilitating a higher concentration of dissolved gas within the equiduct, operating an equiduct at a substantial depth could substantially increase the amount of gas released at each gas segregation. Thus, it might be easier to use the gas advantageously at such a station without requiring that the gas released at several stations be collected to a single location for effective further processing. For example, if an electric power generation system were to be operated from gas evolved during anaerobic biological processing of sewage, the economies of scale of such plants might allow them to operate much more economically and efficiently from a relatively higher flow of gas than might be obtained from a single gas segregation station used with an equiduct operating at substantially atmospheric pressure. Thus, operation of an equiduct at substantial depth within surrounding liquid could reduce not only the number of gas segregation stations required, but also the amount and complexity of ancillary gas handling equipment for handling the segregated gas. This could make the gas a more valuable byproduct than might otherwise be the case, or might convert the gas from a liability to an asset.

SS. Aerobic Processes in Submerged Equiducts

Operation of an equiduct at a substantial depth within a surrounding liquid could allow aeration stations to be spaced along the equiduct system at substantially greater intervals than might otherwise be required to support the biological activity therein. Thus, the number of aeration or oxygenation stations required might be substantially reduced. This could lead to a reduction in capital costs and maintenance costs. Other advantages mentioned above might also accrue to operation of an equiduct at substantial depth.

TT. Biological Activity Byproducts

Many biological processes can be hindered by excessive concentration of their own byproducts. For example, fermentation of sugar into alcohol is limited by a high concentration of alcohol. Similarly, processes can be limited by excessive concentrations of dissolved carbon dioxide. For this reason, it may be desirable to use techniques which flush dissolved gases from the fluid within the equiduct at gas segregation stations, to reduce the amount of byproducts remaining in the fluid within the equiduct and allow the spacing between such gas segregations along the equiduct system to be increased. Such gas flushing techniques are discussed in more detail in regard to gas segregation stations in my co-pending application *1.

UU. Choice of Sewage Concentration for Processing in Equiducts

The choice of concentration of sewage to be most effectively processed by biological activities occurring within an equiduct could depend partly upon the amount of gas which might be dissolved within the sewage, and the amount of byproducts which might be tolerated by microorganisms performing biological processing. Thus, it might be advantageous to process sewage which was relatively dilute, instead of a highly concentrated sewage. In such processing, a sufficient amount of oxygen might be dissolved in the water containing the biologically active material to allow the processing to be substantially completed without additional oxygenation. Also, $CO_2$ or other byproducts from the biological processing might be contained as dissolved gas, without achieving a sufficiently high concentration to inhibit the activity of the microorganisms. Thus, the processing might be completed with one stage of oxygenation, and followed, if desired, by a stage of gas segregation to remove byproducts. Were a substantially more concentrated sewage to be processed, a sequence of oxygenation and gas segregation stations might be required to oxygenate the sewage and then remove the byproducts, reoxygenate, etc., so as to keep the oxygen level high enough and the dissolved byproduct level low enough to provide a proper environment for the growth of the microorganisms used in processing the sewage. The choice between use of substantially purified oxygen or use of air or some mixture of these two for purposes of oxygenation of sewage would depend upon economic considerations. Included in such considerations could be geographical constraints, such as the depth of the body of water available to contain the equiduct or other equilibrium processing vessel. In regions where only shallow bodies of water were available, such as relatively shallow rivers, oxygenation might be more economically desirable than in regions where quite deep bodies of water were available to support a high total pressure of dissolved gases within the fluid in the equiduct.

VV. Special Microorganisms

Because of the special nature of the environment which can be produced within an equiduct or other equilibrium vessel operating at a substantial depth within a surrounding liquid, it may be advantageous to culture special organisms which perform better in such an environment than do available organisms. For example, the higher partial pressure of dissolved oxygen which can be obtained within an equiduct at a substantial depth exceeds the partial pressure of oxygen normally available to any microorganism living at atmospheric pressure. Thus, one might anticipate that specially cultured organisms might be developed which use this higher oxygen partial pressure more effectively than do existing organisms. Similarly, the high partial pressure of $CO_2$ byproduct which can be sustained within the equiduct may make it economically desirable to develop organisms which thrive in the presence of a high partial pressure of $CO_2$. Under such circumstances, the spacing along an equiduct system of gas segregation stations might be increased, compared to what might be required were conventional organisms used. Additionally, increasing the temperature at which the growth medium operates could be more advantageous for some microorganisms than for others. Because this combination of high partial pressure of dissolved gases and elevated temperature represents a significant departure from the normal growth environments for many terrestrial microorganisms, a special program for developing special microorganisms and for culturing them might allow design of future systems with significantly reduced capital equipment requirements. For example, tailoring microorganisms to tolerate higher byproduct concentrations could reduce the interval between gas segregation stations. Microorganisms which could tolerate and operate more effectively within higher temperatures could reduce the total amount of time required for processing to be completed, thus reducing the volume of chambers used for such processing or the length of equiduct required.

Facilities and systems such as those set forth in this patent application and my co-pending patent applications *1, *2, *3 and *5 present a large range of possible applications of genetic engineering, such as, by way of example and without limitation; disposal of sewage; disposal of industrial wastes; use of sewage and/or other sources of material for the production of chemicals useable as feedstock in place of petrochemicals and/or oil in industry, for fuel, for making plastics, for fertilizer, etc.; production of fuel gas; production of biochemicals; etc. Genetic engineering might be used to make microorganisms which thrive within special environmental conditions provided within such facilities, but do not ordinarily survive in the outside environment, thus providing another built in form of safety protection.

Products from special microorganisms in such systems might be of sufficient value to substantially offset operating costs; and might, in a highly automoted and/or otherwise suitably designed system, provide for operation at a net profit, thus greatly improving the perceived economic value of pollution control.

WW. Special Microorganisms to Process Industrial Wastes

Certain types of industrial wastes might be processed in separate equiducts before being introduced into a main equiduct system. Specially tailored microorganisms might advantageously be used for detoxifying such wastes. Additionally, valuable material might be reclaimed by biological concentration in such microorganisms.

XX. Microorganisms to Produce Feed Products

Because of the large amount of nutrients which could be anticipated in equiduct systems transporting sewage, it could be economically highly advantageous to develop microorganisms which convert this nutrient material into desired products. For example, microorganisms might be developed which grew in the medium and used its special features and provided protein with tailored amino acid ratios of a high grade for use as protein supplements for feeding livestock, or for use in supplying nutrient requirements for aquaculture, or possibly for use as a food additive for some human societies. For example, large quantities of mollusks or other shellfish might advantageously be grown in warm, detoxified effluent which had been substantially fully processed by suitable anaerobic or aerobic microorganisms so as to render it suitable for use as food for such aquatic organisms.

YY. Microorganisms to Produce Fuel, Plastics, Chemicals, or Pharmaceuticals

Where their nutritive value was not desired, special microorganisms might be developed which could produce products suitable for industrial processes. For example, microorganisms cultured within equiducts might be then used as raw material for the production of hydrocarbon fuels or other hydrocarbon materials, such as plastics. Additionally, pharmaceutical products might be produced by culturing suitable microorganisms within equiducts. In this way, a product of pharmaceutical or chemical value, from a microorganism which might otherwise be difficult to culture economically, might be produced by using the large-scale culturing capabilities of an extended equiduct system.

Depending upon the volume of special culture cells which need be introduced within the equiduct upstream in order to allow special cultures to grow effectively within such an equiduct, the microorganisms introduced might be transported to the site of introduction by various means. If relatively small quantities were to be used, they might advantageously be transported by conventional means. In the event that substantial quantities of such microorganisms were advantageously used at an introduction point in the equiduct system, a small equiduct system might be utilized for transporting fluid in the reverse direction to the flow of the main equiduct. Such a system might have a capacity of perhaps one percent to one thousandth of one percent of the capacity of the main system, and still be able to effectively transport the microorganisms required to maintain the culture within the equiduct. Under such circumstances, recycling of a small portion of the culture, extracted downstream and reintroduced upstream in an equiduct, could effectively convert the equiduct into a closed loop biological system with respect to that culture. Of course, suitable provision could be made to reintroduce the culture in the event that physical, chemical, or biological accident destroyed it.

ZZ. Aquatic Organisms in Equiducts; a Food Chain

Special larger-scale organisms might also be introduced within the high-pressure environment available within equipods and equiducts at a substantial depth within a surrounding liquid medium. Behavior of most marine organisms under such conditions of substantially enriched oxygen content in fluid, and substantially enriched nutrient content, are thought to have not been well studied as of this date. It is likely, however, that such organisms could advantageously be bred to use the special environment available within such systems. Thus, larger scale organisms might advantageously be produced with very high maturation rates under these special environmental conditions. These could then be an economic asset. For example, they could be used as food supplements, as types of fertilizer, as raw materials for subsequent chemical processing, or as an additional step in a food chain to yet higher organisms such as food fish or food animals.

AAA. Submerged Equilibrium Belt Sorters

Figure 16:
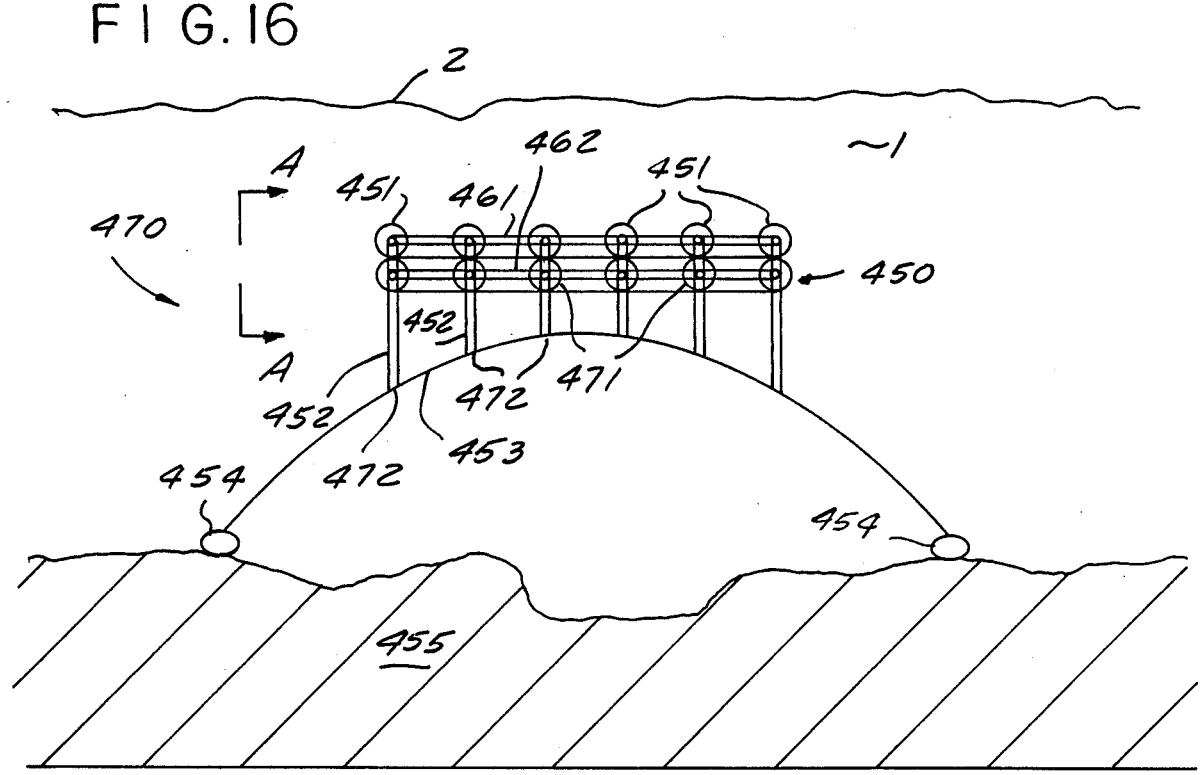
FIG. 16 shows a belt sorting system located below the surface of a surrounding liquid.

Were an equilibrium belt sorter of the type described in connection with FIGS. 9 through 12 fully submerged, the stabilization effect of allowing the upper portion of the belt to rise and fall above and below the upper surface of the surrounding liquid, could be no longer available to constrain the position of the sorting system. Thus, some additional constraint might be desirable. The location and nature of such a constraint could depend upon the buoyancy of the complete sorting assembly, and also upon the buoyancy of components of it, especially the belt and the contained fluid. For example, in FIG. 16 is depicted a belt sorting system 450 containing fluid 3 and located submerged below surface 2 of surrounding fluid 1. In FIG. 17 is depicted view aa of the apparatus in FIG. 16. In this case, the entire system 470 is presumed buoyant in liquid 1. This positive buoyancy facilitates the use of tension member anchoring system to attach this apparatus to the bottom 455 of liquid 1. In order to constrain the belt to follow essentially the same path followed in FIG. 9, a series of upper rollers 451 is incorporated in the construction of the device. These upper rollers are located directly above corresponding rollers within the belt sorting system. The belt is then given a net positive buoyancy so that additional constraining rollers are not required to be located below those rollers within the processing system. Instead, the buoyancy of the belt holds it against its internal rollers, as was the case in FIG. 9. Upper rollers 451 can optionally be spaced by suitable connecting links 461. The upper rollers are connected to vertical members 452, which are also connected to the rollers within the sorting system itself. These inner rollers are separated by suitable links 462. Because upper rollers 451 are connected to inner rollers 471 by links 452, either internal separating links 462 or external separating links 461 are optional, or the roller spacings may be provided by cable 453. Vertical members 452 continue to connect to cable 453 at suitable junctions 472. Cable 453 then transmits the lifting force to anchors 454, by which it is anchored to bottom 455. If the distribution of buoyancy within system 470 is substantially uniform, then the shape of cable 453 will be very nearly that of a segmented, inverted parabola, in which each segment is substantially straight. In FIG. 17 is shown view aa of apparatus 470. Broken lines 456 indicate that cables 453 continue below. An upper roller 451 is shown in more detail. Upper roller 451 has truss-type internal structure 458 to allow it to transmit buoyancy forces from sorting system 450 located below it to vertical members 452 at its ends. Continuous roller members 457 are spaced along truss structure 458. These rollers 457 make contact with the upper surface of the belt used in belt sorter 450. Rollers 471 within belt system 450 connect to vertical members 452 at suitable bearings 460. Similarly, upper rollers 451 connect to vertical members 452 at suitable bearings 459. If desired, guides for rollers 457 can be included in the belt used in sorter 450 on the outside surface, just as guides were included on the inside surface to guide the internal rollers and belt relative to each other.

A configuration such as 470 of FIG. 16 might be used to process fresh water sewage in an ambient of salt water. Under such circumstances, the buoyancy forces which are borne by upper rollers 451 are only a few percent of the total weight of fluid contained within belt sorting system 450. Note that dynamic instabilities discussed in connection with sedimentation of a dense sediment in equiponds do not appear in the operation of a belt sorting system. This is because the belt is continuously moving. However, the possibility of such dynamic instabilities requires that the belt move with at least a minimum velocity, which can depend in part upon the nature of the fluids processed and the materials transported therewith. Note, also, that the spacing of external rollers 451 may optionally be made smaller than the spacing of internal rollers 471, with additional vertical members 452 provided to connect such additional rollers 451 with cable 453.

If the fluid contained within the belt sorter is of substantially the same density as the surrounding fluid, then the system could have substantially neutral buoyancy. Under such circumstances, it might be anchored in a desired location within a body of liquid by providing suitable flotation or anchoring means. However, in the event that a substantial amount of solids are transported with fresh water sewage, the mean density of the total material, including fluid, contained within the belt sorting system could typically be expected to be somewhat greater than the density of fresh water. Thus, if such a system were operated in a fresh water ambient, it could have net negative buoyancy. Of course, a positively buoyant belt could be used to provide net positive buoyancy, if desired. In FIG. 18 is depicted a simple means for supporting such a belt sorter system 450. This means could consist of a suitable truss 474 supported at suitable locations by supports 475. These supports need not be located all the way to the ends of truss 474. Location of supports 475 may be substantially influenced by the shape of bottom 455. External rollers 451 are supported in suitable bearings anchored to truss 474. Vertical members 452 are used to locate internal rollers 471 of belt sorting means 450 with respect to external rollers 451. Note that the spacing of external rollers 451 is not necessarily the same as that of internal rollers 471. Additional rollers might be added as desired. However, vertical means 452 would only be associated with internal rollers 471. In a configuration of this type, the belt of belt sorter 450 might advantageously be constructed to have somewhat negative buoyancy. This negative buoyancy could cause it to remain in contact with internal rollers 471, thus defining its position and facilitating the control of the geometric configuration of the belt sorter. This complete apparatus is generally designated 480. In FIGS. 16, 17 and 18, feeds and outlets from the belt sorting system have been omitted for the sake of clarity.

BBB. Processing in Submerged Equipods

When it is not desired to use processes in which the partially processed material is segregated from the more completely processed material, or when it is not desired to transport the material during processing, equiducts may be replaced by equipods. Equipods, as discussed in my co-pending application *2, are submerged vessels made with a flexible membrane whose internal pressure and external pressure are substantially in balance, which is used filled with a fluid medium and surrounded by a fluid medium. Fabrication considerations and dynamic stability of such equipods are discussed in detail in my co-pending application *2. This detailed discussion will not be repeated here. In my co-pending application *2, in FIG. 51 is shown an equipod with inlets and outlets located near the top and bottom of the interior chamber formed by the membrane. Suitable anchoring means for equipods, depending upon the density of the contents relative to the density of the ambient medium, are discussed in my co-pending application *2.

In FIG. 19 is depicted an equipod submerged to rest substantially upon the bottom 455 of a body of liquid 1. This system is generally designated 500. Equipod 527 rests upon bottom 455 at a depth 525 below surface 2 of liquid 1. Equiduct 503 carries inlet fluid 502 in the direction of arrow 501 through suitable flow control or augmentation means 504 and instrumentation station 505, to enter equipod 527 at inlet 526. The contents of equipod 527 is generally designated 3. A small portion of it may settle as sediment 520. A small quantity of gaseous material may rise to form gaseous phase 508. Material near the top of equipod 527 can exit through outlet 507, proceeding through suitable flow control or augmentation means 509, optional gas segregation station 510, and instrumentation station 514, to exit at 522. Optional gas segregation station 510 could connect, if desired, through suitable means 511 through which gas could flow in the direction of arrow 512 to gas handling station 513 located substantially at the surface 2 of body of liquid 1. Material near the mid depth within equipod 527 could exit through outlet 519 through suitable flow control or augmentation means 515 and instrumentation station 516, to exit at outlet 523. Similarly, material from the bottom-most regions of equipod 527, such as, for example, sediment 520, could exit through outlet 521, progressing through suitable flow control or augmentation means 517 and instrumentation station 518, to exit at outlet 524. Outlets 522, 523, and 524 could connect to any other portions of a system as appropriate. If desired, suitable access hatches, not shown, might be provided in equipod 527. Within equipod 527, sediment might settle from liquid and debris might rise within it. Because the cross section of the enclosed volume within the equipod is substantially greater than the cross section of inlet equiduct 503, it could be relatively difficult to establish a sufficient velocity of flow within equipod 527 to allow debris or sediment to be resuspended in liquid to insure that it could be removed from equipod 527 through the various outlet means provided. Thus, it would seem relatively desirable to have at most a relatively small amount of rising or settling material included in contents 3 within equipod 527. By locating outlet 507 at substantially the highest portion of equipod 527, accumulation of a gaseous phase 508 within equipod 527 may be substantially prevented. This may be desirable, in accordance with the principles set forth in my co-pending application *2, in controlling the buoyancy of equipod 527. Because only outlet 507 could be expected to carry gaseous phase 508, only that outlet is shown provided with a gas segregation station. Thus, the contents exiting through outlets 522, 523, and 524 could be anticipated to contain substantially negligible gaseous phase.

CCC. Augmented Solution of Gases at High Pressure in Deep Equipod Aerobic Processes Depth 525, at which equipod 527 is located, can be quite substantial. Under such circumstances, the foregoing discussion of solution of gases in liquid at substantial pressures, associated with positioning an equilibrium vessel at a substantial depth within a surrounding liquid medium applies also to content 3 in equipod 527. Suitable gas handling equipment might advantageously be located in equiduct 503 prior to entrance through inlet 526. Such gas handling stations are discussed in detail elsewhere herein, and in my co-pending application *1. This detailed discussion will not be repeated here. For example, at the pressure occurring at the depth at which equipod 527 is located, a substantial quantity of oxygen might be dissolved within liquid 3. This could allow biological processes to occur at a high rate. The rate at which such biological processes occurred might be augmented by previously heating fluid 3 when it was traveling in equiduct 503 or before. Waste heat, for example, might be used for such heating.

DDD. Anaerobic Processes

Alternatively, processes occurring in equipod 527 might be anaerobic. In that case, the high pressure present in fluid 3 associated with the depth at which the equipod is located, might be used in order to allow a higher partial pressure of product gases to dissolve in liquid 3. Thus, gaseous phase 508 might not appear within the equipod. Or, anaerobic processes might be used to evolve gas within equipod 527. This could occur, for example, if the concentration of biologically active material were sufficiently great to allow the amount of gas produced to exceed the amount which could readily be dissolved within liquid within the equipod. Under such circumstances, gas evolved within the equipod could be made available at gas handling station 513 at a substantial pressure. This pressure might then be used to distribute it to other locations or to assist in further processing it.

EEE. Temperature Rise Due to Biological Activity

In the event that biological processes occurred within relatively concentrated biological material contained within equipod 527, the thermal conductivity of this material and the thermal conductivity through the wall of the equipod might be sufficiently small so that this biological activity substantially raised the temperature within equipod 527. Such an increase in temperature could increase the rate at which these processes occurred. Thus, an equipod might offer advantages for processing substantially concentrated biological material, in a situation in which the difference in volume to surface ratio between an equiduct and an equipod allowed the equipod to achieve a usefully higher temperature increase associated with the biological activity occurring within it. In an equiduct, the ratio of surface area to volume could be expected to be substantially greater than in an equipod. Thus, the temperature rise associated with biological energy release within an equiduct could be expected to be substantially smaller than that occurring within a substantially larger diameter equipod.

FFF. Introducing Gases into Equipods

Gas introduction means might be incorporated within the equipod itself, to facilitate introduction of various gases. Oxygen might be introduced directly within the equipod by suitable injection means, to increase the partial pressure of oxygen present therein. Air might be used instead. Nitrogen gas might be introduced, either for purposes of flushing from the equipod another dissolved gas, or for processes which might require the presence of additional nitrogen. Under certain circumstances, enrichment of the dissolved gas content of contents 3 might be appropriate to help various biological processes to occur.

GGG. Special Cultures in Deep Equipods

As discussed elsewhere herein, special cultures of microorganisms might advantageously be used in order to make maximum use of the special conditions which can readily be provided within an equipod operating at a substantial depth within a surrounding body of liquid.

HHH. External Gas Handling; Apparatus Commonality with Equiducts

Under some circumstances, material within the equipod might be circulated from the equipod through an outlet, through suitable processing equipment, and then returned to the equipod. In this way, gas handling stations and other equipment might be of substantially the same form as that described previously in connection with equiducts. In the event that aeration and gas segregation facilities were used in conjunction with equiducts, the ability to use similar equipment in conjunction with equipods might substantially reduce the tooling costs for construction of such equipment for use with equipods. A processing facility located substantially submerged within a body of liquid, might use a substantial number of equipods and have only a few processing facilities for processing the fluid contained within the equipods. Suitable valving could be provided to allow the different equipods to be connected to this processing equipment and to each other.

III. Multi-Stage Processing

In the event that a process could benefit substantially from having a relatively small fraction of the finished product and the raw material mixed with each other, a sequence of equipods could be used. In that case, first stages of processing would occur in the first equipod, subsequent stages in successive equipods, and the last stages in the last equipod. As the number of equipods is increased, such a processing facility becomes more and more like a processing facility in which the flow passes through an equiduct in which the processing occurred.

A simple example using equipods could be a system involving two equipods, one of which contains a culture which decomposes sewage by anaerobic processes, and the other a culture which uses aerobic processes. These might be connected with suitable gas segregation and gas introduction means, to change the state of a fluid passing from one to the other so as to extract products if desired, and/or prepare the material for the culture which it would be entering.

Equipods could be used in conjunction with other processing facilities, portions of which might be submerged and portions of which might be floated on the surface of body of liquid 1. Such floating facilities are discussed elsewhere herein.

JJJ. Depth as Protection From Damage

An equipod located relatively deep within a body of water could be relatively well protected against storms and weather and against damage arising from ice or other material floating on the surface. Thus, the strength requirements on a deeply submerged equipod might be less than for an equipod located relatively near the surface.

KKK. Partially or Fully Collapsed Equipods

Note that equipod 527 would not be substantially damaged were it to be operated less than full. The only substantial effects which might be expected could be that gaseous phase 508 might accumulate in larger amounts than might be the case were the equipod substantially filled, because outlet 507 might not then be located at substantially the highest point within equipod 527; similarly, sediment 520 might not be as readily removed through lowest outlet 521. However, equipods could be kept in a reserve state, substantially empty, occupying substantially less space than would be required were they full.

LLL. Vertically Oriented Equipods; Collection of Sludge and Gas

Figure 20:
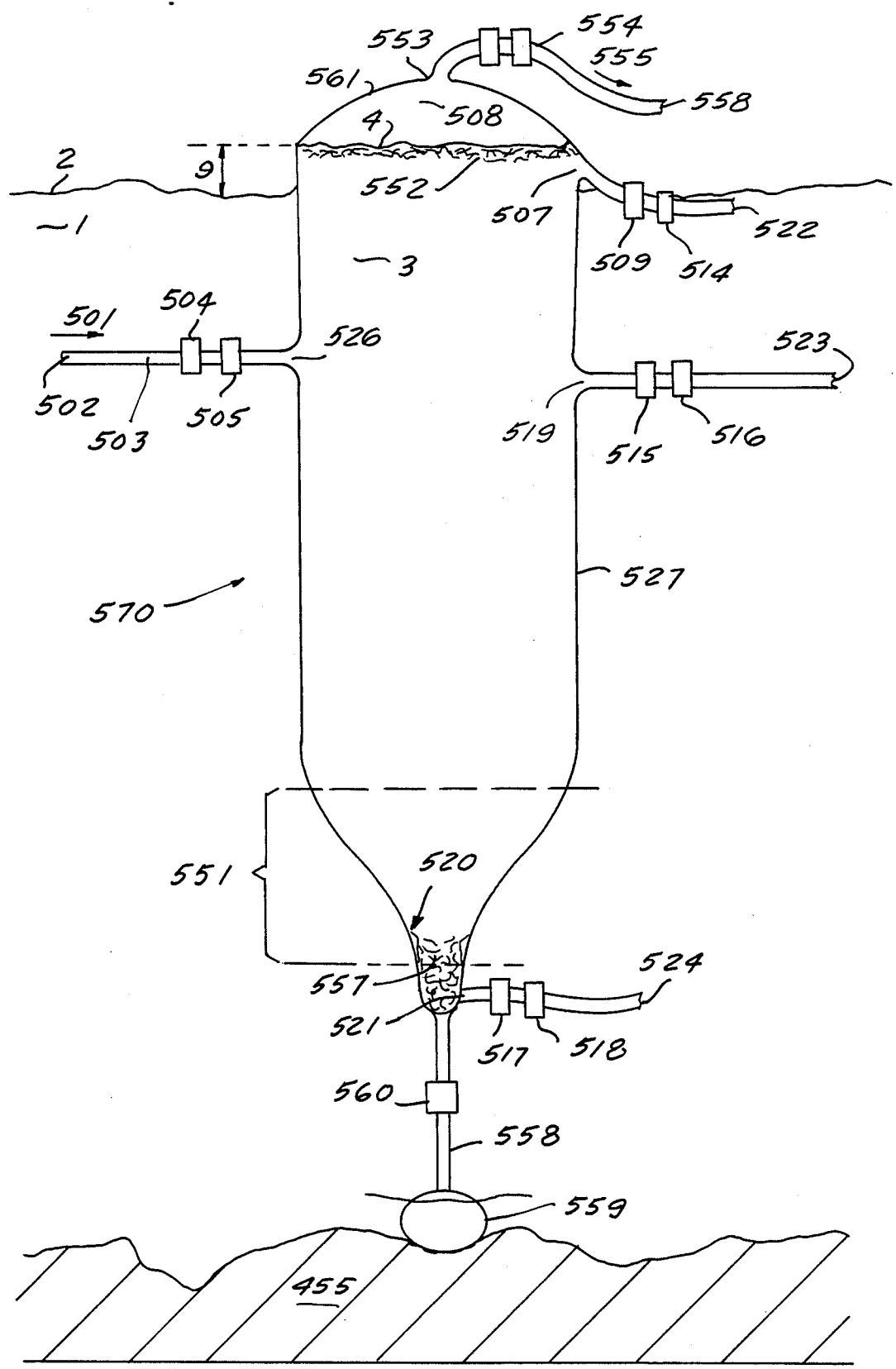
FIG. 20 shows a substantially vertically oriented equipod containing a liquid presumed to have a lower density than the ambient liquid.

Note that equipod 527 could have any orientation desired within liquid 1, without changing the nature of the fluid equilibrium which allows its walls to be flexible. Thus, such an equipod might be oriented substantially vertically in a body of liquid, e.g., were it desired to have more positive collection of sediment from a lowest point, or more positive collection of a gaseous phase from a highest point. Such an orientation might also be advantageous if there were limited space available for placing such an equipod in the horizontal position. Such an equipod could have quite substantial contained volume. For example, equipods could be constructed with many hundreds of millions of gallons contained volume. For this reason, equipods might be specially suitable for fermentation processes associated with the processing of sewage from large metropolitan centers. In FIG. 20 is depicted such a substantially vertically oriented equipod 527, containing a fluid 3 presumed to have lower density than ambient fluid 1. Thus, upper surface 4 of fluid 3 is above upper surface 2 of fluid 1 by a gap designated 9. Infeeds and outfeeds are labeled as in FIG. 19. Region 551 of equipod 527 has a tapered form of wall, whose angle is steeper than the angle of repose of sediment 520. Thus, sediment 520 would be effectively collected to exit through outlet 521. In FIG. 20, outlet 507 would be used primarily for extracting debris 552 which rose to near surface 4 of liquid 3. Gaseous phase 508 would be allowed to leave equipod 527 through outlet 553 and through conduct means 554 in the direction of arrow 555 to exit at outlet 556.

MMM. Anaerobic Pressures and Temperature Rise

Suppose, for example, that anaerobic processes were to occur within equipod 527. Then gaseous phase 508 could consist substantially of product gases from these anaerobic processes, including for example, methane. Depending on the concentration of biologically active material within equipod 527, its temperature might be increased appreciably by biological processes occurring within it. In that case, this increase might be advantageously used to increase the rate at which biological processes occurred. With a contained liquid 3, less dense than ambient liquid 1, when equipod 527 was less than completely filled, collapse would begin from the lower regions and proceed upwards, so that the lower regions would be depleted of liquid 3 before upper regions were. However, by suitable design, the partially collapsed equipod could still be allowed to effectively deliver sediment 520 through outlet 521. In the partially collapsed state, walls above region 551 could advantageously be held at angles steeper than the angle of repose of sediment 520 by, for example, tensioning the bottom of the equipod by suitable tensioning means such as a force distributing collar 557, linkage 558, and weight 559. Weight 559 can rest on the bottom 455 of body of liquid 1. Alternatively, collar 557 could be given sufficient mass to provide the desired tensioning. With such downward tension exerted against the membrane of the equipod, when the equipod was in the partially collapsed state it could be maintained in a substantially vertically oriented and vertically streamlined form, to facilitate the settling of sediment 520 to reach outlet 521. Optional elastic means 560 is depicted in linkage 558. In the event that sufficient mass were included in ring 557 to provide the desired negative buoyancy there, then elastic means 560, linkage 558, and weight 559 could be unnecessary. Thus, the system might operate without any reference to the depth of bottom 445. This could be desirable were such a device used in a region where the depth might change appreciably, for example, by the action of tides.

NNN Gas Collection Membrane Exposed Above Surface

The apparatus in FIG. 20, generally designated 570, could operate with varying volumes of gaseous phase 508, and have varying amounts of the apparatus extending above the surface 2 of liquid 1. Gas trapping membrane 561 is depicted as being a single domed structure. More elaborate construction is feasible. For example, this structure might be constructed with sufficient density so that the gas pressure in region 508 was not sufficient to raise it to a substantial height above liquid surface 4 of liquid 3. In that case, there would be relatively little exposure of this upper surface 561 to wind loading. Membrane 561 can be anchored at many locations across the diameter of equipod 527 using suitable weights and buoys. This would give it an appearance like that shown for the lower dashed position of membrane 10 in FIG. 7. In FIG. 7, membrane 10 is connected to floats 151. Similarly, membrane 561 could be anchored in a way which would decrease its susceptibility to deformation and damage by wind effects.

OOO. Stability of Membranes Against Wind-Driven Surface Waves

In my co-pending application *2, I discuss in detail criteria for stability of the surface of an equiduct against the amplification of surface waves at the expense of energy of fluid flowing therein. In a similar way, one can establish a criterion for the stability of an upper membrane 10 or 561, respectively. This criterion can be stated simply, as requiring that the tension in the membrane be such that the velocity of propagation of surface waves in the membrane is greater than the wind velocity to which the membrane will be exposed. Under such circumstances, the wind would be unable to amplify waves traveling in substantially the same direction as the wind.

PPP. Stability of Vertical Equipod Wall Shape and Membrane Tension

Height 9 of surface 4 above surface 2 provides a pressure head tending to spread the walls of equipod 527. This spreading effect can be related to the tension desired in membrane 561. Thus, the choice of details of construction of the gas trapping membrane on equipod 527 could depend also upon the operating pressure head difference associated with the difference in densities between fluid 3 and fluid 1, and the amount of fluid 3 present in equipod 527 under normal operating conditions. Note that the problem of membrane stability for an upper membrane exposed to air is entirely avoided when an equipod is operated fully submerged in its surrounding liquid. This could be an additional reason for choosing fully submerged operation. However, when a large volume of liquid 3 of lower density than ambient liquid 1 is to be stored within an equipod, and the amount to be stored can vary over a wide range of volumes, then the variations in buoyancy associated with these variations in contained volume might give rise to undesirably large forces which could have to be constrained by suitable anchoring means. Under such circumstances, it may be relatively advantageous to allow a portion of the equipod to be above the surface of the surrounding liquid, so as to allow the buoyant forces generated in contained liquid 3 relative to ambient liquid 1 to be balanced by the raising of surface 4 of liquid 3 above surface 2 of liquid 1. In this way, no tension need be transmitted to anchoring means in order to accommodate the variation in buoyancy associated with variations in amount of contained fluid 3, for a wide range of operating parameters, sludge sedimentation, gas evolution, or density.

QQQ. Equipods as Balloons

An equipod supported by buoyancy of contained fluid can, in many respects, be thought of as a balloon. If this equipod is anchored to the bottom of the body of water, it has many of the characteristics of a tethered balloon. The least stress surface, which can be defined by the tension required to anchor the equipod and the buoyancy of the contained fluids, assumes something of a teardroplike shape familiar from the construction of balloons. Thus, the stress calculations can be carried over from previous aerodynamic calculations which are well understood. Such calculations are relatively straightforward. Because of the complexity of the gores or segments forming a balloon, it may be economically advantageous to use a simpler geometric configuration for equipods, such as the cylindrical configuration illustrated in FIGS. 19 and 20, in which the departure from cylindrical cross section occurs substantially near the ends of the equipod. With large equipods, it is likely to be quite advantageous to obtain wall strength by use of fibrous reinforcing materials, so that the wall is a composite material. Such construction *2. Under such circumstances, orientation of the fibers within the wall could be relatively more simple with a cylindrical geometry for most of the wall, than for fiber orientation in the case that gores to form a balloon were used. In the case of the contouring of gores for a balloon, the fiber orientation ideally would change from location to location along both the height of the balloon and its circumference. Thus, fibers which were relatively more widely separated, running vertically to support tension in the balloon near its largest diameter, could be required to come closer together as they approached its lower end. In this way, the forces would be concentrated. However, such a type of construction does not lend itself readily to production on automated equipment. Thus, the cost of constructing such an optimized composite wall balloon gore could be anticipated to be substantially greater than the cost of constructing material suitable for use in a cylindrical wall of an equipod.

RRR. Allowing Ambient Fluid into Equipod

If desired, a vertically oriented cylindrical cross section equipod might advantageously be anchored, by attaching a suitable reinforcing force distributing ring to the lowest portion of the cylindrical portion of the equipod wall. This force distributing ring could then be connected to suitable linkages by which force could be transmitted to anchors tethering the equipod in a desired location within the body of liquid. In the event that such a force distributing ring were used, the cylindrical form of the equipod, under some circumstances, might advantageously be retained by allowing relatively free access of ambient fluid below a relatively less dense contained fluid. In this way, the cylindrical wall of the equipod might be prevented from collapsing due to reduction in the amount of less dense fluid 3 contained within the equipod. The detailed shape of equipod 527 could be varied according to the requirements of various designs and uses. The basic principle, however, would be the same. Many variations in geometry, size, material of construction, contents of equipods, their inlet and outlet ports, their port locations, and location of equipods can be made within the scope of the invention as set forth herein.

SSS. Example of Submerged Processor

Figure 21:
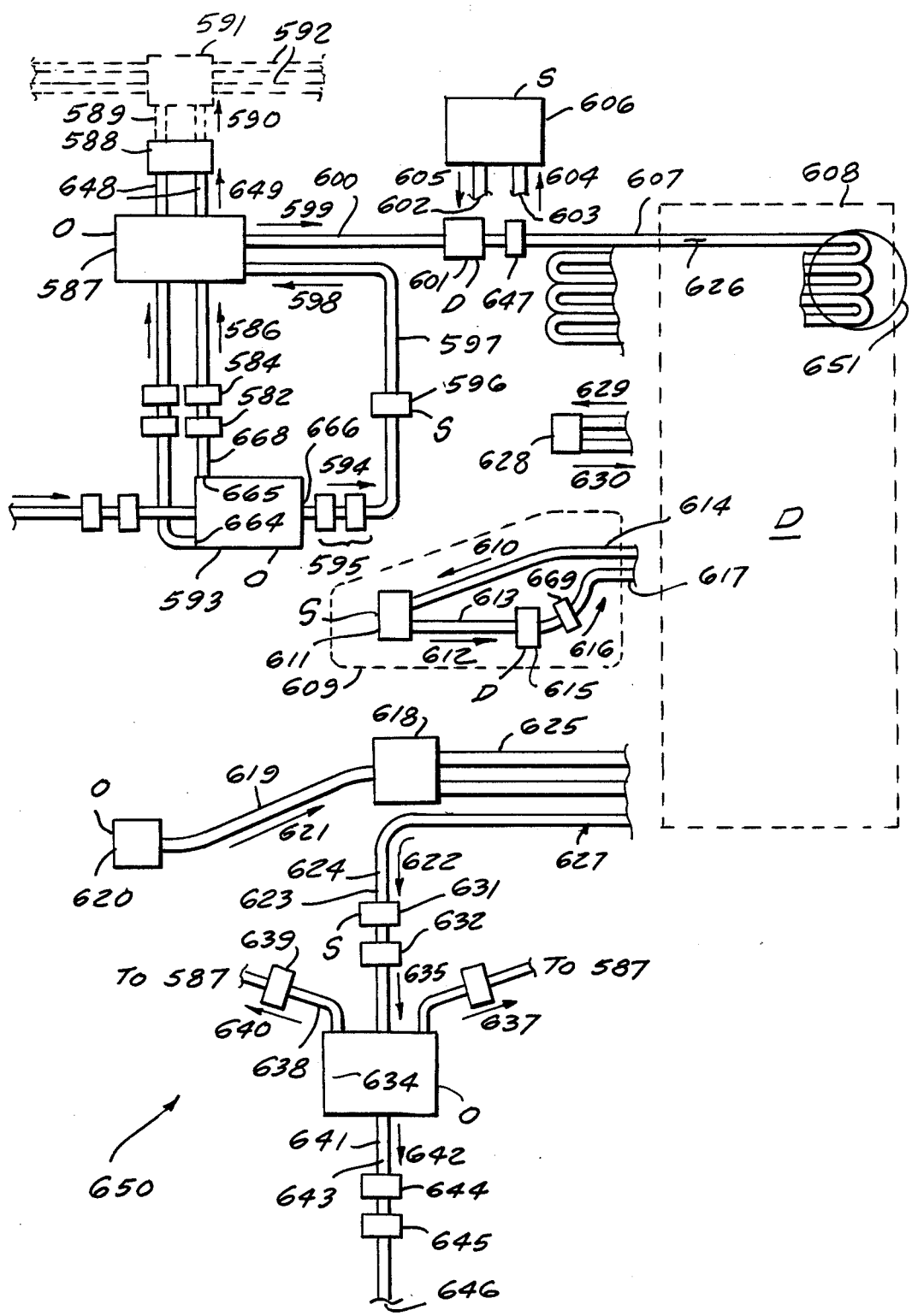
FIG. 21 shows an overall system for performing a series of related physical and biological operations on sewage.

In the preceding sections of this description, I have set forth ways in which various processing operations and suitable containers for their performance may be constructed for use in a submerged sewage processing plant. The details of a submerged processing plant could depend upon the nature of the sewage or other material being processed; the depth of liquid available within which portions of the processor could be located; the availability of heat, for example, thermal pollution, to increase the temperature of the material being processed; the degree of concentration of sewage or other material; the types of microorganisms to be cultured; the density of the liquid to be processed as compared to the liquid within which the processor would be located; and other factors as discussed elsewhere herein and in my co-pending applications *1, *2, and *5. By way of illustration of a way in which a submerged processor might use components of the various types discussed elsewhere herein and in my co-pending application *1 and *2, consider a submerged processing plant to process biological sewage with which is transported, in suspension, solid waste matter. In FIG. 21 is diagrammed an example of such a processing plant. The relative sizes of the various components diagrammed are not to scale. Also, depending upon the detailed nature of the treatment which is intended for the liquid being processed, additional vessels or processing stations might be included, or some of those shown might be omitted, without departing from the scope of the invention as set forth in this application. In FIG. 21, fluid to be processed enters the system through inlet 575 through equiduct 576 in the direction of arrow 577. This fluid passes through suitable flow control or augmentation means 578, instrumentation station 579, and thence through conduit 580 to enter sorter 593.

TTT. First Sorting

Sorter 593 might, for example, be a belt type sorter of the type discussed in connection with FIGS. 9 through 12 of this application. The depth of sorter 593 within surrounding liquid in which this processing system is located is optional. For this reason, processor 593 is also labeled with an O. For specificity, suppose that the passage of fluid through sorter 593 is relatively quick, and that within this sorter only materials with substantially different density from that of the liquid phase are collected. This could be, for example, the location at which solid debris of metallic or ceramic nature would be collected. Less dense and more dense components of segregated material exit through outlets 664 and 665 of sorter 593.

UUU. Processing First Segregated Solids

This material progresses through ducts 667 and 668, to pass through suitable flow control or augmentation means 581 and 582, instrumentation means 583 and 584, and proceed in the direction of arrows 585 and 586 to a processor 587. Location of processor 587 is optional, and for this reason it is labeled with an O. Such a processor might, for example, include means for high pressure hydrogenation of solid matter to convert some of the organic components thereof to hydrocarbons for use as fuel. Other possible processing might include burning material so as to extract heat energy, or the processor might simply finely divide the material or pass it substantially unchanged into further duct means 648, through which it passes in the direction of arrow 649 through flow control and instrumentation station 588, from which it may be disposed.

VVV. Disposal of Solids by Further Transport

One means for such disposal might be to pass the material through suitable ducts 589 in the direction of arrow 590 to a fluid introduction station 591, by which it is introduced into suitable equiducts 592. Station 591 might, for example, consist of one or more apparatus of the type generally designated 405 in FIG. 26 of my co-pending application *1. Where a variety of materials are transported, these may be sorted in processor 587 and introduced into different equiducts. A plurality of such different equiducts together could comprise the equiducts designated 592. In this way, mixing of different components might readily be avoided.

WWW. Optional Heating of Liquid for Further Processing

Liquid component of fluid entering at 575 leaves sorter 593 through outlet 666, passing through flow augmentation or control means and instrumentation station 595 in the direction of arrow 594. This liquid material then proceeds through an optional gas segregation station 596. Such a gas segregation station might advantageously be located in a region in which the ambient pressure were substantially atmospheric pressure, rather than subjected to the additional pressures associated with location at a substantial depth within a body of surrounding liquid. For this reason, gas segregation station 596 might advantageously be located at or near the surface of the liquid in which the processing plant were located, and is therefore labeled with letter S. From gas segregation station 596, liquid proceeds through duct 597 in the direction of arrow 598 to enter processor 587. To this liquid could be transferred any heat rejected by processes occurring within processor 587. Passage of this liquid through processor 587 is optional. However, if waste heat were available at processor 587, increasing the temperature of the liquid within the system might be advantageous in order to increase the rate at which subsequent biological activity could occur and decrease the amount of plant required to contain liquid within which such biological activities were taking place.

XXX. Deep Processing; Aeration or Oxygenation

From processing plant 587, warmed liquid passes in the direction of arrow 599 through duct 600. It would descend to a substantial depth within surrounding liquid, at which a substantial ambient pressure is available. At this depth, the liquid would enter a gas solution station 601. Because such a station could advantageously be located at a substantial depth within surrounding liquid, it is labeled with a 'D'. At station 601, oxygen would be introduced into the liquid. This could be accomplished by any of the means discussed elsewhere herein and in my co-pending application *1. Air could be used, either with all the air dissolved into the liquid, or with part of the air dissolved and part of the air allowed to return to the surface in order to allow for the different solubilities of oxygen and nitrogen in water. This is discussed in my co-pending application *1 in more detail, and the detailed discussion will not be repeated here. Alternatively, oxygenation could be performed by introducing relatively pure oxygen at station 601. A suitable gas handling station 606 could be provided, preferably located substantially near the surface of the body of liquid. For this reason it is labeled with S. Gas could proceed from it in the direction of arrow 605 through suitable conduit means 602, or could proceed into it in the direction of arrow 604 through suitable conduit means 603. In the event that gas is returned to the surface from a substantial depth, as might be the case with certain forms of oxygenation using air as the source of the oxygen, then gas returning to the surface could carry with it substantial pressure energy, which might advantageously be reclaimed in gas handling station 606. Suitable flow augmentation and instrumentation means 647 are provided for bringing the liquid to the necessary driving pressure and for monitoring the characteristics of gas solution and other properties in the liquid before it progresses to further processing. This is located just downstream from gas introduction station 601.

YYY. Deep Equiduct Processing Bed (Equibed); Series and Parallel Operation

Figure 22:
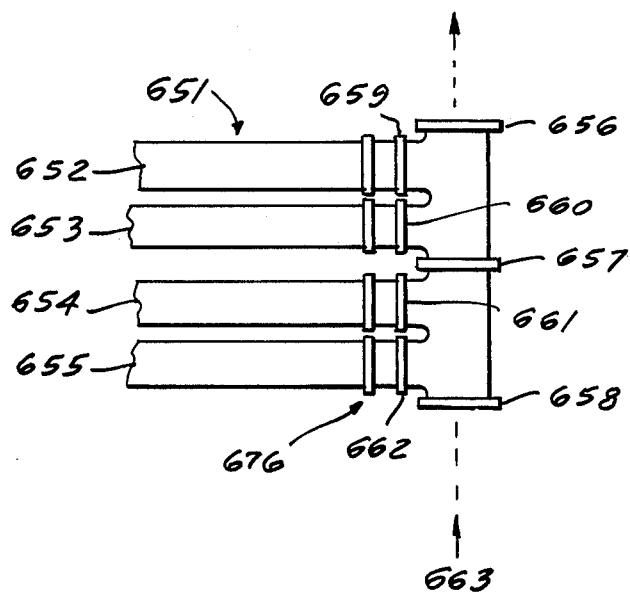
FIG. 22 shows fittings which may be included at the end of equiducts forming beds for sewage processing.

Oxygenated liquid then passes into an equiduct processing bed 608, which is located at a substantial depth within surrounding liquid and is therefore labeled D. Equiduct 607, carrying oxygenated liquid 626, enters the zigzagged pattern of equiduct bed 608. Details of end fitting 651 are depicted in FIG. 22. Equiduct bed 608 could be operated in a series fashion, in which liquid passed in a zigzag pattern through the equiducts comprising the equiduct bed, or it could be operated substantially in parallel, in which liquid passed through all the various members of the equiduct bed in parallel without achieving nearly as great a velocity within any one member as would be the case for series operation. (By using series operation of the equiduct bed, a sufficiently high flow velocity might readily be maintained to retain in suspension particulate matter transported with fluid 626. In the event that the bed were operated with equiducts connected substantially in parallel, the flow velocity within each equiduct might be made very much smaller, allowing solid matter to settle as sediment or rise to the top within the equiduct.

ZZZ. Series Operation of Equibed

For specificity, we will consider first the case in which the more rapid flow of series operation is chosen so as to retain suspended particulate matter. Additional flow augmentation means may be incorporated within the bed as desired. For example, such a flow augmentation means 628 is depicted as receiving fluid in the direction of arrow 629 and delivering it under a suitably augmented pressure in the direction of arrow 630. Also, additional gas handling stations 609 can be incorporated into the equiduct bed. Equiduct 614 is depicted as ascending, carrying liquid in the direction of arrow 610 to gas segregation station 611 which, for reasons discussed in connection with gas segregation station 596, could advantageously be located at or near the surface of the surrounding liquid and is therefore labeled with an S. Equiduct 613 descends, carrying liquid in the direction of arrow 612 to a deep gas solution station 615, similar to solution station 601.

AAAA. Flow Augmentation by Gas Evolution

Note that flow augmentation may be produced by the ascent in equiduct 614 of liquid containing a substantial quantity of dissolved gas. As the liquid rises within the surrounding medium, the pressure upon it decreases, and a gaseous phase can be evolved. Evolution of such a gaseous phase can reduce the mean density of fluid within equiduct 614, contributing to it an increased buoyancy relative to the surrounding medium. Thus, a net pumping action can be produced. This is discussed in more detail in my co-pending application *1. Reoxygenated liquid would proceed in the direction of arrow 616 through equiduct 617 to re-enter deep equiduct processing bed 608. Suitable instrumentation station 669 can optionally be included.

BBBB. Chemical or Other Additions in Equibed

Liquid continues within processing bed 608, arriving through equiduct 625 at optional mixing station 618. At mixing station 618 chemicals from supply 620 could be introduced. These might be delivered thereto, for example, in direction of arrow 621 through duct 619. The depth of chemical supply station 620 is optional and therefore it is labeled with an O. Kinds of chemicals which might be introduced could include, for example, clumping agents which would tend to cause small particles in suspension to clump together so as to allow more rapid settling in later processing. In this case, the last zigzag of equiduct within processing bed 608 would be serving as a mixing chamber within which swirling of transported liquid could be used to provide adequate mixing of chemicals introduced at station 618 prior to subsequent processing. This last zigzag is designated 627. After mixing had occurred, liquid would pass in the direction of arrow 622 through equiduct 623. This liquid 624 would then pass through optional gas segregation station 631 which, as discussed before, might advantageously be located near the surface, for which reason it is labeled with an S. Liquid then progresses through suitable flow augmentation or control, and instrumentation, station 632 in the direction of arrow 635 to enter sorter 634.

CCCC. Submerged Processing Plant Made of Equiduct

A submerged processing plant might be made substantially from equiduct and suitable apparatus constructed for use therewith. Under such circumstances, the equiduct might be packed so as to allow a large length of equiduct to be used in a relatively small space. Such equiduct might zigzag within a body of liquid at several different depths. In this way, a substantial volume could be filled using equiduct. Such a processing facility might contain sufficient equiduct to perform all of the various processes discussed earlier in connection with processing within equiducts. Such a system could have several advantages over one using equipods. First, equiduct might advantageously be constructed with the same tooling used for constructing the equiduct used for the transport portion of a sewage system. Second, flow within the equiduct might more readily be increased to a level sufficient to resuspend debris or sediment, thus allowing the equiduct to more readily be cleared of such material than might an equipod. Third, the necessary fittings, gas segregation stations, flow augmentation means, gas introduction stations, monitoring instrumentation, and other apparatus for use with the equiducts in a processing plant might be substantially the same as that developed for use in the transport portion of the sewage system. Thus, the number and types of parts which could be required for replacement and inventory might be substantially reduced, compared to a system including a plant which used more specialized containers, such as equipods.

DDDD. Using Biological Heat

Heat loss from a large number of equiducts packed against each other might be made substantially as low as the heat loss which could be expected from an equipod. Thus, under circumstances where biological activity within the processing system might advantageously be used to raise the temperature thereof, and increase the rate of biological activity therein, a collection of equiducts packed closely against each other might serve substantially as satisfactorily in such respects as might an equipod.

EEEE. Handling Sludge

In the event that relatively concentrated biological material were being processed, it might be relatively more likely that substantial quantities of sludge might be formed within that processing volume. In the presence of substantial sludge formation, equiducts could be relatively more suitable for such processing than equipods. This is another consequence of the ease with which debris and sediment within the equiduct might be removed from it, using processing techniques essentially the same as for transporting material within equiducts. In the event that large driving pressures were needed to move sludge collected within equiducts used for processing concentrated sewage, the relatively smaller diameter of an equiduct, compared to an equipod, could facilitate construction of chambers capable of withstanding the pressure differential associated with such driving pressures. Furthermore, the techniques of swirling and otherwise maintaining in suspension material transported within a fluid within an equiduct, appear relatively more applicable in chambers formed of equiduct than in larger diameter equipods with relatively small inlets and outlets.

FFFF. Reduced Mixing of Processed and Unprocessed Material Using Equiducts

One of the advantages of equiducts is that they may readily provide for relatively little mixing between raw materials and substantially processed materials. In this way, gases dissolved within the material, nutrients, and other additives, might be relatively more efficiently used, reducing ancillary costs for equipment and operation. This is discussed in more detail in connection with processing within equiducts used for transport.

GGGG. Cleaning Solids from Equiducts During High Flow Rates; Forming Solids Pulser In the event that flow within processing equiducts were normally maintained at a relatively low level, to save pumping power, ancillary equipods might be used for storing quantities of material sufficient to allow increased flow for brief periods of time, to help debris to be removed from the system using relatively high flow rates and relatively high levels of pumping power for brief intervals. By allowing flow to occur at a relatively low rate normally within processing equiduct, the sediment and rising debris within the fluid within the equiduct could be accumulated within the equiduct. Depending upon the amount of debris and sediment present, this accumulation process might be allowed to continue for a substantial time. Then, in a relatively brief time, this material could be removed from the equiduct by passing fluid through the equiduct at substantially higher flow. Operating the equiduct at the substantially higher flow would require, for brief intervals, substantially higher pumping power. The result of operating such a system at two substantially different flow rates could be to reduce the overall pumping power required, and to allow the solids present in the liquid to be delivered in a pulse. This pulse of solids might then be subsequently processed in a way appropriate primarily to solids processing, rather than to processing large volumes of liquid. Thus, a number of such pulse forming facilities might operate with suitable time relations among their discharges of solids, to feed into a collection duct whose contents were a relatively concentrated suspension of solid material in fluid. This more concentrated form of solid material might then be fed to suitable sorters, such as belt sorter, discussed elsewhere herein, sorting devices based on settling of debris from a relatively less dense liquid through a relatively more dense liquid, high pressure hydrogenation vessels, or other apparatus suitable to processing the various types of debris present. Also, were solids injected in an equiduct in a pulse, the relative transport velocities of the component materials in that pulse might advantageously be used to segregate different types of material before the pulse arrived at a plant for further processing. This is discussed in more detail in connection with FIG. 14 hereof.

HHHH. Choice of Flow Augmentation Means for Solids Pulse Forming System

In a processing plant based upon equiduct for its processing chambers, and designed for processing relatively concentrated sewage with a large amount of sludge and sediment, flow augmentation means capable of providing substantial driving pressure might advantageously be used. Thus, for such applications, centrifugal flow augmentation means, e.g., of a type discussed in my co-pending application *2, might be more appropriate than axial impeller flow augmentation means, also discussed therein.

The buoyancy of the fluid contained within the equiduct and the equiduct together may be controlled by means discussed in detail in my co-pending application *2. These means allow operation of an equiduct with substantially positive buoyancy, essentially neutral buoyancy, or substantially negative buoyancy, allowing it to be positioned relatively easily anywhere from substantially the upper surface of a body of liquid, through locations intermediate between the upper surface and the bottom of the body of liquid, to substantially on the bottom of said body of liquid. Choice of operating depth could depend upon many considerations. One consideration could be the partial pressure of dissolved gases desired within the operating system. A second consideration could be the nature of the bottom of the body of liquid, and its suitability for supporting equiducts lying directly upon it. Another consideration could be the presence of tides, and the transport of solid material by natural means relatively near the bottom. For example, a river which carried a substantial amount of silt might have enough material transported relatively near the bottom to make desirable a location sufficiently above the bottom of the body of liquid to prevent fouling of the installed system by excessive silting upon and around it.

IIII. Configuration May be Varied

Many variations in configuration of such a system 650 are feasible. For example, sorting systems 593 and 634 might be located over deep processing bed 608. Deep processor 608 might be composed for many equiducts side by side and one above another so as to occupy a smaller total area of the bottom of the body of liquid.

JJJJ. The Equibed

Suitable fittings, as depicted in FIG. 22, may be included at the ends of the equiducts in the deep processing bed so as to allow series or parallel operation and facilitate replacement of damaged equiducts. Referring to FIG. 22, end fitting generally designated 651 connects to equiducts 652, 653 and 655, respectively, through valves 659, 660, 661 and 662. Suitable valves are discussed in my co-pending application *1. These valves would allow equiducts to be closed off from operation, allowing them to be disconnected at fittings generally designated 676. Suitable fittings are discussed in my co-pending application *2. Valves 656, 657, 658 connect adjacent pairs of equiducts. When these valves are closed and all other valves open, fitting assembly 651 connects equiduct 652 in series with equiduct 653 and equiduct 654 in series with equiduct 655. This would provide for zigzag flow through processing bed 608. In the event that all valves in the system are open, flow would be substantially parallel through ducts 652, 653, 654, and 655 to enter or leave end passage 663. It is not necessary for bridges to be between adjacent zigzags. For example, a bridge might make the connection between zigzags 4, 5, or more spaces apart, so as to short circuit the flow through a larger number of zigzags and reduce the number of valves required. One purpose of such valving is to allow flow through the bed to continue during removal, e.g., for replacement, of various portions of equiduct. In this way, the operation of the processing bed might advantageously be protected against failure of equiduct whether by accident or intentional damage. Such a system might be simplified in the event that several beds were used in forcing the deep processor 608. These beds might then be connected in parallel with each other, and a sufficient number of beds provided so that the reduction in capacity associated with disconnecting one complete bed from the processing system would not intolerably degrade performance. Then, valving within each bed might be substantially eliminated. However, if parallel operation is desired, alternated with series operation, valving suitable for accomplishing such alternation would be required. Thus, a bed for serial and parallel operation might contain valves 656, 657, and 658, while the functions performed by valves 659, 660, 661, and 662 might be subsumed under a larger scale switching which eliminated an entire bed from the processing facility.

Operation of the system could follow several different rules. For example, the deep processing bed 608 might be operated in parallel when a substantial amount of debris was to be removed from the fluid. This parallel operation would allow a substantially slower flow velocity within the equiducts comprising the bed. At such a reduced velocity, sedimentation could occur within these ducts. Subsequently, after a substantial operating time, these ducts might then be connected in series in a zigzag form so as to allow the flow to be at a substantially higher velocity to resuspend such particulate material and transport it from the system. This material could then go into a sorter 634 in which it would be segregated, possibly over an extended period of time during which the bed was used for segregating debris in the parallel flow mode. Under such circumstances, anaerobic processes might occur within the sediment accumulated within the equiducts, because of the relatively reduced access of fluid to the sediment, and consequent reduction of access to dissolved oxygen. Because aerobic processing was selected for the example in FIG. 21, presumably zigzag flow would be the desired mode of operation for a processing bed 608 constructed with uniform diameter equiduct. Such zigzag flow could require more pumping energy than parallel flow for transport of the same amount of fluid through the processing bed as a whole. This is because the longer zigzag path would offer substantially greater impedance to the flow of liquid within it than would the multiplicity of shorter paths in parallel.

KKKK. Using Equiduct Bed for Sedimentation: Efficient Formation of Solids Pulse An equiduct bed, such as 608 in FIG. 21, may be used for sedimentation. This can be advantageous whether the equiduct bed is used as part of a more intricate processing plant or if it is used separately so as to allow the sediment to be accumulated and transferred in pulses. Accumulation of sediment into pulses offers possible advantages for subsequent processing. For example, if bed 608 in FIG. 21 were operated in such a way as to accumulate sediment and then deliver it in brief pulses, sorting mechanism 634 might be constructed with less internal volume than might be required were sedimentation to be performed continually within it. The brief pulse might be allowed to stagnate within separation system 634 for a time adequate to allow substantially complete sedimentation to occur therein, while additional flow could be bypassed so as not to disturb sedimentation within sorter 634. Such advantages of accumulating sediment into pulses could depend substantially upon the degree to which the sediment could be concentrated into the pulses. Such concentration may be characterized in several ways. One characterization is the degree to which flow between the pulses of sediment is free from sediment. This could depend on the detailed nature of the sediment, sedimentation rates, compositions, etc. Detailed characterization might give the details of the type of sediment which remained. Another characterization is the ratio of volume of fluid between the intervals between pulses and the pulses themselves. If the pulses result in clear portions of fluid which are substantially free of sediment, to a degree sufficient to allow them to be passed from the system without requiring further sedimentation, then the requirements placed upon subsequent sorting apparatus may be substantially reduced. If the volume ratios for concentration are substantial, for example, 20 to 1 or higher, which appears feasible for many applications, then the volume requirement for a subsequent sorting system, for example 634 in processing plant 650, could be quite substantially reduced. Because such sorting systems may involve apparatus with mechanical motion, such as belt sorters, it may be economically and technically advantageous to reduce the volume contained within such sorting apparatus.

In FIG. 22 is depicted a valving arrangement generally designated 651 for use with equiduct bed 608. Such valving arrangements are presumed located at both ends of the equiducts comprising equiduct bed 608. By manipulating such valves, for example, by use of remote controllers for them, flow within the equiducts comprising the bed can be directed in a wide variety of ways. For example, by connecting the equiducts so as to pass fluid in parallel, the rate of flow of the fluid through each duct could be rendered substantially smaller than would be the case were the fluid to pass through each duct in series. When many ducts were used in parallel, the flow rate through each might readily be reduced to such a low velocity as to allow substantially complete sedimentation to occur within the equiduct. Then, by connecting such equiducts selectively in series and parallel combinations, this sediment could be caused to return to suspension in an equiduct which was carrying the flow in series so as to remove it from that equiduct. By suitable valving, the sediment might advantageously be concentrated into a substantially smaller portion of the total flow of fluid than that which delivered it into the system.

LLLL. Flow Pattern in Equibed During Solids Re-suspension to Form Pulse

Figure 23:
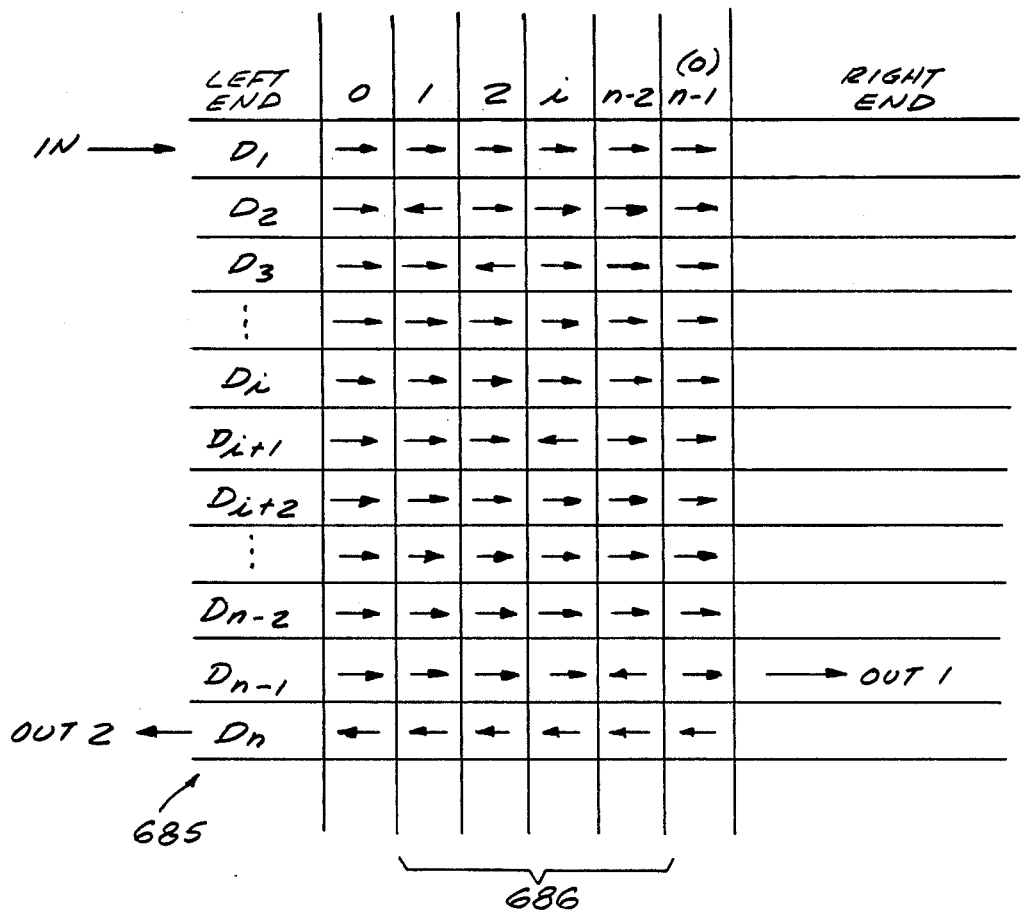
FIG. 23 is a chart describing the flow arrangements in an equiduct bed used for solids sedimentation.

Chart 685 in FIG. 23 details such a flow arrangement. Input is designated In and enters at duct $D_1$. Ducts are enumerated down the left side of the chart: $D_1$, $D_2$, $D_3$, etc. through $D_n$. Equiduct bed 608 is assumed to be formed from n equiducts. Two different positions for the output are designated. In the event that the equiduct bed is laid along the length of flow of an equiduct transport system, it might be advantageous to draw the output from the opposite end to which the input is supplied. In this case, the output would be taken as designated Out 1 and the bed would contain $n-1$ equiducts. If, as is depicted in FIG. 21, the equiduct bed is to deliver its output from the same general end as it receives its input, then the output would be taken as designated Out 2 at the end of equiduct $D_n$, and the bed would be presumed to have n equiducts. Equiduct $D_n$ can be thought of as a return equiduct. The flow in that equiduct is always in the same direction and always contains the full flow entering the equiduct bed. That is, Output 1 and Output 2 can be thought of as being connected by equiduct $D_n$. During ordinary operation, for the purpose of collecting sediment, all of the equiducts in the bed, except equiduct $D_n$ would be operated in parallel. In this case, the inlet fluid would be distributed through the manifold at the inlet end and collected at a manifold at the outlet end, and all of the valves depicted in FIG. 22 would be open except for the closing of the valve between equiduct $D_{n-1}$ and $D_n$ at the inlet end so as to prevent cross flow directly to Outlet 2. This would be the ordinary state of operation for collecting debris, and is designated "O" near the top in Graph 685. In each column of Graph 685 are arrows corresponding to the direction of flow of fluid in each of the ducts $D_1$, $D_2$, $D_3$ etc. Thus, in Column 0 of Chart 685, we see arrows directed to the right in all of the cells corresponding to each of the equiducts except for equiduct $D_n$, which contains an arrow designating flow to the left to deliver fluid to Outlet 2. A series of steps 1, 2, i, and $n-2$ are grouped together and designated 686. These steps constitute the formation of a pulse of sediment lifted from equiduct bed 608 and delivered to Outlet 1 or Outlet 2 as desired. In step 1, flow would be directed in the same direction as usual in equiduct $D_1$, but reversed in equiduct $D_2$. All of the flow entering the equiduct bed would proceed through equiduct $D_1$ and return to the left through equiduct $D_2$, with suitable settings of the valves in the end manifolds. At the higher flow velocity associated with passage of all of the inlet fluid through a single equiduct of the bed, sediment would be lifted into suspension in equiducts $D_1$ and $D_2$. The output of equiduct $D_2$ is in a correct position to feed all of the remaining equiducts through $D_{n-1}$ in parallel. For an equiduct bed containing a relatively large number of equiducts, this parallel flow would occurs at a velocity low enough to allow sedimentation to occur within these parallel equiducts, so that the debris or sediment which had been transported from equiducts $D_1$ and $D_2$ in suspension would be allowed to resettle out of suspension in equiducts $D_3$ through $D_{n-1}$. Thus, equiducts $D_1$ and $D_2$ would le cleared of their solid material, without yet delivering substantial solid material to Outlet 1 or 2. If the normal flow through the equiduct bed were not sufficiently great so that if directed through a single equiduct to cause sediment to be resuspended and transported therefrom, additional inlet water can be introduced to increase the flow to or above this level.

After equiducts $D_1$ and $D_2$ have been cleared of solids, the valves would be suitably adjusted so as to direct the flow to conform to the pattern shown in Column 2. This is the second step of forming the pulse of sediment. In this case, inlet flow would be divided between equiducts $D_1$ and $D_2$ and progress in parallel in the direction shown by the arrows in Column 2 to the manifold at the right end of the equiduct bed. Here, these two streams would be directed by valves to merge and progress to the left through equiduct $D_3$ as shown by the corresponding cell of Column 2. In this way, equiduct $D_3$ would contain the entire flow of fluid passing through the equiduct bed, and thus have in it a sufficient flow to cause sediment to be resuspended. When this fluid carrying sediment reaches the left end of equiduct $D_3$, it is in a suitable position to feed all of the remaining equiducts in parallel. These equiducts then carry the fluid to the right, where they are remerged in the manifold, either to be delivered to Outlet 1, or delivered through equiduct $D_n$ to Outlet 2. Note that the flow rate through equiducts $D_1$ and $D_2$ has now begun to decrease. That is, it is not as great as when the total flow was directed through them in series. Similarly, the flow velocity through all subsequent equiducts, except for $D_n$, has increased somewhat associated with reducing the number of equiducts remaining to operate in parallel. The general case i is treated in the next column of Chart 685. In this case, inlet fluid is divided in parallel among equiducts $D_1$ through $D_i$ and progresses to the right as designated by arrows in corresponding cells of Column i. This parallel flow is remerged in the manifold at the right end of the equiduct bed and directed to the left through equiduct $D_{i+1}$. Thus, the total flow of fluid in the equiduct bed would pass through equiduct $D_{i+1}$. When the fluid transported within equiduct $D_{i+1}$ reaches its left end, it is in a suitable position to feed subsequent equiducts $D_{i+2}$ through $D_{n-1}$ in parallel. As i increases, that is, as successive equiducts are reversed and flushed of their solid material, the number of equiducts in parallel preceding the one being flushed becomes greater, and the number in parallel following the one being flushed becomes smaller. Thus, sedimentation, biological activity, etc. can continue in the equiducts preceding the one being flushed. As the number remaining to be flushed decreases, the flow velocity through them increases. Thus, as this process approaches its end, the flow velocity in these remaining equiducts can be expected to approach a level at which various kinds of sediment or debris begin to be resuspended in these equiducts and transported out of the equiduct bed. Thus, those forms of sediment or debris which go into suspension relatively easy might be expected to come from the system before those which go into suspension at higher fluid flow velocities. In this way, some sorting of the sediment and debris which had been collected within the equiduct bed might be achieved. That is, the pulse of solid material transported with fluid from the equiduct bed could have detailed structure, in that during the first portions of the pulse there might be different concentrations of material of different types from that which would be seen in a later portion of the pulse. This additional sorting effect in the pulse might be useful in enhancing the effectiveness of subsequent sorting mechanisms and subsequent reclamation processes. In this way, it might be used to serve a purpose analogous to that discussed in connection with sorting by velocity of transport in an equiduct, discussed in connection with FIG. 14.

As the clearing process proceeds, successive equiducts carry flow in the reverse direction. In the event that Outlet 1 is used, the flow of fluid through equiduct $D_{n-1}$ would never be reversed. When fluid flow was reversed through equiduct $D_{n-2}$, then both equiducts $D_{n-2}$ and $D_{n-1}$ would be in series, and each would have passing through it the total fluid flow through the equiduct bed. This is analogous to the condition for cleaning out equiducts $D_1$ and $D_2$, which is performed without requiring a reversal of flow through equiduct $D_1$. In the event that Outlet 2 is used, then there is a choice in the operation of clearing the last few ducts. For example, equiduct $D_n$ can be regarded as merely connecting Outlet 1 with Outlet 2. In that case, the clearing process would be exactly the same for delivery of fluid to Outlet 1 or delivery to Outlet 2. Alternatively, equiduct $D_n$ can be regarded as part of the equiduct bed with respect to the clearing process and flow reversed through equiduct $D_{n-1}$ in the step $n-2$. During the $n-2$ step, fluid would flow in parallel through all of the equiduct $D_1$ through $D_{n-2}$ and be connected to flow therefrom in series through equiduct $D_{n-1}$, flushing it of debris. This would require opening a suitable connection between equiduct $D_{n-1}$ and equiduct $D_n$ in the left end manifold. Note that $n-1$ steps returns the system to its initial condition 0. For this reason the column marked $n-1$ is also labeled (0). The pulse of material removed from the equiduct bed is formed during steps 1 through $n-2$, in the case of removal through Outlet 2, or in the case of removal through Outlet 1 the pulse is formed during steps 1 through $n-3$. At the end of this cycle of switching flow through the various equiducts forming the bed, the equiduct bed is reconnected in the same way as before the pulse was formed, allowing the process of accumulating sediment to continue. Note, also, that during this switching the amount of time spent by fluid within the equiduct bed is substantially the same for all configurations of valve openings and closings used in forming the pulse of suspended material. Also, there is no need in this case to interrupt the acceptance of inflow of fluid by the equiduct bed. This has several advantages. One advantage is that a single bed could be operated without requiring that an additional bed be provided to handle fluid flow during the time that the first bed were being cleared of sediment. Another advantage could be that the rate of flow of fluid in the equiduct system preceding the equiduct bed could be maintained substantially constant during this process. This could reduce the amount of kinetic energy change associated with changing velocity of flowing fluid, and associated changes in pressure in the preceding portions of the system.

Note that the pulse-forming process discussed in connection with Chart 685 can be performed even if one or more of the equiducts has been valved from the system, as might be the case during maintenance.

Note also that the amount of pumping power required to transport fluid within an equiduct bed operating substantially in parallel could be appreciably less than the amount required to pump fluid through an equiduct bed whose ducts were connected to carry the flow of fluid substantially in series. Provided that sufficient aspect ratio of length to diameter and suitable flow velocities were maintained within the equiducts from the equiduct bed, parallel operation of the equiducts should not substantially reduce the ability of the equiduct system to keep separate material which has been relatively thoroughly processed from material which is substantially unprocessed. In this may, the parallel or series operation of an equiduct bed offers the advantage of segregation of output from input which may, in some processing applications, give it operating advantages over equipods. This is discussed in more detail elsewhere herein.

Equiduct beds for sedimentation configured with input and output at opposite ends might advantageously, under some circumstances, be constructed as portions of an equiduct transport system. In that case, the equiduct transport system might merely have added to it additional equiducts and suitable manifolds for connecting therewith, so as to allow these multiple equiducts to carry fluid in parallel. This could offer advantages under some circumstances. Among such advantages could be the reduction in pumping power associated with transporting the fluid in parallel through a multiplicity of equiducts rather than through a single equiduct of the same diameter. A second advantage might be that the use of such multiple equiducts in parallel offers greatly increased capacity in the event of sudden peak loads upon the system. In that case, under peak loading conditions, in an emergency such as might be associated with a severe storm, relatively little sedimentation might occur in the multiple ducts, but operating pressures could still remain within the acceptable range for the equiducts. A third advantage could be that providing such a multiplicity of equiducts gives additional insurance against failure of the system associated with accidental damage or sabotage, by providing alternate paths through which fluid may be carried while selected equiducts are valved from the system for maintenance or replacement. In this way, leakage of noxious materials into surrounding liquid might be kept to an acceptable level, even in the event of substantial damage to several portions of such an equiduct bed simultaneously.

Feedback for taking cultures from downstream positions to reintroduce them further upstream can be incorporated as desired in a parallel or series flow equiduct bed. Such feedback groups have been omitted from the diagram to simplify it, for the sake of clarity.

Note that one condition which might be used as a criterion for determining the desired design diameter for the equiducts comprising an equiduct bed might be that the normal flow through the system, if passed through a single such equiduct, have sufficient velocity to suspend solid matter settled within that equiduct. Using this criterion, an equiduct bed might be designed which would be flushed of solid matter by switching the normal flow in various configurations discussed in connection with FIG. 23, or in some other suitable pattern of flow, without requiring additional flow beyond that supplied by the normal inflow of fluid at the inlet. Under such circumstances, flushing solid material from the equiduct bed might be done without requiring that additional fluid be taken from the surrounding medium or some other fluid source. Alternatively, fluid could be stored within an equipod. For example, outlet fluid or inlet fluid could be stored and directed to the inlet to provide a greater flow of fluid than normal to assist in the flushing process. Storage of fluid from the outlet might be preferable to storage of inlet fluid, because such outlet fluid would be relatively free from sediment, and the equipod storing it might thus not experience as great a rate of sedimentation within it. Also; flushing with such relatively clean fluid might be advantageous in simplifying subsequent processing of the solids pulse, by facilitating the use of a less noxious fluid for transporting the solids. Depending on the relative salinity of contained and ambient fluid, use of ambient fluid to provide such a relatively non-noxious transport medium for the solids pulse might be desirable. This could depend upon the details of subsequent processing. For example, if sedimentation were used, the relative density of the ambient fluid might be significant in determining the portions of sediment received from various portions of the sedimentation apparatus. If biological processes were to be used subsequently, salinity of ambient fluid might be significant in determining the types of microorganisms which could be effective for such subsequent processing.

Equiduct beds may be used for biological, chemical, sedimentary, or other suitable processes in various combinations, or used in combination with other devices and systems as set forth herein and in my co-pending applications *1, *2, *3, and *5, without departing from the scope of the invention as set forth herein.

Additional Sorting

Sorter 634 of FIG. 21 could, for example, be a belt sorter of the type discussed in connection with sorter 593. Here, the liquid is presumed to pass relatively slowly through the sorter, so as to allow substantially complete collection of particulate matter therefrom. For this purpose, chemicals which facilitate such collection may be introduced at station 618 to reduce the size required for sorter 634 in order to allow such collection to be substantially complete. Depth of sorter 634 is optional and it is therefore labeled with an 0. From sorter 634, lighter and heavier components progress through equiducts 638 and 649 in the direction of arrows 640 and 637, to pass through flow augmentation of control and instrumentation stations 639 and 636. Thence, these components could go to processor 587. This use of the lighter and heavier components is optional. Many things might be done with such components. For example, they might be returned to a deep equiduct processing bed, possibly heavily oxygenated, and converted to proteins or other nutritional materials by the action of specially selected cultures of microorganisms. Or, they might be passed through various types of chemical processing or through biological processing to turn them into chemical products, such as alcohol or acetone. Such concentrated nutritional material might be passed through processor 587 and prepared in some desired way, or simply passed further to enter equiduct system 592. Equiduct system 592 and introduction station 591 might advantageously be made as a multiple system, allowing the relatively detoxified materials collected in sorter 634 to be transported separately from the more contaminated materials collected in sorter 593. Thus, station 587 may be designed quite simply, performing only minimal functions, or it might be designed as a more elaborate chemical or thermal processing facility, performing a wide variety of functions. Also, additional vessels, such as equipods, or additional processors, such as deep equiduct beds, might be incorporated in the processing performed and generally designated for station 587. Essentially decontaminated liquid leaves sorter 634 through equiduct 641 in the direction of arrow 642. This processed effluent 643 would pass through flow augmentation and control station 644 and instrumentation station 645 and be made available at outlet 646. Disposition of this material could depend upon the details of the environment and of the degree of processing which had been performed upon it. In the event that this material were substantially free of toxic agents, and contained sufficiently little nutrients, and in the event that its temperature were acceptable, it might merely be discharged into the surrounding fluid. Under other circumstances, it might be subjected to further processing of the general type discussed in connection with this submerged processing station.

Alternatively, the output might be distributed into the surrounding medium through a multi-outlet equiduct, to suitably diffuse it. This might advantageously be done so as to distribute heat or nutrients in a controlled manner, so as to be an asset for aquaculture, rather than a liability. Included among the various chemicals which might be introduced at station 618 in FIG. 21 are chemicals which might serve to remove from the solution chemicals which might otherwise not be removed by biological activity, or chemicals which might be left after the biological activity had progressed to the stage present at location 625 within equiduct processing bed 608. For example, suitable chemical additives might cause phosphates to precipitate from solution. This precipitate could be carried as a suspension until the liquid reached sorting means 634, within which it could settle from the liquid, leaving the liquid relatively free from such chemicals. If desired, suitable chemicals for killing biological organisms could be added. Under many circumstances, such a step might be undesirable or unnecessary. However, suitable chemicals might be used, which were compatible with the materials of construction of the equiduct wall in the portion of equiduct within which these chemicals would be carried. Depending on concentration of chemical additive and material of construction of the equiduct wall, various chemicals such as chlorine, fluorine, bromine, iodine, ozone, or other oxidative chemicals might be used without undesirable degredation of the equiduct wall. As is discussed in my copending application *2, suitable liners might be incorporated in the construction of the equiduct wall, including relatively inert liners such as flurocarbons, flurosilicones, silicones, and the like. A wide variety of chemicals might satisfactorily be processed or transported within an equiduct. Thus, a wide range of choices of chemical processes could be made, while allowing the processes to be performed within an equilibrium vessel such as an equiduct or equipod.

NNNN. Multiple Diameter Equiducts in Equibeds

If desired, equiducts used in the equibed could have relatively larger and smaller diameter portions. This might be desirable in keeping sediment suspended in oxygen bearing liquid, in the smaller diameter sections, to facilitate aerobic processing. In the larger diameter section, sedimentation could be more readily obtained.

OOOO. Use of Additives in Many Equibed Branches

Clumping agents might be introduced relatively near the right end of each of the parallel ducts $D_2$ through $D_{n-1}$, to produce rapid, relatively controlled, sedimentation, with suspension for aerobic processing in portions to the left of the clumping agent introduction regions, in FIG. 21. Gas handling station 606 can contain mechanical compressors or other means suitable for inducing the flow of gas, were relatively pure oxygen desired for oxygenation. Suitable gas handling facilities for the purification of oxygen from atmospheric air could be provided. Equipment suitable for such pumping and purification is known in the art.

PPPP. Maintaining Cultures of Microorganisms in an Equibed

Various microorganisms for special cultures, specially suited to the conditions in deep processing bed 608, might advantageously be introduced into equiduct 607. Such microorganisms could be reclaimed at a suitable location downstream within the equiduct bed and returned to a re-entry point. This could provide circulation of microorganisms, desirable in establishing a self-sustaining culture within that portion of the equiduct bed. At successive portions of the equiduct bed, different cultures might be supported by such closed loops. In the course of passing through the equiduct bed, the liquid being processed could spend several days under highly advantageous growth conditions for microorganisms. This could allow creating a stable culture, which could provide the base of an ecological food pyramid.

QQQQ. Higher Organisms as Filters

Because of the high level of oxygenation, it might be feasible to introduce larger organisms in subsequent portions of the processing bed. For example, an equiduct processing bed, using sufficiently large diameter equiduct, might support colonies of fish, crustacea, shellfish, mollusks, or other larger organisms which might readily be processed for their protein content. The effectiveness of such grazing organisms in removing the microorganism cultures from the fluid could substantially reduce the sorting burden placed upon sorter 634, and lead to higher quality effluent at outlet 646. Additionally, byproducts derived from these larger scale organisms might defray some of the cost of construction and operation of the processing system.

RRRR. An Equipod as a Sorter

Another form of operation, instead of using sorter 634, could be to use a large equipod within which settling could occur. This equipod could be selected to have a capacity sufficiently great to contain all of the liquid entering from bed 608 which might be required to flush the equiduct bed free of settled material.

SSSS. Storing Equibed Flush in Equipod

In that case, the equiduct bed could be operated in the parallel form most of the time, performing sedimentation as liquid passed slowly through it, possibly with aeration of the liquid to allow microorganisms to perform aerobic processes upon it as it progressed. This bed would occasionally be operated to form a solids pulse. The equipod would then receive this flush material, and hold it for a sufficient time to allow sludge to settle from it. This sludge would then be transported as appropriate to processor 587. In this way, an equipod could replace sorter 634. Under some circumstances, achieving sufficient capacity in the equipod for holding and settling of liquid and sludge might be more economical than constructing a sorter with the same total contained volume. This could be advantageous when an intermittent rapid flow mode is used and the equiduct bed contains most of the volume devoted to segregation of sediment from fluid being processed. When a multiplicity of beds were used, one bed at a time might be flushed so that the others could carry the processing load during the flushing time. Thus, a wide variety of processing techniques and modes of operation are possible within the configuration depicted in FIG. 21. Many other variations, including different connectivity, and different relative sizes of components, are possible within the scope of the invention as set forth herein.

TTTT. Most of Processor Could be Submerged

Note, in FIG. 21, that only relatively few stations are advantageously located near the surface of the liquid in which the processing system 650 is submerged. These stations represent only a very small fraction total space occupied by the system, and include essentially just those stations at which gas segregation is to occur. The gas handling station 606 can be located with intakes above the surface and the rest of the gas handling equipment located below the surface in suitable enclosures. Thus, only a very small portion of the system would in any way be substantially exposed to environmental effects such as inclement weather, ice, wave action, or other characteristics of the surface of a body of liquid. Those portions of the system which are located deep within the body of liquid would be substantially protected against adverse effects of climate.

UUUU. Option of Aerobic or Anaerobic Processing

Note that although aerobic processes have been discussed in connection with apparatus in FIG. 21, anaerobic processes could also be implemented using equiducts, equipods, and submerged equiduct processing beds. According to the desired end products and biological organisms selected, such variations in processing might be made using the types of apparatus described herein and in my co-pending applications *1, *2, and *3, without departing from the scope of the invention as set forth herein.

VVVV. Oxygen for Oxygenation in Deep Equilibrium Vessels

When oxygenation is desired for a liquid located in an equiduct or equipod operating at substantial depth within surrounding liquid, substantial pressures may be required to transport gaseous material to that depth to perform the desired oxygenation. If air is used, the oxygen content of the air is only approximately one-fifth its total volume. Pumping power would be provided for the total volume of gas transported. Thus, air could require substantially more pumping power to transport the same amount of oxygen than would be required were relatively pure oxygen the only gas pumped. As the depth at which oxygenation is performed becomes greater, the amount of pumping power required by air compared to oxygen for the same amount of oxygenation, could become an important consideration. For aeration near the surface of a body of liquid, air mass can be relatively less expensive than relatively pure oxygen, because the cost of the oxygen separation plant is not required if air is used directly. In the case where oxygenation is to be performed at a substantial depth, use of relatively pure oxygen could become progressively more attractive as depth increased, because of the reduction in the amount of pumping power and pumping plant capacity required to transport the gaseous material to the oxygenation depth. This could be an additional economic consideration in choice of means for oxygenation of liquid in a submerged equiduct or equipod. As discussed elsewhere herein, use of relatively pure oxygen facilitates obtaining a substantially higher partial pressure of dissolved oxygen than would be feasible were air used for oxygenation under similar circumstances.

WWWW. Reclaiming Oxygen

Consider the case in which relatively pure oxygen is used for oxygenation of liquid located within an equiduct or equipod at substantial depth within surrounding liquid medium. Suppose, for example, biological processes were occurring within this oxygenated medium, and that these biological processes were substantially limited by excessive buildup of carbon dioxide byproduct. The carbon dioxide, being substantially more soluble in water than is oxygen under similar circumstances, would not be evolved in a gaseous form. In order to promote rapid biological activity, a high partial pressure of dissolved oxygen might be desirable. Thus, a substantial portion of the dissolved oxygen might not be depleted before biological processes became substantially limited by the presence of dissolved products from these processes. Under such circumstances, the liquid might advantageously be conducted towards a gas segregation station located substantially at or near the surface of the surrounding liquid, at which location the pressure could be substantially atmospheric pressure. This substantial reduction in pressure during ascent of the liquid within the surrounding medium could allow the dissolved gases to evolve into a gaseous phase. This is discussed elsewhere herein and in my co-pending application *1. A substantial portion of this gaseous phase evolved during ascent could consist of oxygen which had not been consumed during biological processes occurring between oxygenation at depth and ascent of the liquid. Thus, this evolved gaseous phase might advantageously be used as a starting gas for reclaiming the oxygen evolved during this ascent. Such reclamation could contribute a substantial portion of the oxygen used for subsequent oxygenation of liquid at depth. This might be the case, either were the processing at depth to occur in a manner which allowed the initial oxygenation to use reclaimed oxygen from the process, or in configurations in which reclaimed oxygen could be made available more readily for oxygenation of material downstream from the gas segregation station, as part of a continuing transport process. As desired, reclaimed oxygen could be augmented by additional oxygen purified from the air. The significance of biological limitations associated with products rather than associated with input materials could depend substantially upon the nature of and concentration of nutrients and biological activity occurring within the liquid at depth.

XXXX. Flushing Out Gaseous Biological Products

In order to promote more complete removal of dissolved gaseous byproducts from biological activity, flushing with a gaseous phase could be used. Apparatus for performing such flushing is discussed in my co-pending application *1. Although such flushing with a gaseous phase could be performed at any depth desired within surrounding liquid, it might benefit from reduced operating pressure, and thus advantageously be located relatively near the surface of the surrounding liquid, so as to operate substantially at atmospheric pressure. If desired, reduction in operating pressure could be implemented by suitable mechanical means.

YYYY. Special Cultures Less Sensitive to their Own Products

In order to reduce biological limitations associated with concentration of products rather than concentration of input materials, suitable microorganisms might advantageously be introduced as special cultures within a deeply submerged equiduct or equipod. Byproducts produced by such biological activity could be tailored under certain circumstances to produce desirable end products. For example, $CO_2$ reclaimed from such gaseous phase evolved during ascent and/or reclaimed from gaseous flushing materials might be economically desirable as a byproduct. Were relatively concentrated biological materials transported, special cultures might be introduced to produce desired products of pharmaceutical or industrial value. For example, special cultures are known for producing certain chemical industrial products. Among such products are alcohol and acetone. Additionally, many different protein products might be produced by such special culturing. Specific cultures of microorganisms which produce such desired byproducts might advantageously be developed, which were relatively resistant to deleterious effects which might arise from a high concentration of their own products, including a high concentration therewith of gaseous byproducts in solution at relatively high pressure. Special microorganisms are discussed elsewhere herein.

ZZZZ. Combination with Power Plants

Nuclear power plants can be constructed for operation on floating platforms, both in relatively sheltered regions and on the seas. By combining floating or submerged sewage processing facilities of the type discussed herein with such power plants, use might be made of waste heat available therefrom in reducing the capital equipment requirement for processing sewage. Also, availability of abundant energy might facilitate reclamation or conversion to useful products of much of the material transported within the equiducts.

Nuclear power plants can also be combined with desalination plants, to use of waste heat from power generation in actuating the desalination process. Such desalination facilities might also advantageously be located with floating nuclear power plants. Fresh water produced by such desalination processes might then advantageously be transported to regions where it was needed through suitable equiducts. A wide variety of such processes might advantageously be combined in a single general region with floating and submerged apparatus. Such power plants might, for example, provide energy for oxygen separation from air, to supply relatively pure oxygen for oxygenation of liquid. Also, such a power plant could provide all of the desired operating power for running the processing plant.

AAAAA. Use of Waste Heat

Waste heat might advantageously be used in increasing the temperature and rate of biological activity within a submerged processor of the type described in FIG. 21. In the case that such waste heat were available, such a processing plant might advantageously be located in a place suitable to receive such waste heat. Such a plant might, for example, advantageously be located near a power generating station, which operated from heat and which released waste heat to heat the material within the processing plant. Because of the poor thermal conductivity of water, and the relatively poor thermal conductivity of elastomeric, plastic, or other materials of which equiducts might advantageously be constructed, the rate of heat loss through the surface of the equiduct, from liquid contained within the equiduct to ambient liquid, could easily be made relatively small, and could allow the fluid within the equiduct to go substantial distances, for example, in some cases, many kilometers, without dropping its temperature susbstantially. This could facilitate maintenance of a relatively high temperature within an equiduct processing bed so as to increase the rate of biological activity therein and reduce the size of the processing bed required.

BBBBB. Note that deep processor 608 of FIG. 21 can be thought of as an equiduct system folded up to occupy less total length. Instead of folding the equiduct system, one could instead merely incorporate additional transport capacity within an equiduct transport system, e.g., used for carrying biological wastes within a body of water. The same processing techniques described in connection with FIG. 21 might then be performed at a series of stations stretched along the transport system. Were it necessary to reduce the total length of this region in which processing occurred, portions of it might be folded back, without requiring that all of it be compacted into a relatively localized processing plant. Thus, the incremental cost of performing such processing beyond the cost associated with transporting the sewage, might be made relatively small. Such incremental cost could essentially depend just upon the amount by which the region over which processing occurred was to be reduced. In the event that no reduction were required, the processing could take place entirely within equiduct comprising the transport system. In the event that extreme compactness were required in the processing plant, a comparable amount of equiduct might appear in a deep processing bed such as 608, and might then be reckoned as cost of processing rather than cost of transport.

Gradation From Processing to Transport: an Economic and Technical Choice

Were substantial excess transport capacity used to accommodate processing requirements in a relatively shorter extent of a transport system, requirements of fast flow to flush debris from the system might be met by providing a suitable intake through which ambient medium might be introduced into the system, to supply the liquid required for a brief period of more rapid flow. Such inlets could be incorporated wherever appropriate for flushing a system. Note that because rapid flow would not need the use of unprocessed outlets, only inlets, use of such rapid flow of ambient liquid would not represent a fouling of the surrounding liquid.

CCCCC. Auxiliary Processing and Transport Equiducts

Transport equiducts could easily represent several days' holding time for the fluid being transported. At elevated temperatures associated with heating by thermal pollution waste heat, and at the higher oxygen partial pressure which could readily be provided within equiducts operating at substantial depth within ambient liquid, a substantial amount of biological processing might readily be performed within such transport equiducts. In the event that fresh sewage were to be introduced into the equiduct transport system at intervals too closely spaced to allow such processing to be substantially completed between such introduction points, an auxiliary branch of the equiduct transport system might be utilized to accept such fresh inflow of sewage, so that one portion of the equiduct transport system could be used to carry sewage over a sufficiently great distance to allow its processing to be substantially completed without the introduction of unprocessed sewage. Then, that material might advantageously be released in a suitable manner into the environment, and the sewage received in the course of the distance traveled while the processing was being performed could then be processed while the other duct might then be used to receive fresh sewage. In combinations of this or other forms, multiple parallel transport equiducts might advantageously be used to provide for the acceptance of fresh sewage and the simultaneous uninterrupted processing of previously received sewage, to allow this processing to go substantially to completion, and allow the processed material subsequently to be released in a suitable manner to the environment. For example, such material might be released over an extended distance through suitable ports in an equiduct transport system. In some cases, such water, bearing nutrients and detoxified, might advantageously be used as irrigation water, returning to the land nutrients which had been removed therefrom in the course of creating the material which subsequently entered the equiduct for processing.

DDDDD. Photosynthetic Aquaculture in Equiponds, Equipods, and Equiducts

Photosynthetic organisms may be incorporated into the processing of waste products in equiponds, and in suitably light transmissive equipods and equiducts located sufficiently close to the surface of a body of liquid as to allow light to reach organisms contained in a fluid therein. For example, an equipond of a type described elsewhere herein might contain photosynthetic organisms as the base of an aquaculture food pyramid, which might culminate in larger organisms which might readily be harvested. A bed of equiducts, such as equiduct bed 608 in FIG. 21, might be constructed having net positive buoyancy, so as to remain substantially near or at the surface of a body of liquid. Such equiducts could be made of suitable light transmissive material, and contain suitable photosynthetic organisms growing in an enriched nutrient medium. Such enrichment might also include enrichment with carbon dioxide, dissolved ammonia, or other dissolved gases. Similarly, equipods might be used to contain the base of an aquaculture food pyramid. The depth at which such photosynthetic processes might occur could depend upon the light transmissivity of the surrounding liquid. For example, in tropical oceans or some lakes, the surrounding liquid is sufficiently clear to allow light to penetrate to substantially greater depths than is the case in temperate waters or arctic waters. In substantially clear ambient liquid, photosynthetic processing vessels might be located at depths sufficiently great to allow a substantially greater partial pressure for dissolved gases, and hence the possibility of substantial enrichment of the medium beyond that which might be feasible or economic at atmospheric pressure.

EEEEE. Artificial Illumination for Photosynthesis

Suitable artificial illumination has been developed for effective use as a source of illumination for photosynthetic activity. Such illumination might advantageously be incorporated for illuminating organisms within equilibrium vessels. At substantial depth within a surrounding fluid, the available pressure within an equilibrium vessel might readily be maintained at a sufficiently high level to allow a partial pressure of dissolved gases beneficially higher than might be obtained by solution of gases at substantially atmospheric pressure. In such an environment, biological activity might advantageously occur at a substantially augmented rate. In such an environment, artificial illumination might advantageously be provided to provide the increased photosynthetic energy requirements of organisms growing therein.

Some methods for doing this are discussed elsewhere herein. In such methods, sunlight could be made available within an equilibrium vessel, either near the surface of an ambient fluid, or at a substantial depth therein. In FIG. 24 is depicted another way in which such illumination might be made available within an equilibrium vessel. Equiduct 724 is depicted as located at depth 723 below surface 721 of ambient liquid 722. Within equiduct 724 would be provided illumination means 727, here depicted as located coaxially within equiduct 724. Other locations for an illumination means might be provided if desired. With a coaxial location for illumination means 727, an annular region 725 would be formed between this illumination means and the inner wall of the equiduct. Within annular region 725 is depicted medium 726, flowing generally in the direction indicated by arrow 729 and following, for example, a helical path 728, whereby solid material transported within medium 726 might advantageously be retained in suspension. Broken line 730 and 731 are included to indicate that equiduct 724 might be a portion of a larger equiduct system. For example, equiduct 724 might be part of an equibed. Equibeds are discussed elsewhere herein.

With relatively inexpensive power, for example, nuclear power, it might be ecologically or economically advantageous to use photosynthetic processes in processing sewage or other waste material. Availability of photosynthetic processes would increase the variety of processes which might be used within equilibrium vessels for processing material contained therein. Also, availability of photosynthetic processes might be beneficial in allowing a food pyramid to be constructed, whose efficiency were greater than that provided by use of processes not involving photosynthesis. Thus, inclusion of photosynthetic processes might be ecologically or economically beneficial in improving the value of the final product of processing waste material. For example, feed might be more advantageously produced. Also, phosphates and other nutrients might be more effectively incorporated into organisms by use of photosynthetic processes, thus removing such nutrients from the medium. Thus, the choice of using artificial illumination for photosynthetic processes might contain ecological, technical and economic components.

FFFFF. Pathogenic Cultures

Were an equiduct transporting nutrient medium to operate within a temperature range relatively close to human body temperature, the likelihood that cultures of pathogenic organisms might be supported could become relatively larger than when operation were at a temperature substantially different from body temperature. Also, were the partial pressure of dissolved gases substantially the same as that present in the body, this possibility could become more likely. In this respect, processing at substantial depths, with high dissolved gas partial pressure, might be advantageous in that such conditions could be made substantially different from those present within the human body. Thus, cultures could be introduced in such different conditions, which could thrive there and compete far more effectively than might be expected of organisms which were better suited to conditions within the human body. This could substantially decrease the probability of pathogenic organisms possibly becoming an established culture within such a medium.

GGGGG. Domes Holding Fresh Water or Sewage Over Seawater

Figure 15:
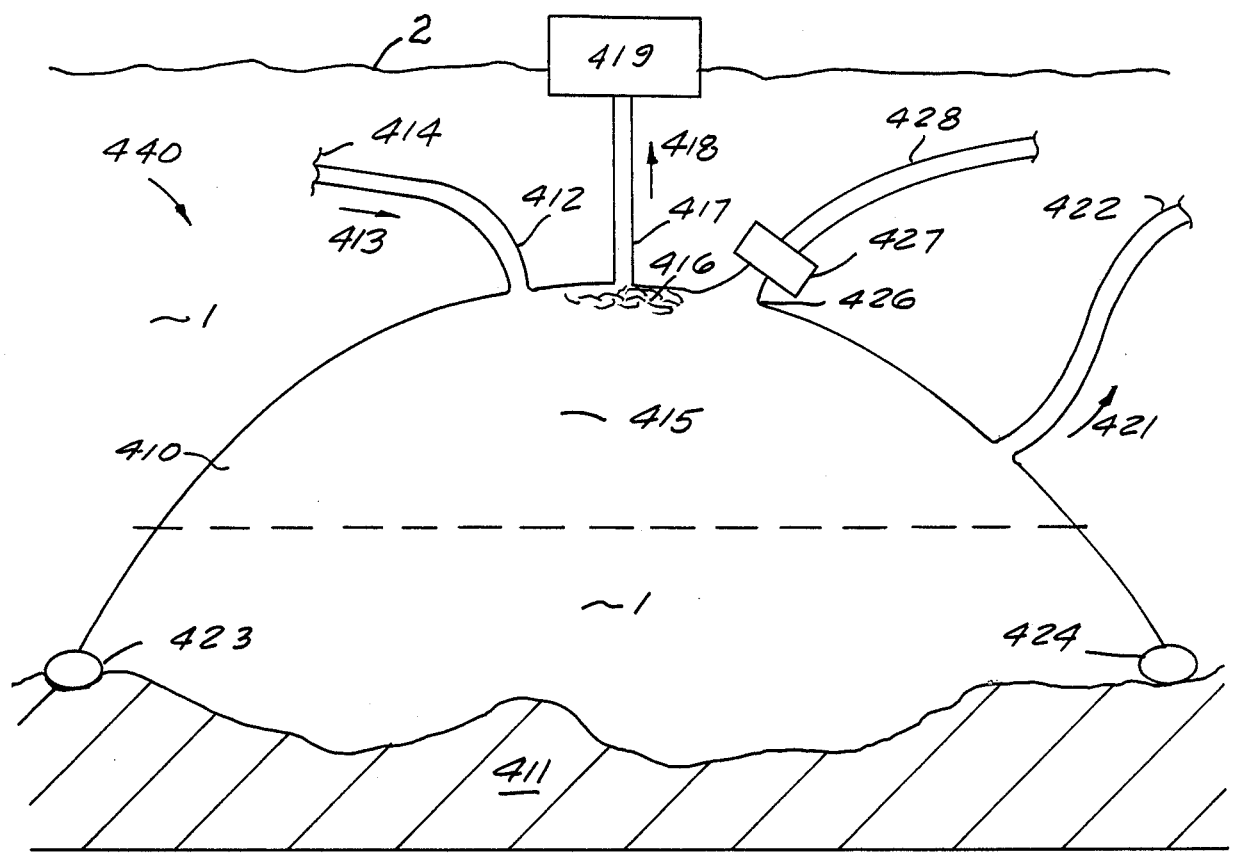
FIG. 15 depicts a domed structure for storage of sewage.

Fresh water sewage is less dense than seawater. For this reason, inverted storage of such sewage is possible. In FIG. 15 is illustrated an inverted storage dome 410 located in fluid medium 1 below its surface 2 and anchored to its bottom 411. An equiduct 412 brings sewage into the system in the direction of arrow 413 from a portion of the system to the left of broken line 414. Within the dome 410 sewage 415 floats on seawater 1. This sewage is degraded by biological activity, giving rise to methane, shown accumulated at 416 near the top of dome 410. This methane is released through equiduct 417 in the direction of arrow 418 to a suitable receiving vehicle 419 in which it may be used, stored, or further processed. Sewage is removed, if desired, through equiduct 420 in the direction of arrow 421 to some other portion of the system to the right of broken line 422. Suitable anchors 423 hold dome 410 to the bottom 411. It is not necessary for this dome to be sitting directly on the bottom. For example, cables can run to a height indicated by dashed line 425. The dome could be constructed of suitable materials selected to have the desired buoyancy and mechanical properties for example, in accordance with techniques for construction set forth in my co-pending application *2, or otherwise known in the art. Such a reserve system for storing fresh water sewage could offer a way to produce methane gas suitable for use in power generation, or for other uses. Solid debris from the sewage could have a prolonged period, under certain circumstances, to settle from the sewage to the bottom. Sewage then removed from this system could have a relatively low debris content. Some provision may be desired for removing debris from near the top of the dome, in the case of debris which accumulates by floating on fresh water sewage. This could be done through suitable port and control mechanism 426 and 427, respectively. This would then be carried into an equiduct 428 to be transported to some other portion of the system not shown. Such a processing system might be advantageous where an especially deep crevasse were available in an ocean floor or lake floor, into which debris could be settled, the decomposition of which debris could then give rise to a useful byproduct, methane. A modest pressure head is also available for the entrapped fresh water sewage, because of its position at a depth within a more dense saline solution. This pressure head could be used to promote its further flow, e.g., when retrieval of it from storage was desired. This might, for example, be used in supplying aquaculture ponds with a relatively steady source of nutrients.

HHHHH. Adding Chemicals with Mixing in Equiducts

In certain types of processing of sewage, chemicals are added to the sewage to cause material contained within the sewage to clump and precipitate more rapidly. Such chemicals can be mixed with the sewage while it is transported within equiducts, preceding its entry to a region in which the sedimentation is to occur In this way, thorough mixing might readily be obtained. For example, use of such clumping chemicals might reduce the capital plant required for adequate sedimentation. Such settling regions are discussed in connection with the sedimentation ponds and sedimentation processes for removal of excessively dense settling debris, and use of continuous belt settling and sorting system, elsewhere in this application. Using such chemical technologies to augment the effectiveness of the various sedimentation and segregation procedures discussed in this patent application will be recognized by those familiar with the art, and can be used with the invention disclosed herein without departing from the scope of this invention as set forth herein. Other chemical preprocessing, such as neutralization, chelation of heavy metals, or decomposition of noxious substances, could also be performed during transport in equiducts.

IIIII. Sorting Solids During Transport in Equiducts

Figure 14:
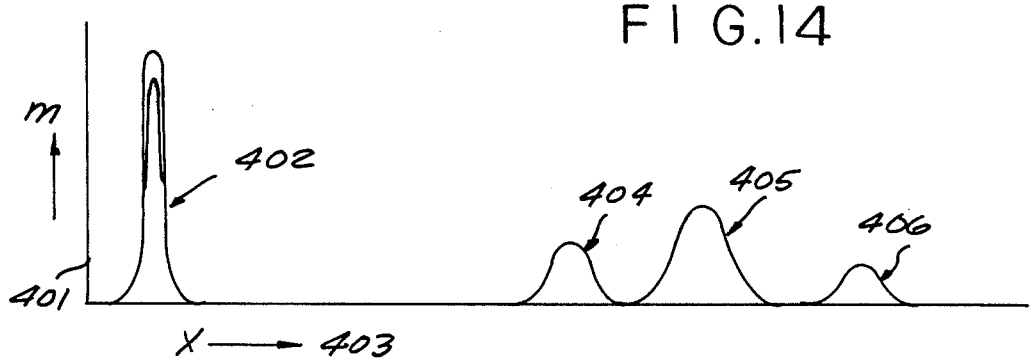
FIG. 14 is a graphical representation of a pulsing system.

A pulse of solid waste injected into a stream of sewage transported in an equiduct could be expected to experience different rates of transfer along the length of the equiduct of components of different slurry. In this way, different components of the slurry could be sorted according to their transport properties within the equiduct. In some sense, the equiduct would be acting like a chromatographic column. If solid wastes were injected into the equiducts from a known location in known bursts, time of arrival of solid material at a processing plant can be used as a sorting technique for sorting solids into different components for different kinds of processing. For example, the lower density solids might be transported more rapidly than the relatively more dense solids, thus, the first material coming from the equiduct could be sorted for use in the synthesis of chemical fuels. The denser materials coming out subsequently could be sorted for metal content or ceramic content for reclamation of minerals. If the pulses were spaced widely enough so that there were relatively little overlap between the broadened pulses of solids when they arrived at the processing plant, then such a process could operate with relatively higher efficiency than if the overlap were substantial or the solids continuously were introduced into the equiduct. In this way, reclamation of solids from solid wastes transported in equiducts might be simplified and its efficiency enhanced. In FIG. 14 is depicted such separation. Axis 401 is mass transported as solids. Axis 403 is the distance along the equiduct, and 402 represents a pulse consisting of three substantially different fractions of solid material, each of which is relatively homogeneous. When they have propagated a substantial distance down the equiduct, the different velocities of propagation of the three components leads to the separation of three pulses, 404, 405, and 406, each consisting of essentially one type of solid material.

JJJJJ. Digestion in Equiducts

Another type of processing which might advantageously be caused to occur during transport of material through the equiducts is the emulsification of oils and fats and the digestion of cellulosic materials by a suitable culture of bacteria. In this way, flow through the equiducts can be used for extensive processing, reducing the capacity required in the subsequent processing plant. This effect could be especially helpful when material is transported over long distances. For example, under certain circumstances material might be transported so as to be within an equiduct for several days. In that case, decomposition of biologic materials within the equiduct can proceed a substantial portion of the way to completion. Subsequent processing of the material can then treat the material as nutrients in many respects, rather than as a source of biological contamination. In an extended river valley, it may be desirable to use several parallel duct systems so as to allow the transport of wastes to proceed without the addition of fresh sewage for a long enough distance, to allow the level of biological hazard associated with the material to be decreased by biological degradation processes to a level where it is then acceptable for use as nutrients in aquaculture or agriculture, for example, for fish, shellfish, etc., or to produce protein supplements for livestock, or for other use. For such applications, it may be desirable to take biological cultures specifically suited to a particular application and introduce them into an equiduct system upstream. These cultures may be fed back from downstream. The growth of the culture within the equiduct could give rise to a large population of that culture available at a downstream location in the equiduct, from which it could be extracted and returned upstream in order to improve the processing effectiveness of the equiduct. Thus, the equiduct system and the processing plant ought properly to be analyzed as a single system, rather than as separate portions.

KKKKK. Handling Extremely Noxious Wastes

Some types of industrial wastes may be so toxic as to preclude their processing by biological means. Such wastes could be handled using equiducts, equipods, and related equipment, by means of conventional chemical processes for their detoxification. Because an equiduct system offers the possibility of economically transporting such wastes substantial distances, there is the favorable possibility of transporting such wastes to a location where is available a substantial quantity of high-grade waste heat, and then handling such wastes by processes which use substantial quantities of energy. For example, if such wastes were transported to a site at which was located a nuclear power plant, distillation following fairly conventional desalination techniques might be a satisfactory method of reclaiming from such industrial wastes the substantial portion of their water content, leaving a relatively highly concentrated portion bearing the toxic components of the wastes. The substantially reduced remaining volume could then be transported by an equiduct system to some place for further processing or for other disposal. Given adequate high-grade energy, such wastes could be dehydrated, and then burned or otherwise decomposed into their constituent elements. Many of the more toxic of these elements might then be reclaimed. Those which can be oxidized to a harmless condition could be destroyed by such a combustion process. The amount of material which would remain after such processing could be very much smaller than initially, facilitating disposal thereof. To avoid poisoning the biological processing systems which might advantageously be used for processing biological wastes, such industrial wastes might advantageously be transported with an entirely separate equiduct system, to avoid the possibility of contaminating the biological wastes with industrial wastes of unknown toxicity and unknown long-terms effects on biological and ecological systems. This might be especially important if the biological processing of biological wastes were intended to yield products which might be returned to the ecosystem.

LLLLL. Protecting Equiduct Biosystems

Biological processing within equiducts and associated processing plants may advantageously be used to economically process biological wastes. However, there are various types of toxic materials which might interfere with the operation of such biological processing systems. Examples of these may be found among the more noxious industrial wastes. These industrial wastes, therefore, would properly be segregated from the biological wastes and might advantageously be transported by a completely separate equiduct system to avoid mixing. Some communities may use water purification chemicals to prepare water for human consumption which might themselves interfere with operation of certain types of biological processing systems. Such chemicals, however, may typically be removed by relatively simple processes, including chemical processes, and mechanical processes such as gas flushing. Apparatus suitable for gas flushing is discussed in my co-pending application *1 now U.S. Pat. No. 4,469,596, granted Sept. 4, 1984, and the effect of such processing upon dynamic stability of equiduct systems is discussed in my co-pending application *2.

MMMMM. Variations

It is to be understood that the descriptions of floating and submerged processing plants for processing sewage, solid wastes, or other materials conveyed thereto by an equiduct transport system or other means, is intended to be illustrative. Many combinations and variations could be appropriate for specific applications, depending upon the nature of the materials to be processed, economic considerations, aesthetic considerations, availability of waste heat, cost of land, depth of liquid in which processing could occur, density of liquid, and many other factors which could enter into specific design of a particular processing facility. The division of processing between processing within an equiduct system used for transport and processing within a relatively more localized processing facility, depends upon detailed consideration of economics and application. Use of fluid equilibrium in such transport and processing facilities could allow substantial simplification of apparatus, reduction in cost, and reduction in construction and materials requirements placed upon the components in such apparatus. Variations in the division of processing between transport systems and relatively more localized systems and in the connectivity, sequencing, shape, size, configuration, and chemical processes and biological processes occurring therein, can be made without departing from the scope of the invention as set forth herein.

NNNNN. Higher Organisms in Equiducts, Equibeds or Equipods

At substantial depth within a surrounding liquid, substantial partial pressures of dissolved oxygen may readily be supported within liquid within equilibrium enclosures. If oxygenation With substantially pure oxygen were used, the partial pressure of dissolved oxygen within such fluid may be made sufficiently high to allow organisms which are not normally regarded as aquatic organisms to receive sufficient oxygen to survive. Under such circumstances, organisms which are normally air-breathing might be modified to provide desired food products while living within such an aquatic environment. The dissolved oxygen within the fluid could be readily made sufficiently high to allow such animals to breathe water. For larger organisms, this might raise other problems. However, for relatively small organisms, this might be a satisfactory environment. Suitable modification of such organisms by selective mutation and breeding might advantageously produce a greater diversity of animals for use in implementing the processing of nutrients in such deep equilibrium vessels.

More conventional organisms, such as brine shrimp and the like, which feed by grazing upon algae, fungi, or other microorganisms, might advantageously be used as an intermediate step in a food chain within such processing vessels or systems. Because of the high partial pressure of dissolved oxygen which may readily be supported within such a medium, intensive grazing by fish or other aquatic organisms might be supported within such systems at a level which would be substantially impossible within ordinary aquatic environments.

OOOOO. Large Size Steps in an Efficient Food Chain

Some of the largest marine organisms feed by grazing upon some of the smallest organisms, allowing large jumps to be implemented in a food chain based upon the contents of equiducts, equibeds, or the like. For example, some kinds of whale graze upon very small marine organisms. By using large jumps in size, a higher fraction of the food value available at the base of the food pyramid might be retained after conversion into other forms.

PPPPP. The Transport and Processing Systems as an Open Ecosystem

At the high levels of dissolved oxygen which could readily be provided within a deep processing system, it might be relatively economical to bring the processed material up to a level in the food chain suitable to allow economic separation, processing, and transportation of such organisms as foodstuffs, feed additives, fertilizer, or for chemical products or other uses. Thus, the activites going on within a deep processing system could comprise a small ecological system within which, because of its special environment, biological processes might advantageously proceed at rates substantially greater than those supported by the larger ecological system within which this smaller ecosystem would be embedded. Thus, with relatively little physical extent, such a small ecosystem might in principle be made to compensate for many of the missing steps between sewage and return of the elements therein to the larger ecosystem of our world. By starting with sewage and finishing with many of the elements therein incorporated into organisms suitable for further use in a food chain, such an ecosystem might substantially participate in closing the loop of the ecological processes that led to producing the sewage or wastes originally disposed of. From the standpoint of designing the biological, chemical, and physical processes to be implemented within an extensive equiduct collection and processing system for processing sewage, solid wastes, etc., it may be highly advantageous to perform the analysis from the point of view that such an extended equilibrium system comprises a smaller ecological system embedded in the larger ecological system of our world, whose operation should be complimentary to and integrated with the larger ecosystem which it is intended to serve.

SUMMARY

In this patent application I have set forth ways in which processing of sewage may advantageously be performed, utilizing the nature of a fluid environment to substantially reduce the structural requirements upon a processing plant. Such processing plants could advantageously be constructed in naturally occurring bodies of water. With such processing plants, the three principle forms of pollution, biological wastes, solid wastes, and thermal pollution, normally associated with a metropolis, can be advantageously utilized. Each, under some circumstances, can contribute beneficially to the processing of the others. Thus, thermal pollution can cease to be a form of pollution and become, rather, a beneficial way in which the amount of time required for biological processing of wastes may be reduced. Solid waste material, rather than being a removal problem, can become a way in which the energy content of sewage can be increased to facilitate the operation of a processing plant. Sewage can become a source of nutrients for aquaculture. Because the structural requirements upon a processing plant constructed using fluid-fluid equilibrium are so greatly reduced compared to construction by other means, it may well be that the construction costs and operating costs can be reduced to the point where the beneficial byproducts which might be derived from the operation of such a plant can sufficiently defray the costs of operation as to make them substantially less then the costs which would normally be associated with processing sewage and solid wastes. It may even be possible, under some circumstances, to produce a net positive balance in economic value from the processing of the sewage, solid wastes, and thermal pollution by such plants.

In the course of defining the methods and apparatus appropriate for performing such functions, I have set forth and defined equiponds suitable for use when the contained fluid is of substantially the same density as the ambient fluid, when the contained fluid is of lesser density than the ambient fluid, when the contained fluid contains rising and falling debris which can become segregated from the fluid which is in the equipond, mechanisms for sorting debris from fluid so as to render simpler the construction of stable equiponds, methods for reclaiming from fluid, rising and falling debris for use in subsequent processes, methods for cleaning equiponds, and utilization of equipods and flow control means for appropriate control of the motion and properties of fluids. Equiducts feeding such systems can be utilized advantageously as part of the overall processing plant by allowing some biological processing and chemical processes to occur therein. In this may, premixing of additives and predigestion of sewage can occur.

I have set forth herein a way in which a complete processing plant for processing thermal pollution, solid wastes and sewage can be constructed so as to float upon a body of water. This construction allows for flexing of various portions of the system and for substantial reduction in structural requirements of the system. This complete system might not be implemented in its entirety in any given installation. Also, in conjunction with my co-pending applications *1, *2, *3, and *5, the instrumentation of such a system and the criteria for the operation of the various components of it are set forth. Variations upon the implementation of these various ways of manipulating sewage, solid waste and thermal pollution, can be made within the scope of the invention as set forth herein and in my co-pending applications *1, *2, *3, and *5.

What is claimed is:

1. A flexible enclosure for containing liquid and solid materials, the enclosure being constructed and connected in support reception to support means arranged to be disposed within a body of water, comprising:

(a) an enclosed side wall defining a lateral boundary for the enclosure and having a lower edge;
(b) at least one float means for supporting said side wall in said body of water;
(c) a flexible membrane attached to said lower edge of said side wall and closing off the enclosure to form a bottom thereof; and
(d) means for restoring said membrane bottom to a substantially level condition in the event of a surface deformity.

2. A flexible enclosure as recited in claim 1, wherein said means for restoring said membrane bottom includes a plurality of floats and support members attached to said membrane and constructed and arranged such that said floats float on said liquid contained within said enclosure.

3. A flexible enclosure as recited in claim 1, wherein said means for restoring said membrane bottom includes tensioning means for maintaining said flexible membrane under tension.

4. A flexible enclosure as recited in claim 1, wherein said means for restoring said membrane bottom comprises means providing a difference in density such that said membrane is of a lower density than a density of said body of water and a higher density than a density of said liquid and solid materials contained within said enclosure.

* * * * *